US011500079B2

(12) United States Patent
    Lai

(10) Patent No.: US 11,500,079 B2
(45) Date of Patent: Nov. 15, 2022

(54) CALIBRATION SYSTEM AND CALIBRATION BRACKET

(71) Applicant: AUTEL INTELLIGENT TECHNOLOGY CORP., LTD., Guangdong (CN)

(72) Inventor: Biwang Lai, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 31 days.

(21) Appl. No.: 17/138,429

(22) Filed: Dec. 30, 2020

(65) Prior Publication Data
    US 2021/0132203 A1    May 6, 2021

Related U.S. Application Data

(63) Continuation of application No. PCT/CN2020/073875, filed on Jan. 22, 2020.

(30) Foreign Application Priority Data

Feb. 1, 2019  (CN) .......................... 201910105255.7
Mar. 20, 2019 (CN) .......................... 201910214360.4
(Continued)

(51) Int. Cl.
    *G01S 7/497*    (2006.01)
    *G01S 17/931*   (2020.01)

(52) U.S. Cl.
    CPC ............ *G01S 7/497* (2013.01); *G01S 17/931* (2020.01)

(58) Field of Classification Search
    CPC ...... G01S 7/4026; G01S 7/4972; G01S 7/497; G01S 17/931; G01M 17/06;
    (Continued)

(56) References Cited

U.S. PATENT DOCUMENTS 8,282,052 B2 * 10/2012 Huang ................... F16M 11/24
                                                        248/125.1
10,921,426 B2 *  2/2021 Tang .......................... G01S 7/40
(Continued)

FOREIGN PATENT DOCUMENTS

CN           1764818 A    4/2006
CN         201448569 U    5/2010
(Continued)

OTHER PUBLICATIONS

The First Chinese Office Action dated Dec. 28, 2020; Appln. No. 201910214535.1.
(Continued)

*Primary Examiner* — Luke D Ratcliffe

(57) ABSTRACT

The present invention relates to the field of vehicle correction, and provides a calibration system and a calibration bracket thereof. The calibration bracket includes: a base, a stand assembly and a beam assembly. The stand assembly is fixedly connected to the base. The beam assembly is supported by the stand assembly, and includes a beam, the beam being configured to mount a calibration element and including a left beam portion, a right beam portion and a connecting portion, the connecting portion being supported by the stand assembly, one end of the connecting portion being pivotally connected to the left beam portion, and the other end of the connecting portion being pivotally connected to the right beam portion. In the foregoing structure, the left beam portion and the right beam portion can respectively rotate toward each other relative to the connecting portion, to fold the beam assembly, so that a volume of the calibration bracket can be reduced to facilitate shipment.

27 Claims, 46 Drawing Sheets

(30) Foreign Application Priority Data

| Mar. 20, 2019 | (CN) | 201910214372.7 |
|---|---|---|
| Mar. 20, 2019 | (CN) | 201910214535.1 |
| Mar. 20, 2019 | (CN) | 201910361725.1 |
| Mar. 20, 2019 | (CN) | 201920361654.5 |
| Mar. 20, 2019 | (CN) | 201920361707.3 |
| Mar. 20, 2019 | (CN) | 201920362872.0 |
| Mar. 20, 2019 | (CN) | 201920367586.3 |
| Mar. 21, 2019 | (CN) | 201910219063.9 |
| Apr. 30, 2019 | (CN) | 201910362935.7 |

(58) Field of Classification Search
CPC ............ G01B 11/2755; G01B 11/272; G01B 2210/283; G01B 2210/12; G01B 2210/143
See application file for complete search history.

(56) References Cited

U.S. PATENT DOCUMENTS

| 2006/0011787 | A1 | 1/2006 | Law | |
| 2008/0070759 | A1* | 3/2008 | Chaulk | A63B 21/078 482/104 |
| 2013/0325252 | A1* | 12/2013 | Schommer | G01S 7/4972 701/33.1 |
| 2016/0223822 | A1 | 8/2016 | Harrison et al. | |
| 2017/0252631 | A1* | 9/2017 | Rankin | A63B 71/0605 |
| 2018/0052223 | A1 | 2/2018 | Stieff et al. | |
| 2018/0188022 | A1* | 7/2018 | Leikert | G01B 11/2755 |
| 2019/0204427 | A1* | 7/2019 | Abari | G01S 7/497 |
| 2020/0074675 | A1* | 3/2020 | Cejka | F16M 11/24 |

FOREIGN PATENT DOCUMENTS

| CN | 201764219 U | 3/2011 |
|---|---|---|
| CN | 202177377 U | 3/2012 |
| CN | 102590796 A | 7/2012 |
| CN | 1202834630 U | 3/2013 |
| CN | 203390592 U | 1/2014 |
| CN | 203921022 U | 11/2014 |
| CN | 204479090 U | 7/2015 |
| CN | 204630740 U | 9/2015 |
| CN | 105197789 A | 12/2015 |
| CN | 106405526 A | 2/2017 |
| CN | 206132999 U | 4/2017 |
| CN | 206185537 U | 5/2017 |
| CN | 206804864 U | 12/2017 |
| CN | 107678004 A | 2/2018 |
| CN | 108318870 A | 7/2018 |
| CN | 108345321 A | 7/2018 |
| CN | 108581982 A | 9/2018 |
| CN | 208270760 U | 12/2018 |
| CN | 209524919 U | 10/2019 |
| CN | 209524941 U | 10/2019 |
| CN | 209524942 U | 10/2019 |
| GB | 638392 A | 6/1950 |
| GB | 2400792 A | 10/2004 |
| JP | 2007139056 A | 6/2007 |
| WO | WO2018067354 A1 | 4/2018 |
| WO | 2018154328 A1 | 8/2018 |

OTHER PUBLICATIONS

The First Chinese Office Action dated Jan. 4, 2021; Appln. No. 201910362935.7.
The International Search Report dated Apr. 20, 2020 PCT/CN2020/073838 with English Translation.
The Extended European Search Report dated Aug. 23, 2021; Appln. No. 20748693.7.
The Extended European Search Report dated Aug. 23, 2021; Appln. No. 20748835.4.

* cited by examiner

CALIBRATION SYSTEM AND CALIBRATION BRACKET

This application is a continuation of International Patent Application No. PCT/CN2020/073875 filed on Apr. 19, 2020, which claims priority to Chinese Patent Application No. 201910105255.7 filed on Feb. 1, 2019, claims priority to Chinese Patent Application No. 201910214535.1 filed on Mar. 20, 2019, claims priority to Chinese Patent Application No. 201910362935.7 filed on Apr. 30, 2019, claims priority to Chinese Patent Application No. 201910214372.7 filed on Mar. 20, 2019, claims priority to Chinese Patent Application No. 201910214360.4 filed on Mar. 20, 2019, claims priority to Chinese Patent Application No. 201910219063.9 filed on Mar. 21, 2019, claims priority to Chinese Patent Application No. 201920361725.1 filed on Mar. 20, 2019, which claims priority to Chinese Patent Application No. 201920361707.3 filed on Mar. 20, 2019, which claims priority to Chinese Patent Application No. 201920362872.0 filed on Mar. 20, 2019, which claims priority to Chinese Patent Application No. 201920361654.5 filed on Mar. 20, 2019, which claims priority to Chinese Patent Application No. 201920367586.3 filed on Mar. 20, 2019, all of which are incorporated by reference herein in their entireties.

BACKGROUND

Technical Field

The present application relates to the technical field of vehicle maintenance and device calibration, and in particular, to a calibration system and a calibration bracket thereof.

Related Art

An advanced driver assistant system (ADAS for short) is an active security technology of collecting environmental data inside and outside a vehicle at the prime time by using various sensors mounted to the vehicle to perform technical processing such as identification, detection, and tracking of static and dynamic objects, enabling a driver to perceive a potential danger as quickly as possible, thereby attracting attention and improving security. Sensors adopted in the ADAS mainly include a camera, a radar, a laser, and an ultrasonic wave, which can detect light, heat, pressure, or other variables for monitoring status of a vehicle, and are generally located on front and rear bumpers, on a side mirror, inside a steering column, or on a windscreen of the vehicle. During use of the vehicle, vibration, collision, environmental temperature and humidity, and the like change physical mounting states of the foregoing sensors, and therefore irregular correction or calibration is required.

During correction or calibration of the foregoing sensors, calibration elements are usually hung on the calibration bracket to correct or calibrate the sensors on the vehicle. However, most of current calibration brackets have relatively large volumes and occupy a relatively large area, and are complicated to assemble and difficult to move.

SUMMARY

Embodiments of the present invention are intended to provide a calibration system and a calibration bracket thereof, which can resolve the technical problem in the prior art that a calibration element is difficult to move.

The embodiments of the present invention provide the following technical solutions to resolve the technical problem.

A calibration bracket is provided, including:
a base;
a stand assembly fixedly connected to the base; and
a beam assembly supported by the stand assembly, the beam assembly including a beam, the beam being configured to mount a calibration element and including a left beam portion, a right beam portion and a connecting portion, the connecting portion being supported by the stand assembly, one end of the connecting portion being pivotally connected to the left beam portion, and the other end of the connecting portion being pivotally connected to the right beam portion.

Optionally, the stand assembly includes a fixed vertical rod and a movable vertical rod, where
one end of the fixed vertical rod is mounted to the base;
the movable vertical rod is disposed in the fixed vertical rod or sleeved on the fixed vertical rod, and is movable in a length direction of the fixed vertical rod relative to the fixed vertical rod; and
the connecting portion is supported by the movable vertical rod.

Optionally, cross-sections of the fixed vertical rod and the movable vertical rod are non-circular.

Optionally, one of the fixed vertical rod and the movable vertical rod includes a guide rail, and the other is movable only in the length direction of the fixed vertical rod under guidance of the guide rail.

Optionally, the stand assembly includes a driving mechanism, the driving mechanism being mounted to the fixed vertical rod, configured to drive the movable vertical rod to move in the length direction of the fixed vertical rod relative to the fixed vertical rod, and including a rack, a housing, a worm, a worm gear and a second transmission gear,
the rack being fixedly mounted to the movable vertical rod, disposed in a length direction of the movable vertical rod, and forming the guide rail;
the housing being fixedly mounted to the fixed vertical rod;
the worm meshing with the worm gear;
the worm gear being fixedly mounted to the second transmission gear, a rotation axis of the worm gear overlapping with a rotation axis of the second transmission gear, and the worm gear and the second transmission gear being rotatable about a third rotation axis; and
the second transmission gear being fixedly mounted to the housing and meshing with the rack,
the third rotation axis being perpendicular to the rack.

Optionally, the stand assembly includes a driving mechanism, the driving mechanism being mounted to the fixed vertical rod and configured to drive the movable vertical rod to move in the length direction of the fixed vertical rod relative to the fixed vertical rod.

Optionally, the driving mechanism includes a gear reduction assembly.

Optionally, the stand assembly includes a fastening mechanism and an elastomer,
the fastening mechanism being mounted to the fixed vertical rod and configured to fix the movable vertical rod to the fixed vertical rod; and
the elastic body being connected between the bottom of the fixed vertical rod and the movable vertical rod, and when the movable vertical rod moves to at least a lowest height, the elastic body being in a compressed state.

Optionally, the beam assembly includes a mounting base supported by the stand assembly, the connecting portion being disposed in the mounting base and supported by the stand assembly through the mounting base.

Optionally, the mounting base is disposed on the top surface of the stand assembly.

Optionally, the mounting base forms a mounting channel through enclosure, the mounting channel being not closed but left with a gap, the connecting portion being mounted in the mounting channel, and the gap being configured to facilitate the mounting of the connecting portion in the mounting channel through the gap and facilitate removal of the connecting portion from the mounting channel through the gap.

Optionally, the mounting base includes a first positioning mechanism, and the connecting portion includes a second positioning mechanism matching the first positioning mechanism, the first positioning mechanism being matching the second positioning mechanism to position the connecting portion in the mounting base.

Optionally, the mounting base is provided with a fixing mechanism, the fixing mechanism pressing the connecting portion against the mounting base in a direction at a preset angle to a horizontal direction, so that the connecting portion is pressed against the bottom surface and one lateral surface of the mounting base, the preset angle being greater than 0 degrees and less than 90 degrees.

Optionally, the preset angle is 30 degrees, 45 degrees or 60 degrees.

Optionally, the beam assembly includes an adjustment mechanism, the adjustment mechanism being connected to the mounting base and configured to adjust a horizontal angle of the connecting portion.

Optionally, the adjustment mechanism includes a first elastic member, a rotating member and an adjusting rod, the rotating member being connected to the mounting base and being rotatable about an adjustment rotation axis relative to the mounting base, the adjustment rotation axis being vertically disposed;

one end of the first elastic member being fixed to the mounting base, and the other end being fixed to the rotating member; and the adjusting rod being mounted to the mounting base and being in screw-thread fit with the mounting base;

the adjusting rod being rotated to push the mounting base to rotate about the adjustment rotation axis relative to the rotating member, so as to adjust the mounting base and the horizontal angle of the connecting portion; and the adjusting rod being rotated away from the mounting base, and the mounting base being pulled by using the first elastic member to rotate about the adjustment rotation axis relative to the rotating member to return to its original position.

Optionally, the adjustment mechanism includes a supporting shaft and a bearing base, the supporting shaft being fixedly mounted to the mounting base, and a central axis of the supporting shaft overlapping with the adjustment rotation axis;

the rotating member being sleeved on the bearing base; and the supporting shaft being inserted into the bearing base, and the supporting shaft and the mounting base being rotatable together about the adjustment rotation axis relative to the rotating member and the bearing base.

Optionally, the beam assembly includes at least one supporting rod configured to support a target to prevent falling.

Optionally, the supporting rod is pivotally connected to one of the left beam portion, the right beam portion and the connecting portion.

Optionally, at least one of the left beam portion, the right beam portion and the connecting portion includes a supporting rod guide rail, the supporting rod being supported by the supporting rod guide rail and being movable in the supporting rod guide rail.

Optionally, the supporting rod includes a supporting rod body and a supporting member, the supporting rod body being provided with a slot, and at least one of the left beam portion, the right beam portion and the connecting portion being provided with a fixture block, or at least one of the left beam portion, the right beam portion and the connecting portion being provided with a slot, and the supporting rod body being provided with a fixture block, and the fixture block being snapped into the slot to snap the supporting rod at the at least one of the left beam portion, the right beam portion and the connecting portion.

Optionally, the beam assembly includes a first buckle and a second buckle, one end of one of the first beam portion and the connecting portion being hinged to one first buckle, one end of the other being provided with one second buckle, and the first buckle and the second buckle being fastened to each other to fasten the first beam portion to the connecting portion.

Optionally, the beam assembly includes at least one joint mechanism connected between the left beam portion and the connecting portion or connected between the right beam portion and the connecting portion, the joint mechanism including a first fixing member and a second fixing member, where the first fixing member includes a fastener, a rotating shaft and a second elastic member, the rotating shaft being fixedly connected to an inner wall of the first fixing member, and the fastener being mounted to the rotating shaft, being rotatable about the rotating shaft, and including a first end and a second end, the first end and the second end being respectively located at two ends of the rotating shaft, and the second elastic member being connected between the inner wall of the first fixing member and the first end of the fastener; and the second fixing member includes a bulge, the bulge matching the second end of the fastener and being capable of being engaged with the fastener under action of the second elastic member.

Optionally, the joint mechanism further includes a locking mechanism, the locking mechanism being disposed on an outer wall of the beam assembly and passing through the first fixing member, which can be screwed to abut against the first end or the second end of the fastener, so that the first end clamps the bulge.

Optionally, the joint mechanism further includes a button, and the second end of the fastener includes a bump, the button passing through the second fixing member and being capable of abutting against the bump in a pressed state, so that the bulge can be separated from the fastener.

Optionally, the joint mechanism further includes a locking mechanism, the locking mechanism including a mounting support, a locking cam handle, an urging post and a third elastic member. The mounting support is mounted to the first fixing member, the locking cam handle is mounted to the mounting support, and the locking cam handle is rotatable relative to the mounting support to drive the urging post to abut against the fastener, so that the first fixing member and the second fixing member are fastened. The urging post passes through the first fixing member, one end of the urging post being configured to abut against the locking cam handle, and the other end being configured to abut against the fastener. The third elastic member is sleeved on the urging post, one end of the third elastic member being fixed to the urging post, and the other end abutting against the fastener.

The embodiments of the present invention further provide the following technical solutions to resolve the technical problem.

A calibration bracket is provided, including:

a base;

a fixed vertical rod, one end of the fixed vertical rod being mounted to the base;

a movable vertical rod, the movable vertical rod being disposed in the fixed vertical rod or sleeved on the fixed vertical rod, and being movable in a length direction of the fixed vertical rod relative to the fixed vertical rod; and a beam assembly, the beam assembly including a foldable beam, the beam being configured to mount a calibration element, and the beam assembly being supported on the top surface of the movable vertical rod.

Optionally, the beam assembly further includes a mounting base, the beam being disposed in the mounting base, and the mounting base being disposed on the top surface of the movable vertical rod.

Optionally, the mounting base includes a holder, the holder being hook-shaped.

Optionally, the mounting base includes a fixing mechanism, the fixing mechanism being disposed on the holder, and pressing the beam against the mounting base in a direction at a preset angle to a horizontal direction, so that the beam is pressed against the bottom surface and one lateral surface of the mounting base, the preset angle being greater than 0 degrees and less than 90 degrees.

Optionally, the beam assembly further includes an adjustment mechanism, the adjustment mechanism being configured to adjust a horizontal angle of the beam, and being disposed on the top surface of the movable vertical rod, and the mounting base being disposed above the adjustment mechanism.

Optionally, cross-sections of the fixed vertical rod and the movable vertical rod are non-circular.

Optionally, one of the fixed vertical rod and the movable vertical rod includes a guide rail, and the other is movable only in the length direction of the fixed vertical rod under guidance of the guide rail.

The embodiments of the present invention further provide the following technical solutions to resolve the technical problem.

A calibration bracket is provided, including:

a base;

a stand assembly fixedly connected to the base;

a foldable beam configured to mount a calibration element; and a mounting base supported by the stand assembly, the beam being disposed in the mounting base, the mounting base being provided with a fixing mechanism, the fixing mechanism pressing the beam against the mounting base in a direction at a preset angle to a horizontal direction, so that the beam is pressed against the bottom surface and one lateral surface of the mounting base, the preset angle being greater than 0 degrees and less than 90 degrees.

Optionally, the beam is provided with a fixing surface matching the fixing mechanism, and the fixing mechanism abuts against the fixing surface to press the beam against the mounting base.

Optionally, the fixing surface is at a second angle to the horizontal direction, the second angle matching the first angle.

Optionally, the first angle and the second angle are 30 degrees, 45 degrees or 60 degrees.

Optionally, the fixing mechanism is a fixing rod.

Optionally, the fixing rod includes at least one screw rod, so that the fixing rod can be screwed to press the beam against the mounting base.

Optionally, the fixing mechanism is a cam handle, the cam handle being mounted to the mounting base and being rotatable relative to the mounting base, to cause the cam handle to abut against the beam, so that the cam handle presses the beam against the bottom surface and the one lateral surface of the mounting base, or to cause the cam handle to be detached from the beam, so that the beam is removable from the mounting base.

Optionally, the mounting base is supported on the top surface of the stand assembly.

Optionally, the mounting base is provided with a first positioning mechanism, and the beam is provided with a second positioning mechanism matching the first positioning mechanism, the first positioning mechanism matching the second positioning mechanism to position the beam in the mounting base.

The embodiments of the present invention further provide the following technical solutions to resolve the technical problem.

A calibration system includes a calibration element and the above calibration bracket, where the calibration element may be hung on the calibration bracket.

The embodiments of the present invention further provide the following technical solutions:

a calibration bracket, including:

a base;

a stand assembly mounted to the base; and a beam assembly supported by the stand assembly and including a foldable beam, the beam being configured to mount a calibration element and including a first beam portion and a second beam portion, the first beam portion being pivotally connected to the second beam portion, a fastener being disposed in a tube wall of one of the first beam portion and the second beam portion, and a bulge being disposed in a tube wall of the other of the first beam portion and the second beam portion, the bulge matching the fastener to achieve engagement between the first beam portion and the second beam portion.

Optionally, a locking mechanism is disposed at an outer side of the tube wall of the beam corresponding to the fastener or the bulge. The locking mechanism passes through the tube wall of the beam and may be screwed to abut against the fastener, thereby causing the fastener to clamp the bulge.

Optionally, a button is disposed at the outer side of the tube wall of the beam corresponding to the bulge, and a bump is disposed at an end at which the fastener matches the bulge. When the button is pressed, the bump is pushed to cause the fastener to be separated from the bulge.

Optionally, a first fixing member is disposed at an inner side of a tube wall of the first beam portion, and a second fixing member is disposed at an inner side of a tube wall of the second beam portion, where the first fixing member includes the fastener, a rotating shaft and a first elastic member, the rotating shaft being fixedly connected to an inner wall of the first fixing member, and the fastener being mounted to the rotating shaft, being rotatable about the rotating shaft, and including a first end and a second end, the first end and the second end being respectively located at two ends of the rotating shaft, and the first elastic member being connected to a side wall of the first fixing member and the first end of the fastener; and the second fixing member includes the bulge, the bulge matching the second end of the fastener and being capable of being engaged with the fastener under action of the first elastic member.

Optionally, a locking mechanism is disposed at an outer side of the tube wall of the beam corresponding to the fastener or the bulge. The locking mechanism passes through the tube wall of the beam and is capable of abutting against the fastener, thereby causing the fastener to clamp the bulge.

Optionally, a button is disposed at the outer side of the tube wall of the beam corresponding to the bulge, and a bump is disposed at the second end of the fastener. When the button is pressed, the bump is pushed to cause the fastener to be separated from the bulge.

Optionally, the stand assembly further includes a locking mechanism, the locking mechanism including a mounting support, a locking cam handle, an urging post and a second elastic member, the mounting support being mounted to the first fixing member, the locking cam handle being mounted to the mounting support, and the locking cam handle being rotatable relative to the mounting support to drive the urging post to abut against the fastener, so that the first fixing member and the second fixing member are fastened;

the urging post passing through the first fixing member, one end of the urging post being configured to abut against the locking cam handle, and the other end being configured to abut against the fastener; and the second elastic member being sleeved on the urging post, one end of the second elastic member being fixed to the urging post, and the other end abutting against the fastener.

The embodiments of the present invention further provide the following technical solutions:

a calibration bracket, including:
a base;
a stand assembly fixedly connected to the base; and
a beam assembly supported by the stand assembly and including a foldable beam, the beam being configured to mount a calibration element and including a first beam portion and a second beam portion, the first beam portion being pivotally connected to the second beam portion, and a locking mechanism being disposed on a tube wall of at least one of the first beam portion and the second beam portion, which can lock the first beam portion and the second beam portion to each other when the first beam portion and the second beam portion are in an unfolded state.

Optionally, a fastener is disposed in a tube wall of one of the first beam portion and the second beam portion, and a bulge is disposed in a tube wall of the other of the first beam portion and the second beam portion, the bulge matching the fastener to achieve engagement between the first beam portion and the second beam portion.

Optionally, a first fixing member and a second fixing member are respectively disposed in respective tube walls of the first beam portion and the second beam portion, the first fixing member includes a fastener, a rotating shaft and a second elastic member, the rotating shaft being fixedly connected to an inner wall of the first fixing member, the fastener being mounted to the rotating shaft, being rotatable about the rotating shaft, and including a first end and a second end, the first end and the second end being respectively located at two ends of the rotating shaft, and the second elastic member being connected to the inner wall of the first fixing member and the first end of the fastener; and the second fixing member includes the bulge, the bulge matching the second end of the fastener and being capable of being engaged with the fastener under action of the first elastic member.

Optionally, the locking mechanism includes a mounting support, a locking cam handle, an urging post and a second elastic member, the mounting support being mounted to the first fixing member, the locking cam handle being mounted to the mounting support, and the locking cam handle being rotatable relative to the mounting support to drive the urging post to abut against the fastener, so that the first fixing member and the second fixing member are fastened;

the urging post passing through the first fixing member, one end of the urging post being configured to abut against the locking cam handle, and the other end being configured to abut against the fastener; and the second elastic member being sleeved on the urging post, one end of the second elastic member being fixed to the urging post, and the other end abutting against the fastener.

The embodiments of the present invention further provide the following technical solutions:

a calibration bracket, including:
a base;
a stand assembly fixedly connected to the base;
a beam assembly, the beam assembly including a beam and at least one supporting rod, the beam being connected to the at least one supporting rod and configured to mount a calibration element; and two fixing blocks supported by the beam, the two fixing blocks being movable in the beam, each of the fixing blocks being configured to mount a small-sized calibration element, the two fixing blocks and the at least one supporting rod being capable of collaboratively supporting a large-sized calibration element, the two fixing blocks respectively fixing the large-sized calibration element from left and right ends, and the at least one supporting rod supporting the large-sized calibration element underneath the large-sized calibration element.

Optionally, the beam assembly is supported on the top surface of the stand assembly.

Optionally, the two fixing blocks include a first holding mechanism and a second holding mechanism. The first holding mechanism and the second holding mechanism are face each other and are configured to respectively clamp the large-sized calibration element from the left and right ends.

Optionally, each of the first holding mechanism and the second holding mechanism is a slot or a bump.

Optionally, the two fixing blocks both include magnetic materials, which are configured to respectively attract the large-sized calibration element from the left and right ends.

Optionally, the beam assembly includes a mounting base supported by the stand assembly, the beam being disposed in the mounting base and supported by the stand assembly through the mounting base.

Optionally, the large-sized calibration element is hooked on the at least two fixing blocks by using hooks.

Optionally, a hanging surface of the mounting base is provided with a receiving groove.

The mounting base includes a backing plate, the backing plate being connected to the mounting base, rotatable between a first position and a second position relative to the mounting base, and including a hanging surface;

at the first position, the backing plate being clamped in the receiving groove, so that the hanging surface of the backing plate and the hanging surface of the mounting base face the same direction, and the hanging surface of the backing plate is flush with hanging surfaces of the two fixing blocks; and at the second position, the backing plate being detached from the receiving groove, and the hanging surface of the mounting base being flush with back surfaces of the large-sized calibration element respectively fixed by the two fixing blocks from the left and right ends or located behind the back surfaces.

Optionally, the backing plate further includes an inner surface, the hanging surface and an inner surface of the backing plate being disposed opposite to each other, and the inner surface of the backing plate including a magnetic material and configured to attract the large-sized calibration element with the at least two fixing blocks.

Optionally, the hanging surface of the backing plate is provided with a first positioning protrusion for hanging a small-sized calibration element.

Optionally, the first positioning protrusion includes a magnetic material.

Optionally, two first positioning protrusions are disposed in a length direction of the beam.

Optionally, the hanging surface of each of the fixing blocks is provided with a second positioning protrusion for hanging a small-sized calibration element.

Optionally, the second positioning protrusion includes a magnetic material.

Optionally, the two second positioning protrusions in each of the fixing blocks are disposed in the length direction of the beam.

Optionally, when the backing plate is at the first position, an end surface of the first positioning protrusion is flush with an end surface of the second positioning protrusion.

Optionally, each of the supporting rods includes a supporting rod body and a supporting member, one end of the supporting rod body being connected to the beam, and the supporting member being mounted to the other end, the supporting member being provided with a third positioning mechanism.

The first holding mechanism, the second holding mechanism and the third positioning mechanism are located on the same plane.

Optionally, the third positioning mechanism is a slot or a bump.

Optionally, each of the fixing blocks is provided with a receiving cavity, the beam being clamped in the receiving cavity.

Optionally, each of the fixing blocks includes a guide rod, the guide rod being located in the receiving cavity.

An outer wall of the beam is provided with a guide groove, the guide groove being disposed in the length direction of the beam, and a shape of the guide groove matching a shape of the guide rod, so that the guide groove can clamping the guide rod, and the guide groove and the guide rod can guide each of the fixing blocks to move in the length direction of the beam.

Optionally, the receiving cavity has an opening, a diameter of the beam being greater than a width of the opening of the receiving cavity.

Optionally, the receiving cavity is cylindrical, and a cross-section of the beam is circular.

The embodiments of the present invention further provide the following technical solutions:

a calibration bracket, including:

a base;

a stand assembly fixedly connected to the base; and a beam assembly supported by the stand assembly and including a beam, the beam being configured to mount a calibration element, where the beam assembly further includes a pedestal, an adjusting worm gear and an adjusting worm, one of the adjusting worm and the adjusting worm gear being mounted to the pedestal, and the other being mounted to the beam; and the beam is parallel to a rotating surface of the adjusting worm gear and perpendicular to a rotation center line of the adjusting worm gear, the adjusting worm including a worm thread, and the adjusting worm gear including a worm gear tooth, the worm gear tooth meshing with the worm thread, by rotating the adjusting worm, the worm thread being capable of driving the worm gear tooth to rotate about the rotation center line of the adjusting worm gear relative to the worm thread, to drive the beam to rotate, thereby adjusting a horizontal angle of the beam.

Optionally, the adjusting worm gear is fixedly connected to the bottom surface of the beam.

Optionally, the adjusting worm gear is fixedly connected to a lateral surface of the beam.

Optionally, the beam assembly further includes a mounting base, the beam being disposed in the mounting base;

one of the adjusting worm and the adjusting worm gear being mounted to the pedestal, and the other being mounted to the mounting base; and the pedestal being supported by the stand assembly.

Optionally, the pedestal is disposed on the top surface of the stand assembly.

Optionally, the mounting base forms a mounting channel through enclosure, the mounting channel being not closed but left with a gap, the beam being mounted in the mounting channel, and the gap being configured to facilitate the mounting of the beam in the mounting channel through the gap and facilitate removal of the beam from the mounting channel through the gap.

Optionally, the mounting base includes a first positioning mechanism, and the beam includes a second positioning mechanism matching the first positioning mechanism, the first positioning mechanism matching the second positioning mechanism to position the beam in the mounting base.

Optionally, the mounting base is provided with a fixing mechanism, the fixing mechanism pressing the beam against the mounting base in a direction at a preset angle to a horizontal direction, so that the beam is pressed against the bottom surface and one lateral surface of the mounting base, the preset angle being greater than 0 degrees and less than 90 degrees.

Optionally, the beam is provided with a fixing surface matching the fixing mechanism, and the fixing mechanism abuts against the fixing surface to press the beam against the mounting base.

Optionally, the preset angle is 30 degrees, 45 degrees or 60 degrees.

Optionally, the fixing mechanism is a fixing rod.

Optionally, the fixing rod includes at least one screw rod, so that the fixing rod can be screwed to press the beam against the mounting base.

Optionally, the fixing mechanism is a cam handle, the cam handle being mounted to the mounting base and being rotatable relative to the mounting base, to cause the cam handle to abut against the beam, so that the cam handle presses the beam against the bottom surface and the one lateral surface of the mounting base, or to cause the cam handle to be detached from the beam, so that the beam is removable from the mounting base.

The embodiments of the present invention further provide the following technical solutions:

a calibration bracket, including:

a base;

a fixed vertical rod, one end of the fixed vertical rod being mounted to the base;

a movable vertical rod, the movable vertical rod being disposed in the fixed vertical rod or sleeved on the fixed vertical rod, and being movable in a length direction of the fixed vertical rod relative to the fixed vertical rod; and a beam assembly supported by the movable vertical rod and including a foldable beam, the beam being configured to mount a calibration element.

Optionally, the movable vertical rod is movable only in the length direction of the fixed vertical rod relative to the fixed vertical rod.

Optionally, cross-sections of the fixed vertical rod and the movable vertical rod are non-circular.

Optionally, one of the fixed vertical rod and the movable vertical rod includes a guide rail, and the other is movable only in the length direction of the fixed vertical rod under guidance of the guide rail.

Optionally, the calibration bracket includes a driving mechanism, the driving mechanism being mounted to the fixed vertical rod and configured to drive the movable vertical rod to move in the length direction of the fixed vertical rod relative to the fixed vertical rod.

Optionally, one end of the fixed vertical rod is mounted to the base, and the movable vertical rod is sleeved on the fixed vertical rod from the other end of the fixed vertical rod.

The movable vertical rod is provided with a guide groove, the guide groove being disposed in a length direction of the movable vertical rod.

The driving mechanism includes a gear bearing, a screw rod, a driving gear and a handle, the handle passing through the guide groove and being slidable in the guide groove, one end of the handle being provided with a helical gear, the helical gear meshing with the driving gear and being rotatable about a first rotation axis to drive the driving gear to rotate;

the driving gear being sleeved on the screw rod, being in screw-thread fit with the screw rod, and being rotatable about a second rotation axis to drive the screw rod to move in the second rotation axis, the first rotation axis and the second rotation axis being mutually perpendicular to and intersecting each other;

the top end of the screw rod being fixed to the top of the movable vertical rod; and the gear bearing being sleeved on the driving gear and fixed to an inner wall of the fixed vertical rod, and the driving gear being rotatable about only the second rotation axis relative to the gear bearing.

Optionally, the movable vertical rod is disposed in the fixed vertical rod. The driving mechanism includes a gear reduction assembly.

Optionally, the movable vertical rod is disposed in the fixed vertical rod.

The driving mechanism is mounted to the fixed vertical rod and configured to drive the movable vertical rod to move in the length direction of the fixed vertical rod relative to the fixed vertical rod, and the driving mechanism includes a rack, a housing, a worm, a worm gear and a second transmission gear, the rack being fixedly mounted to the movable vertical rod, disposed in a length direction of the movable vertical rod, and forming the guide rail;

the housing being fixedly mounted to the fixed vertical rod;

the worm meshing with the worm gear;

the worm gear being fixedly mounted to the second transmission gear, a rotation axis of the worm gear overlapping with a rotation axis of the second transmission gear, and the worm gear and the second transmission gear being rotatable about a third rotation axis; and the second transmission gear being fixedly mounted to the housing and meshing with the rack, the third rotation axis being perpendicular to the rack.

Optionally, the movable vertical rod is disposed in the fixed vertical rod.

The calibration bracket includes a fastening mechanism and an elastic body, the fastening mechanism being mounted to the fixed vertical rod and configured to fix the movable vertical rod to the fixed vertical rod; and the elastic body being connected between the bottom of the fixed vertical rod and the movable vertical rod, and being in a compressed state when the movable vertical rod is at a lowest position.

Compared with the prior art, in the calibration bracket in this embodiment, the left beam portion and the right beam portion can respectively rotate toward each other relative to the connecting portion, to fold the beam assembly, so that a volume of the calibration bracket can be reduced to facilitate shipment.

The embodiments of the present invention further provide the following technical solutions:

a calibration bracket, including: a base; a stand assembly fixedly connected to the base; a foldable beam configured to mount a calibration element; a mounting base supported by the stand assembly, the beam being disposed in the mounting base; and a fixing mechanism, the fixing mechanism being mounted to the mounting base, and pressing the beam against the mounting base.

In some embodiments, the fixing mechanism includes a cam handle and a limiting rod, the cam handle being mounted to the mounting base, and being rotatable relative to the mounting base; the limiting rod being mounted to the mounting base and being movable relative to the mounting base, and one end of the limiting rod abutting against the cam handle; and when the cam handle rotates relative to the mounting base, the limiting rod moving relative to the mounting base, to cause the other end of the limiting rod to press the beam against the mounting base, or to cause the other end of the limiting rod to be detached from the beam, so that the beam is removable from the mounting base.

In some embodiments, the fixing mechanism further includes a hold-down spring, the hold-down spring being configured to keep one end of the limiting rod abutting against the cam handle.

In some embodiments, the mounting base is provided with a sliding groove, the limiting rod passing through the sliding groove.

In some embodiments, one end of the limiting rod is provided with a limiting portion, cross-sectional dimensions of the limiting portion being greater than cross-sectional dimensions of the sliding groove; and one end of the limiting rod abuts against the cam handle by using the limiting portion.

In some embodiments, a groove wall of the sliding groove is provided with an annular blocking portion, the limiting rod being sleeved on the annular blocking portion; and the hold-down spring is sleeved on the limiting rod and abuts between the annular blocking portion and the limiting portion.

In some embodiments, when the other end of the limiting rod presses the beam against the mounting base, the beam is pressed against the bottom surface and one lateral surface of the mounting base.

In some embodiments, the other end of the limiting rod is provided with a pressing portion, the pressing portion having a pressing inclined surface, the pressing inclined surface being inclined relative to the bottom surface of the mounting base; and the other end of the limiting rod presses the beam against the mounting base by using the pressing inclined surface.

In some embodiments, the pressing portion further has a pressing plane, the pressing plane being parallel to the bottom surface of the mounting base; and the other end of the limiting rod presses the beam against the mounting base by using the pressing inclined surface and the pressing plane.

According to another aspect, a calibration system is provided, including a calibration element and the foregoing calibration bracket, where the calibration element may be hung on the calibration bracket.

Compared with the prior art, a foldable beam and a fixing mechanism are used for pressing the beam against the mounting base, and the beam may be separated from a stand assembly as required, to facilitate movement of the calibration bracket.

The embodiments of the present invention further provide the following technical solutions, which can meet precise height control required for sensor calibration while facilitating the transportation.

A calibration bracket includes a base, a stand assembly and a beam assembly, the stand assembly including a fixed vertical rod, a movable vertical rod and a driving mechanism, one end of the fixed vertical rod being fixedly mounted to the base, the movable vertical rod being mounted to the fixed vertical rod and being telescopic relative to the fixed vertical rod, and the beam assembly being mounted to the movable vertical rod and configured to hang a calibration element. The driving mechanism includes: a unidirectional rotation assembly including a fixed support and a rotating member, the fixed support being fixedly mounted to the fixed vertical rod, and the rotating member being mounted to the fixed support and being rotatable about only a preset axis in a first rotation direction relative to the fixed support; a wrapping spring, the wrapping spring being sleeved on and wrapping the rotating member; a first revolving body, the first revolving body being mounted to the fixed support, rotatable about the preset axis relative to the fixed support, and configured to squeeze the wrapping spring, when the first revolving body squeezes the wrapping spring in the first rotation direction, the wrapping spring driving the rotating member to rotate, and when the first revolving body squeezes the wrapping spring in a second rotation direction, the wrapping spring loosening the rotating member and rotating relative to the rotating member, the second rotation direction being opposite to the first rotation direction; a second revolving body, the second revolving body being mounted to the first revolving body and being rotatable between a first position and a second position about the preset axis relative to the first revolving body, the second position being at one side of the first position facing the first rotation direction, and the second revolving body being configured to push the first revolving body to rotate, when the second revolving body rotates to the first position, the second revolving body being capable of pushing the first revolving body in the first rotation direction, when the second revolving body rotates to the second position, the second revolving body being capable of pushing the first revolving body in the second rotation direction, and when the second revolving body rotates to a position between the first position and the second position, and the second revolving body rotates in the second rotation direction, the wrapping spring abutting against the second revolving body to prevent the second revolving body from continuing to rotate; and a transmission assembly connected to the second revolving body and the movable vertical rod, when the second revolving body rotates in the first rotation direction, the second revolving body driving the movable vertical rod to rise through the transmission assembly, and when the first revolving body rotates in the second rotation direction, the second revolving body driving the movable vertical rod to fall through the transmission assembly.

In some embodiments, the wrapping spring includes a spiral portion and an abutting portion, the spiral portion being sleeved on and wrapping the rotating member; the abutting portion being connected to and protruding from the spiral portion, and the first revolving body being configured to squeeze the abutting portion; when the first revolving body squeezes the abutting portion in the first rotation direction, the spiral portion driving the rotating member to rotate, and when the first revolving body squeezes the abutting portion in the second rotation direction, the spiral portion loosening the rotating member and rotating relative to the rotating member; and when the second revolving body rotates to the position between the first position and the second position, and the second revolving body rotates in the second rotation direction, the abutting portion abutting against the second revolving body to prevent the second revolving body from continuing to rotate.

In some embodiments, the abutting portion includes a first abutting portion and a second abutting portion, both the first abutting portion and the second abutting portion being connected to and protruding from the spiral portion, and the first revolving body being configured to squeeze the first abutting portion or the second abutting portion; when the first revolving body squeezes the first abutting portion in the first rotation direction, the spiral portion driving the rotating member to rotate, and when the first revolving body squeezes the second abutting portion in the second rotation direction, the spiral portion loosening the rotating member and rotating relative to the rotating member; and when the second revolving body rotates to the position between the first position and the second position, and the second revolving body rotates in the second rotation direction, the first abutting portion abutting against the second revolving body to prevent the second revolving body from continuing to rotate.

In some embodiments, the second abutting portion is located on one side of the first abutting portion facing the first rotation direction.

In some embodiments, the first revolving body includes a first main revolving body and a stopping portion, the first main revolving body being mounted to the fixed support and being rotatable about the preset axis relative to the fixed support; the stopping portion being provided on one side of the first main revolving body facing the wrapping spring; and when the stopping portion squeezes the first abutting portion in the first rotation direction, the spiral portion driving the rotating member to rotate, and when the stopping portion squeezes the second abutting portion in the second rotation direction, the spiral portion loosening the rotating member and rotating relative to the rotating member.

In some embodiments, the stopping portion includes a first stopping portion and a second stopping portion, both the first stopping portion and the second stopping portion being provided on the one side of the first main revolving body facing the wrapping spring, the first stopping portion being configured to squeeze the first abutting portion, and the second stopping portion being configured to squeeze the second abutting portion; and when the first stopping portion squeezes the first abutting portion in the first rotation direction, the spiral portion driving the rotating member to rotate, and when the stopping portion squeezes the second abutting portion in the second rotation direction, the spiral portion loosening the rotating member and rotating relative to the rotating member.

In some embodiments, both the first abutting portion and the second abutting portion are located between the first stopping portion and the second stopping portion in the first rotation direction, the first stopping portion is closer to the first abutting portion, and the second stopping portion is closer to the second abutting portion.

In some embodiments, the second revolving body includes a second main revolving body and a limiting rod, the second main revolving body being mounted to the first revolving body and being rotatable about the preset axis relative to the first revolving body; the limiting rod being provided on one side of the second main revolving body facing the first revolving body, spanning the first revolving body, being located between the first abutting portion and the second abutting portion in the first rotation direction, and being configured to push the first revolving body to rotate; and when the second main revolving body rotates to the first position, the limiting rod being capable of pushing the first revolving body in the first rotation direction; when the second main revolving body rotates to the second position, the limiting rod being capable of pushing the first revolving body in the second rotation direction; and when the second main revolving body rotates to the position between the first position and the second position, and the second main revolving body rotates in the second rotation direction, the first abutting portion abutting against the limiting rod to prevent the second revolving body from continuing to rotate.

In some embodiments, the first revolving body is provided with an arc-shaped notch, the arc-shaped notch having a first end and a second end, and the limiting rod passing through the arc-shaped notch; and when the second main revolving body rotates to the first position, the limiting rod is located at the first end; when the second main revolving body rotates to the second position, the limiting rod is located at the second end; and when the second main revolving body rotates to the position between the first position and the second position, the limiting rod is located between the first end and the second end.

In some embodiments, the second end is located on one side of the first end facing the first rotation direction.

In some embodiments, the transmission assembly includes a traction rope, one end of the traction rope being wound around the second revolving body, and the other end of the traction rope being fixedly mounted to the movable vertical rod.

In some embodiments, the transmission assembly further includes a pulley, the pulley being mounted to the fixed vertical rod, and the other end of the traction rope being fixedly mounted to the fixed vertical rod via the pulley.

In some embodiments, the second revolving body includes a rope shaft body and a baffle, one end of the traction rope being wound around the rope shaft body, and the rope shaft body being rotatable about the preset axis relative to the first revolving body; and the baffle being provided at a tail end of the rope shaft body, and cross-sectional dimensions of the baffle being greater than horizontal axis surface dimensions of the rope shaft body.

In some embodiments, the baffle includes a first baffle and a second baffle, the first baffle being provided at one end of the rope shaft body close to the first revolving body, the second baffle being provided at the other end of the rope shaft body away from the first revolving body, and both cross-sectional dimensions of the first baffle and cross-sectional dimensions of the second baffle being both greater than the cross-sectional dimensions of the rope shaft body.

In some embodiments, the unidirectional rotation assembly is a ratchet assembly; and the rotating member is an internal meshing ratchet.

In some embodiments, the movable vertical rod is sleeved on the fixed vertical rod.

In some embodiments, the driving mechanism further includes a hand wheel, the hand wheel being fixedly mounted to the second revolving body, and the hand wheel and the second revolving body being rotatable together about the preset axis relative to the first revolving body.

A calibration system includes a calibration element and the foregoing calibration bracket, where the calibration element may be hung on the calibration bracket.

Compared with the prior art, in the calibration bracket in this embodiment, through the rotation of the first revolving body, the driving mechanism can drive the movable vertical rod to rise and fall relative to the fixed vertical rod, significantly reducing a height of the calibration bracket, facilitating transportation of the calibration bracket, and realizing accurate control of a height of a calibration target.

The embodiments of the present invention further provide the following technical solutions, which can resolve a technical problem in the prior art that some parts have relatively high requirements in machining accuracy.

A vertical rod assembly, including:

a base and a vertical rod assembly, the vertical rod assembly being mounted to the base;

the vertical rod assembly including: a fixed ball assembly, a floating ball assembly, an inner sleeve and an outer sleeve, the fixed ball assembly and the floating ball assembly being respectively fixedly mounted on an inner surface of the inner sleeve and being opposite to each other in the inner sleeve;

a part of the floating ball assembly protruding from an outer surface of the inner sleeve, and the protruding part of the floating ball assembly being elastically retractable or extendable and always abutting against the inner surface of the outer sleeve; and a part of the fixed ball assembly protruding from the outer surface of the inner sleeve, and the protruding part of the fixed ball assembly being not elastically retractable or extendable and abutting against the inner surface of the outer sleeve.

Optionally, cross-sectional shapes of the inner sleeve and the outer sleeve are the same; and when the cross-sectional shapes of the inner sleeve and the outer sleeve include at least three sides, there are at least two fixed ball assemblies, there is at least one floating ball assembly, and at least two of the fixed ball assemblies are respectively fixedly mounted on the continuously adjacent inner surfaces of the inner sleeve.

Optionally, the inner sleeve is provided with a first accommodation hole and a second accommodation hole, the fixed ball assembly being capable of partially penetrating the first accommodation hole and protruding from the outer surface of the inner sleeve; and the floating ball assembly being capable of partially penetrating the second accommodation hole and protruding from the outer surface of the inner sleeve.

Optionally, the fixed ball assembly includes a limiting ball, a fixed base and a mounting base, the mounting base being fixed to the inner surface of the inner sleeve, and the fixed base being fixedly received in the mounting base;

a part of the limiting ball being received in the fixed base, and the limiting ball being capable of rolling randomly at any angle in the fixed base without being detached from the fixed base; and the part of the limiting ball protruding from the outer surface of the inner sleeve and always abutting against the inner surface of the outer sleeve.

Optionally, the fixed base is provided with a rolling cavity, the part of the limiting ball being received in the rolling cavity; and the fixed base being provided with a fixed engaging portion at an edge of the rolling cavity, the fixed engaging portion engaging the limiting ball partially protruding from the outer surface of the inner sleeve with the outer surface of the inner sleeve.

Optionally, the floating ball assembly includes a floating ball, a support base, an elastic member and a pedestal, the pedestal being fixedly mounted on the inner surface of the inner sleeve;

the support base and the elastic member being accommodated at two opposite sides of the pedestal; one end of the elastic member being fixedly connected to the bottom of the support base, and the other end of the elastic member being fixedly connected to the pedestal;

a part of the floating ball being received in the support base, and the floating ball being capable of rolling randomly at any angle in the support base without being detached from the support base; and another part of the floating ball protruding from the outer surface of the inner sleeve, and the elastic member being capable of driving the support base to move in the pedestal, to cause the floating ball to always abut against the inner surface of the outer sleeve.

Optionally, one side of the pedestal is provided with a first accommodation cavity, and the other corresponding side of the pedestal is provided with a second accommodation cavity, the first accommodation cavity being in communication with the second accommodation cavity;

the support base being received in the first accommodation cavity; and the elastic member being received in the second accommodation cavity.

Optionally, both the first accommodation cavity and the second accommodation cavity are cylindrical cavities, a diameter of the first accommodation cavity is greater than a diameter of the second accommodation cavity, and an annular step is formed at a junction between the first accommodation cavity and the second accommodation cavity, the bottom of the support base being capable of abutting against the annular step.

Optionally, one end of the outer sleeve is provided with a fixing portion, the fixing portion being sleeved on the outer surface of the outer sleeve and configured to fix the inner sleeve to the outer sleeve when the inner sleeve moves to a preset fixing position on the outer sleeve.

Optionally, the calibration bracket includes a fastening mechanism and an elastic body, the fastening mechanism being mounted to the outer sleeve and configured to fix the inner sleeve to the outer sleeve when the inner sleeve moves to a preset fixing position on the outer sleeve; and the elastic body being connected between the bottom of the outer sleeve and the inner sleeve and being in a compressed state when the inner sleeve is at a lowest position.

Compared with the prior art, in the vertical rod assembly of the calibration bracket in this embodiment, the floating ball assembly is disposed in the inner sleeve. Since the floating ball assembly partially protruding from the outer surface of the inner sleeve can be elastically retracted or extended to always abut against the inner surface of the outer sleeve, the inner sleeve and the outer sleeve are always closely attached to each other without being stuck or loosened, which can greatly reduce machining accuracy of parts and achieve the mass production of devices.

The embodiments of the present invention further provide the following technical solutions:

a calibration bracket, including: a base; a stand assembly mounted to the base; and a support assembly, the support assembly including a beam, the beam being connected to the stand assembly and including at least two beam portions, adjacent beam portions in the at least two beam portions being foldably connected in a horizontal plane, and the beam being configured to support a calibration element, the calibration element being configured to calibrate a device in an auxiliary driving system of a vehicle.

In some embodiments, the adjacent beam portions are connected by using hinges, joints or rotating shafts.

In some embodiments, the beam is provided with a fastening portion, the fastening portion being configured to fix the connection between the adjacent beam portions when the beam is in an unfolded state.

In some embodiments, a width of the beam ranges from 10 centimeters (cm) to 15 cm.

In some embodiments, a load-bearing range of the beam is greater than 5 kilograms (kg).

In some embodiments, a width of the beam ranges from 12 cm to 13 cm, and the load-bearing range of the beam is greater than 6 kg.

In some embodiments, the beam is formed by plates through enclosure.

In some embodiments, the beam is mounted between an upper end and a lower end of the stand assembly or on the top of the stand assembly.

In some embodiments, the beam is detachably connected to the stand assembly.

In some embodiments, the support assembly further includes a hanger, the hanger being mounted to the beam and configured to hang the calibration element.

In some embodiments, the beam is provided with a guide structure, the guide structure being configured to guide the hanger to move in a length direction of the beam relative to the beam.

In some embodiments, the guide structure is a guide groove, the guide groove extending in the length direction of the beam; and the hanger includes a hanging portion and a sliding portion connected to the hanging portion, the hanging portion being configured to hang the calibration element, the sliding portion sinking into the guide groove and being movable in the guide groove in the length direction of the beam.

In some embodiments, the beam includes two sliding portions, the two sliding portions clamping the beam, and one of the sliding portions sinking into one of the guide grooves.

In some embodiments, the beam is provided with the two guide grooves, the two guide grooves being provided on two opposite sides of the beam and respectively sinking into the two guide grooves.

In some embodiments, the sliding portion is a roller, the roller being rotatable relative to the hanging portion.

In some embodiments, the hanger further includes a locking portion, the locking portion being capable of abutting against the beam in a preset direction, to cause the hanger to remain fixed to the beam, an included angle being formed between the preset direction and the length direction of the beam.

In some embodiments, the preset direction is perpendicular to the length direction of the beam.

In some embodiments, the locking portion is in screw-thread fit with the hanging portion, to cause the locking portion to approach or leave the beam in the preset direction.

In some embodiments, the support assembly further includes a supporting rod, the supporting rod being mounted to the beam and configured to support the calibration element.

In some embodiments, the supporting rod is detachably connected to the beam.

In some embodiments, one end of the supporting rod is provided with a limiting plate, cross-sectional dimensions of the limiting plate being greater than cross-sectional dimensions of the supporting rod, and the other end of the supporting rod is configured to support the calibration element; the beam is provided with a supporting rod seat, the supporting rod seat including a connecting wall and two limiting blocks, the two limiting blocks being spaced apart from each other in a horizontal direction, being both spaced apart from the beam in a vertical direction, and being both connected to the beam through the connecting wall; and the supporting rod is located between the two limiting blocks, and the two limiting blocks jointly support the limiting plate.

In some embodiments, the limiting plate and the limiting block are fixed by using bolts.

Compared with the prior art, in the calibration bracket in this embodiment of the present invention, the adjacent beams are connected in a folding manner in a horizontal plane, and after the beams are folded, the lengths of the beams are shortened, so that the calibration bracket is convenient to carry.

BRIEF DESCRIPTION OF THE DRAWINGS

One or more embodiments are described by way of example with reference to the corresponding figures in the accompanying drawings, and the exemplary descriptions do not constitute a limitation on the embodiments. Elements in the accompanying drawings having same reference numerals are represented as similar elements, and unless otherwise particularly stated, the figures in the accompanying drawings are not drawn to scale.

DETAILED DESCRIPTION

To facilitate the understanding of the present invention, the present invention is described below in more detail with reference to the accompanying drawings and specific embodiments. It is to be noted that, when an element is described to be "fixed to" another element, the element may be directly fixed on the another element, or there may be one or more intermediate elements therebetween. When an element is described to be "connected to" another element, the element may be directly connected to the another element, or there may be one or more intermediate elements therebetween. In the description of this specification, orientation or position relationships indicated by terms such as "up", "down", "inside", "outside", "vertical", and "horizontal" are based on orientation or position relationships shown in the accompanying drawings, and are merely used for ease of description of the present invention and for brevity of description, rather than indicating or implying that the mentioned apparatus or element needs to have a particular orientation or needs to be constructed and operated in a particular orientation, and therefore should not be understood as a limitation on the present invention. In addition, terms "first" and "second" are merely used for description and should not be understood as indicating or implying relative importance.

Unless otherwise defined, meanings of all technical and scientific terms used in the specification are the same as those usually understood by a person skilled in art of the present invention. Terms used in the specification of the present invention are merely for description of the specific embodiments, and are not intended to limit the present invention. A term "and/or" used in the specification includes any or all combinations of one or more related listed items.

In addition, the technical features involved in the different embodiments of the present invention described below may be combined with each other so long as they do not conflict with each other.

Figure 1:
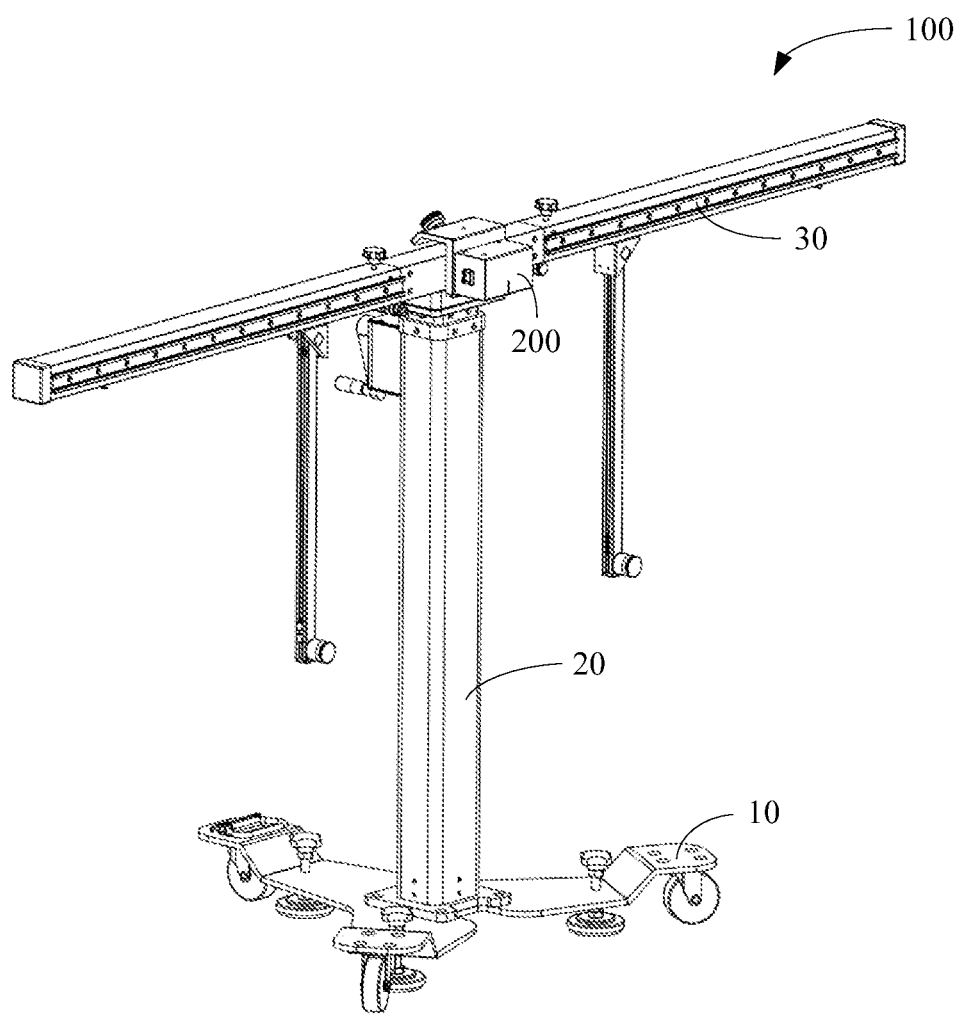
FIG. 1 is a three-dimensional view of a calibration bracket according to an embodiment of the present invention, where a multi-line laser is hung on the calibration bracket.
Figure 2:
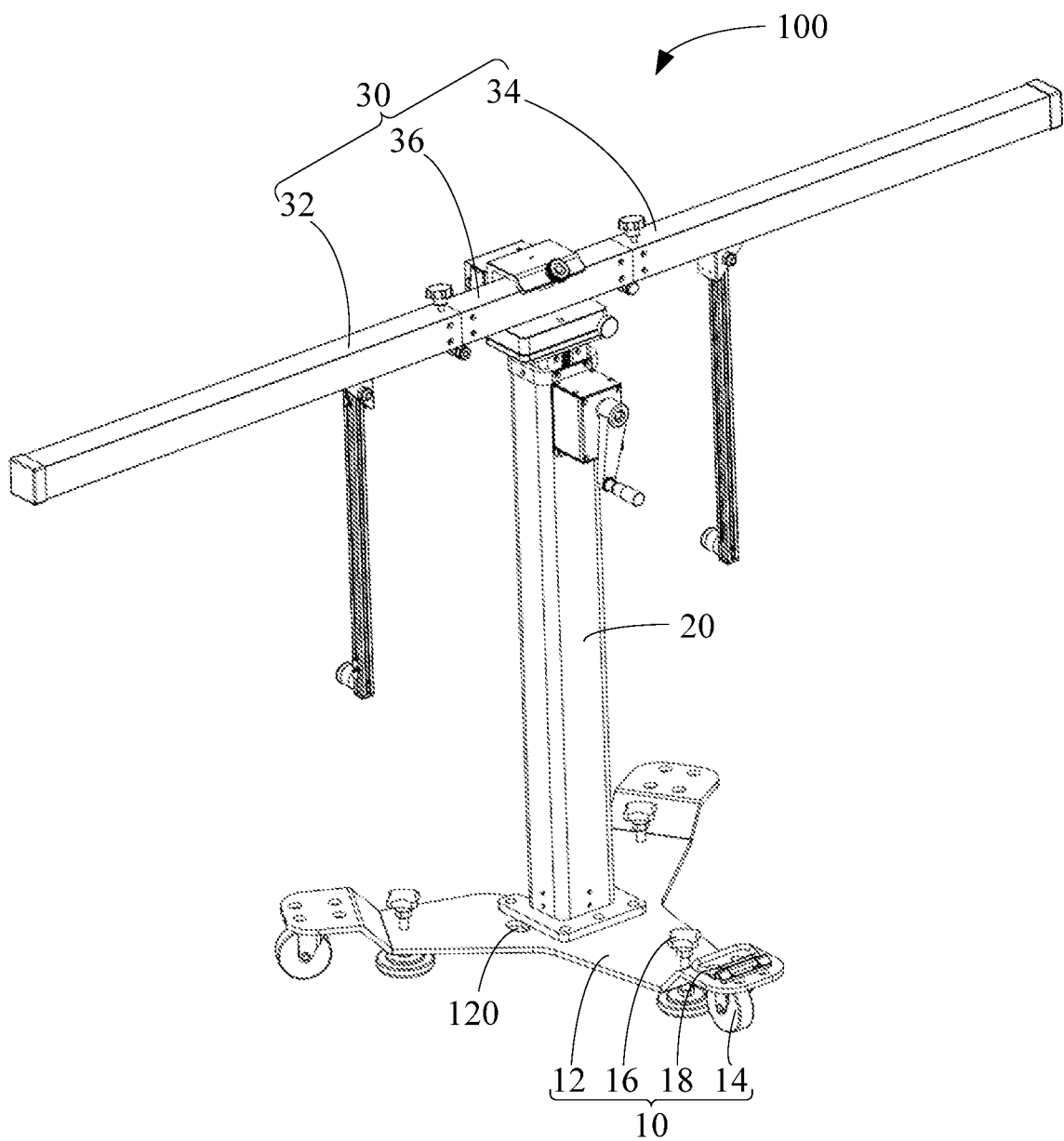
FIG. 2 is a three-dimensional view of the calibration bracket shown in FIG. 1 from another perspective.
Figure 3:
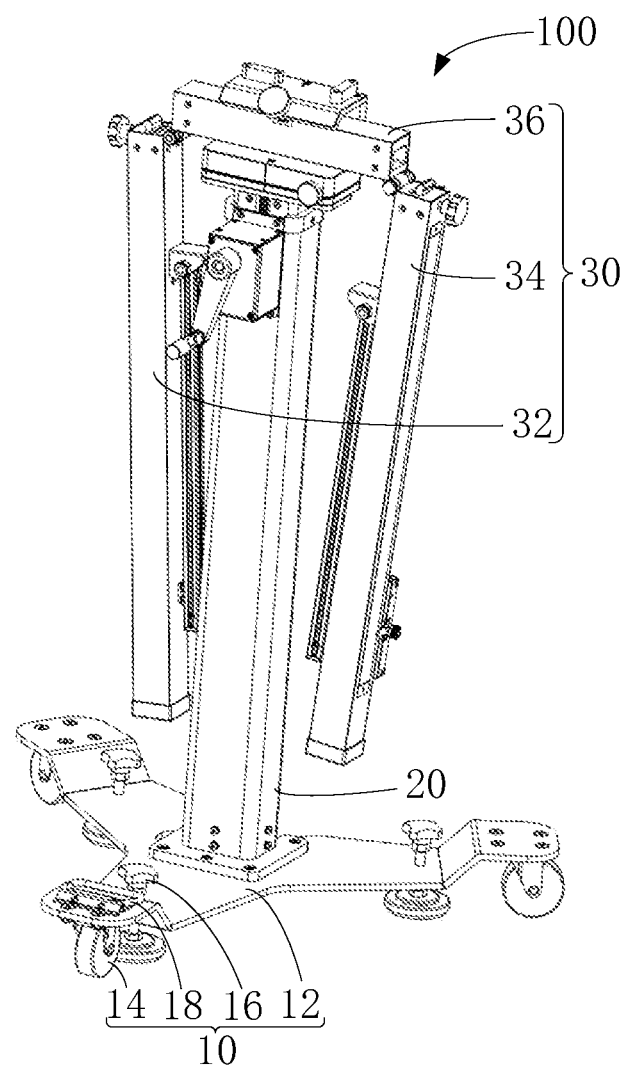
FIG. 3 is a three-dimensional view of the calibration bracket shown in FIG. 1, where a beam assembly of the calibration bracket is in a folded state.

Referring to FIG. 1, FIG. 2 and FIG. 3 together, a calibration bracket 100 provided in an embodiment of the present invention includes a base 10, a stand assembly 20 and a beam assembly 30. The stand assembly 20 is fixedly connected to the base 10. The beam assembly 30 includes a first beam portion 32, a second beam portion 34 and a connecting portion 36. The connecting portion 36 is mounted to the stand assembly 20. One end of the connecting portion 36 is hinged to the first beam portion 32, and the other end of the connecting portion 36 is hinged to the second beam portion 34. The first beam portion 32 and the second beam portion 34 can respectively rotate toward each other relative to the connecting portion 36, to fold the beam assembly 30. The first beam portion 32 and the second beam portion 34 can also respectively rotate away from each other relative to the connecting portion 36, to unfold the beam assembly 30.

In this embodiment, the first beam portion 32 is a left beam portion, and the second beam portion 34 is a right beam portion. For the convenience of description, "the left beam portion" and "the right beam portion" are used to indicate the foregoing first beam portion 32 and second beam portion 34 in the following. The expressions "left" and "right" are opposite to each other. In the description in this embodiment, the expressions "left" and "right" are determined facing the calibration bracket 100. It is to be understood that this is merely a component name change and does not involve a substantial change in the technical solutions.

In this specification, the expression "mount" means to fix or restrict an element or an apparatus to a specific position or place in a manner including welding, screwing, snapping, bonding, and the like. The element or the apparatus may keep still at the specific position or place or move within a limited range. The element or the apparatus can be disassembled or cannot be disassembled after being fixed or restricted to the specific position or place, which is not limited in the embodiments of the present invention. As shown in the figure, the connecting portion 36 is mounted to the stand assembly 20, but the connecting portion 36 may be supported by the stand assembly 20 in other manners. For example, the connecting portion 36 may be mounted to a suitable side of the stand assembly 20.

In the embodiments of the present invention, the expression "support" means to bear a weight of an element or an apparatus so that the element or device does not move downward due to a weight thereof.

The beam assembly 30 may be configured to hang a calibration element, for example, a multi-line laser 200, a calibration target, a radar reflection or absorption apparatus, and the like, to calibrate a vehicle-mounted driver assistant system.

In the calibration bracket 100 in this embodiment, the left beam portion 32 and the right beam portion 34 can respectively pivotally rotate relative to the connecting portion 36, to fold the beam assembly 30, so that a volume of the calibration bracket 100 can be reduced to facilitate shipment.

The left beam portion 32, the right beam portion 34 and the connecting portion 36 constitute a beam.

Optionally, the beam assembly is mounted on the top surface of a movable vertical rod. In this way, a center of gravity of the beam assembly is closer to a center of gravity of the vertical rod compared with a traditional calibration bracket, so that stability of the calibration bracket can be improved and a base with a smaller area can be used.

Optionally, the left beam portion 32 and the right beam portion 34 can rotate toward each other relative to the connecting portion 36, for example, can be folded downward, upward, forward, and backward together. Optionally, when the left beam portion 32 and the right beam portion 34 are folded downward, a length of the connecting portion 36 can be shorter, and the left beam portion 32 and the right beam portion 34 are in a drooping state. In this way, the beam assembly 30 does not need to be removed from the stand assembly 20, so that space occupied by the calibration bracket 100 can be significantly reduced, facilitating carrying by means of transportation. When the left beam portion 32 and the right beam portion 34 are folded upward, forward and backward, an apparatus for rotating the beam may be disposed, so that the left beam portion 32 and the right beam portion 34 are finally folded downward, or can be caused to be in a drooping state. Alternatively, the length of the connecting portion 36 may be caused to be relatively long, so that the left beam portion 32 and the right beam portion 34 can be placed close to the connecting portion 36 after being folded, and can be fixed onto the connecting portion 36 by using a releasable fixing apparatus. In the latter case, in order to further reduce the space occupied by the calibration bracket 100, the beam assembly 30 may be removed from the stand assembly 20 and then mounted to the stand assembly 20 after being carried to a required place.

A person skilled in the art may understand that the manner of folding the beam assembly 30 is not limited to the foregoing manners. For example, the beam may be folded into two sections, in which case there is no connecting portion 36. The beam may also be folded into four or more sections. However, three sections are preferred, because in this case a middle section of the beam has no fracture. In this way, the beam can be stably fixed onto the vertical rod by using only one fastening component at the middle section.

The following describes an implementation in which a beam to be folded backward is applied to the calibration bracket by way of example with reference to the accompanying drawings. It is to be noted that the following support assembly 30' may be understood as the beam assembly 30 in other embodiments.

Figure 4:
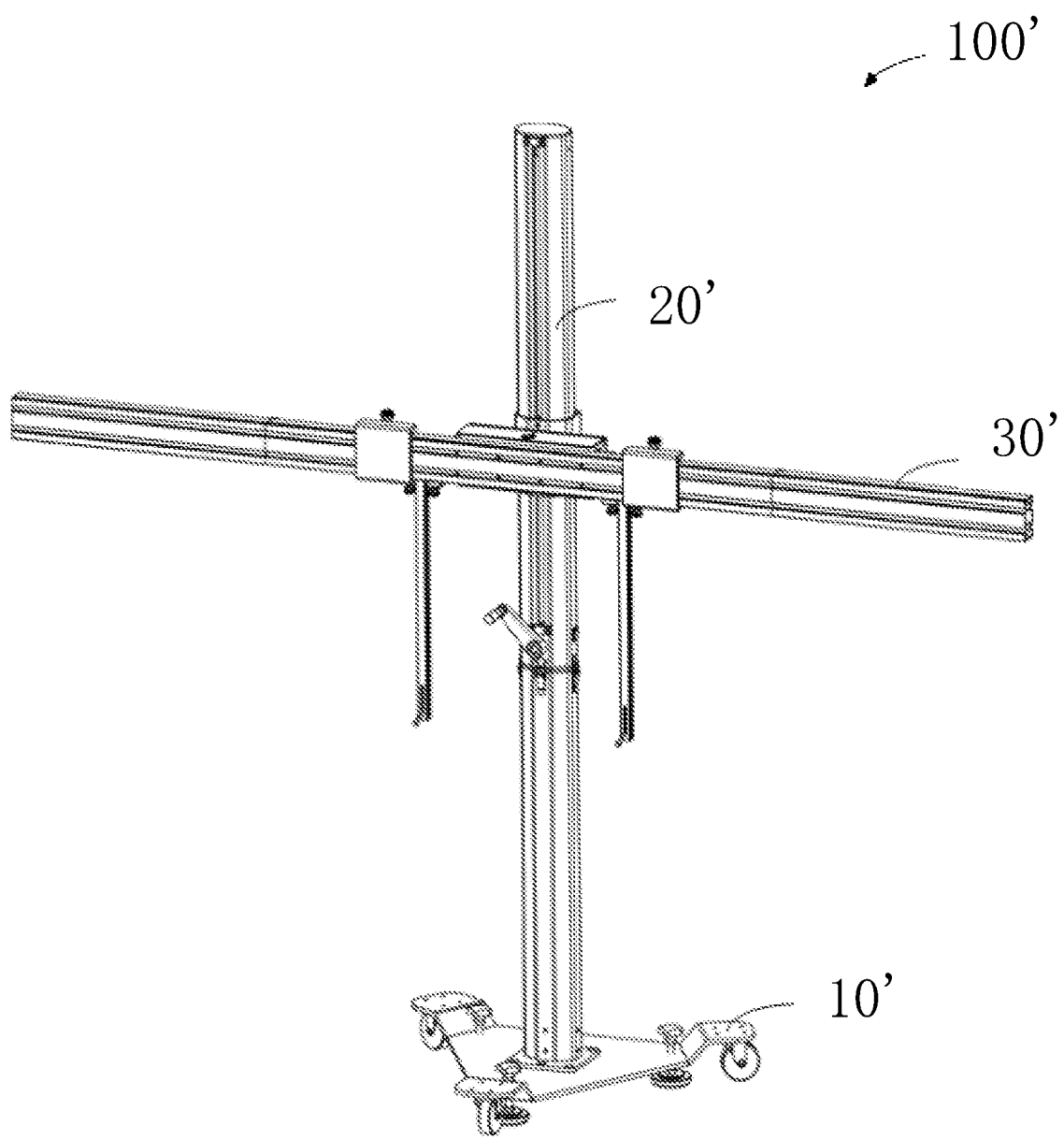
FIG. 4 is a three-dimensional view of a calibration bracket according to an embodiment of the present invention.
Figure 5:
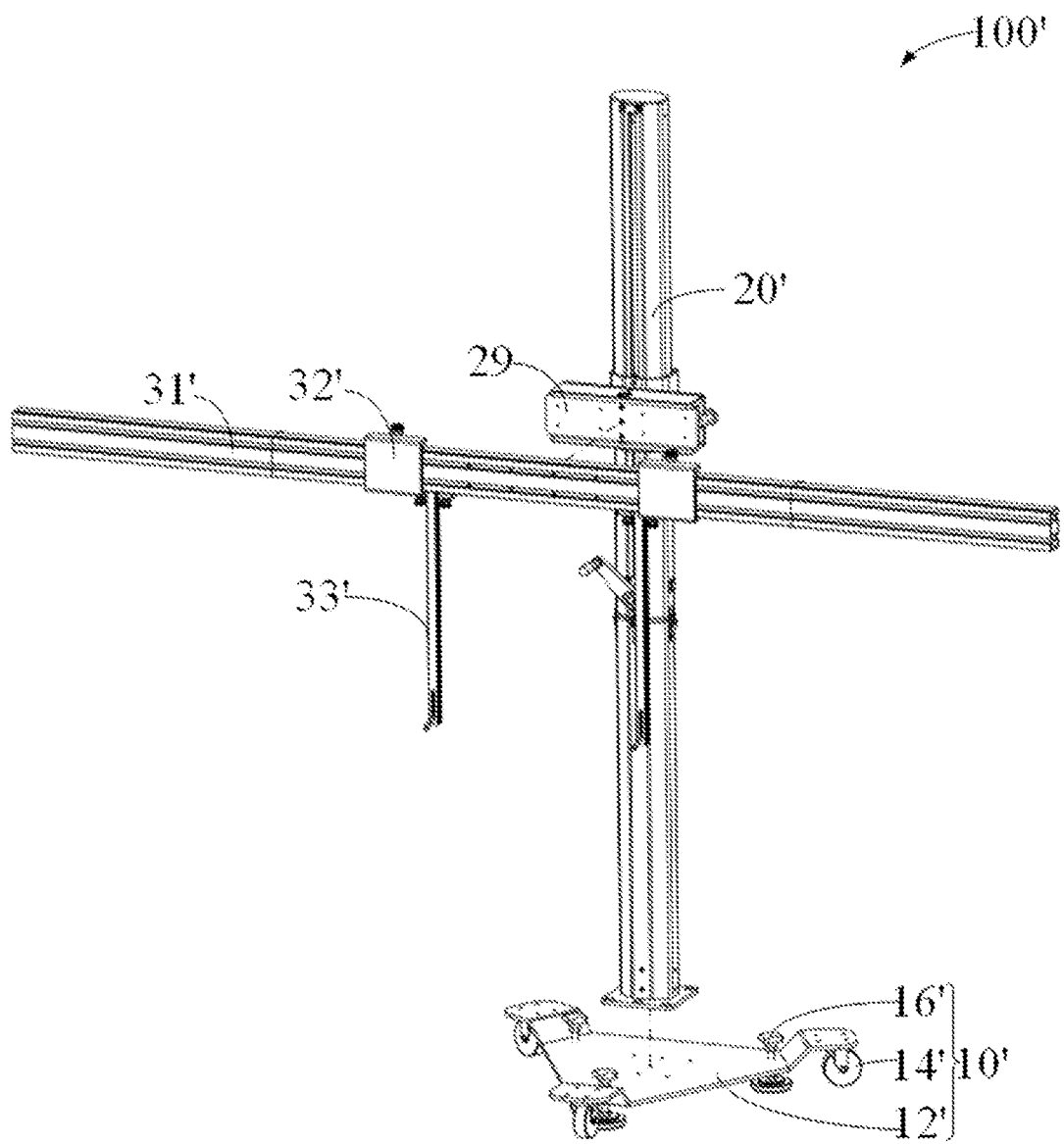
FIG. 5 is an exploded view of the calibration bracket shown in FIG. 4.
Figure 6:
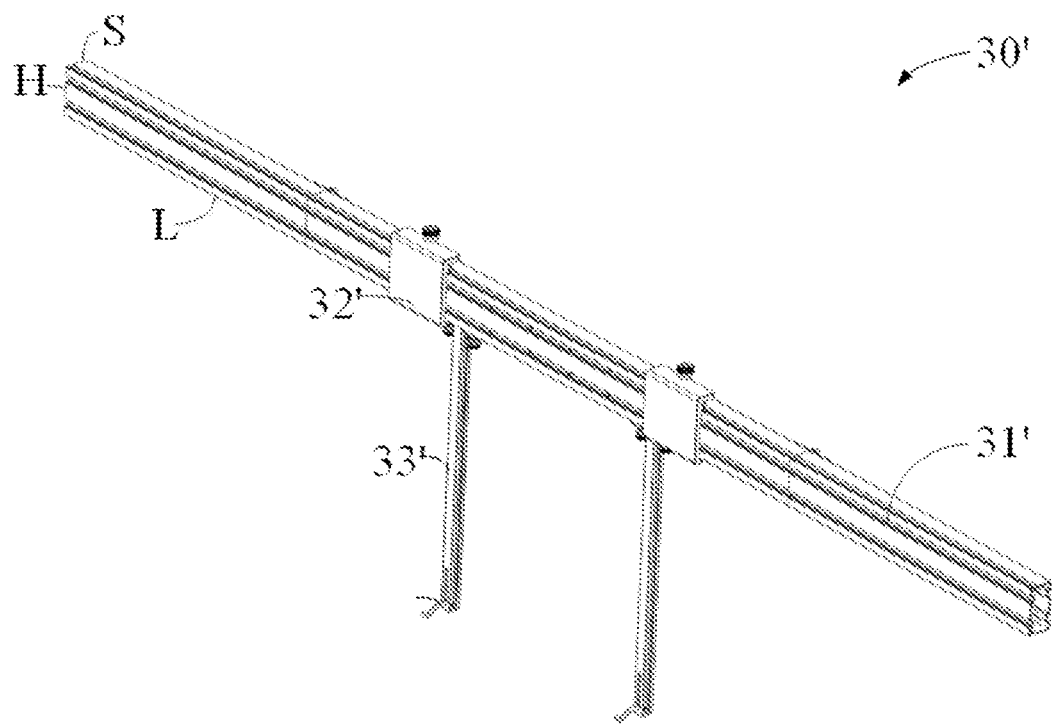
FIG. 6 is a three-dimensional view of a beam assembly of the calibration bracket shown in FIG. 4, where a beam of the beam assembly is in an unfolded state.

Referring to FIG. 4, FIG. 5 and FIG. 6 together, a calibration bracket 100' provided in an embodiment of the present invention includes a base 10', a stand assembly 20' and a support assembly 30'. The stand assembly 20' is fixedly connected to the base 10'.

The support assembly 30' includes a beam 31' connected to the stand assembly 20'. The beam 31' includes at least two beam portions 310'. Adjacent beam portions 310' in the at least two beam portions 310' are foldably connected in a horizontal plane, that is, one of the adjacent beam portions 310' is folded forward or backward relative to the other one. The beam 31' is configured to support a calibration element configured to calibrate a device in an auxiliary driving system of a vehicle. The adjacent beams 310' are foldably connected in the horizontal plane, so that after the beam 31' is completely folded, a length of the beam 31' is smaller. In addition, a width H (that is, a size in a vertical direction) and a thickness S (that is, a size in a length L direction of the horizontal and perpendicular to the beam 31') of the folded beam 31' are close to each other, facilitating transportation. In addition, compared with folding of the beam 31' in a non-horizontal plane, the width H of the beam 31' can be maximized while ensuring that the beam 31' maintains a constant volume (the volume is proportional to the mass), so that bending resistance of the beam 31' can be improved, thereby improving a bearing capacity of the beam 31'.

It is to be noted that folding the adjacent beams 310' in the horizontal plane means that both the adjacent beams 310' move in the horizontal direction, for example, rotate in the horizontal direction.

Three beam portions 310' may be understood as the left beam portion, the right beam portion and the connecting portion in the foregoing embodiment. The adjacent beam portions 310' refer to the left beam portion and the connecting portion or the right beam portion and the connecting portion. The left beam portion can pivot backward relative to the connecting portion, and/or the right beam portion can pivot backward relative to the connecting portion to reduce the transportation volume of the beam.

Figure 8:
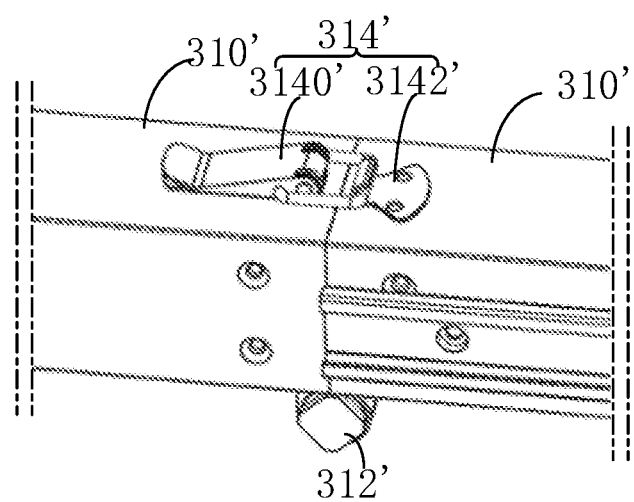
FIG. 8 is a partial enlarged view of the beam assembly shown in FIG. 6.

Referring to FIG. 8, in the calibration bracket 100' in this embodiment, the adjacent beam portions 310' are connected by using hinges 312'. According to actual conditions, the hinges 312' may be replaced with joints or rotating shafts, or any joint mechanism described in the embodiments of the present application.

In the calibration bracket 100' in this embodiment, the beam 31' is provided with a fastening portion 314'. The fastening portion 314' is configured to fix the connection between the adjacent beam portions 310' when the beam 31' is in an unfolded state. The fastening portion 314' includes a first buckle 3140' and a second buckle 3142'. The first buckle 3140' is hinged to one of the adjacent beam portions 310', and the second buckle 3142' is disposed on the other of the adjacent beam portions 310. The first buckle 3140' and the second buckle 3142' may be buckled with each other to fix the connection between the adjacent beam portions 310'.

For implementation of the fastening portion 314', reference may also be made to a locking mechanism in other embodiments.

In the calibration bracket 100' in this embodiment, the beam 31' is formed by plates through enclosure, which can reduce the mass of the beam 31' to reduce influence of the weight of the beam 31'.

In this embodiment, the width H of the beam 31' ranges from 10 cm to 15 cm.

A load-bearing range of the beam 31' is greater than 5 kg.

Further, the width H of the beam 31' ranges from 12 cm to 13 cm.

The load-bearing range of the beam 31' is greater than 6 kg.

Figure 9:
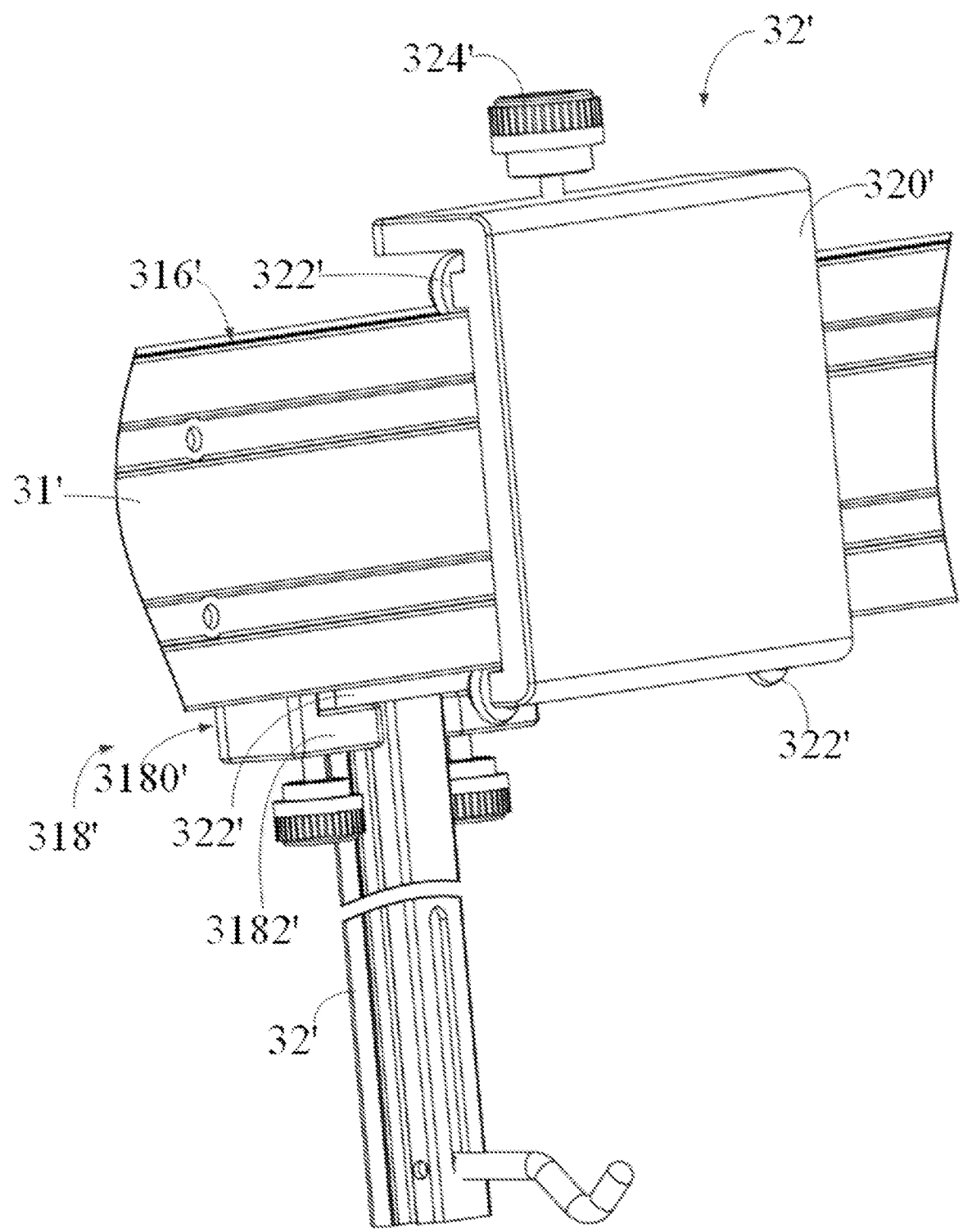
FIG. 9 is a partial enlarged view of the beam assembly shown in FIG. 6 from another perspective.

Referring to FIG. 9, the calibration elements may be directly hung on the beam 31' merely by means of bolting, and the like. However, most calibration elements have different structures due to different functions. For example, a calibration element such as a pattern plate is relatively large and may be hung by means of supporting. For another example, a calibration element such as a reflector is relatively small and may be hung on the beam 31' by using a hanger.

The support assembly 30' may further include a hanger 32'. The hanger 32' is mounted to the beam 31'. The hanger 32' is configured to hang the calibration element such as the reflector.

To facilitate calibration of a sensor on an automobile in the length L direction of the beam 31' by the calibration element and to facilitate alignment of the calibration element with the sensor, the hanger 32' is configured as movable in the length L direction of the beam 31' relative to the beam 31'. The beam 31' is provided with a guide structure. The guide structure is configured to guide the hanger 32' to move in a length L direction of the beam 31' relative to the beam 31'.

Specifically, the guide structure is a guide groove 316'. The guide groove 316' extends in the length L direction of the beam 31'. The hanger 32' includes a hanging portion 320' and a sliding portion 322' connected to the hanging portion 320'. The sliding portion 322' is movable in the guide groove 316' in the length L direction of the beam 31'. According to actual conditions, the guide structure may be replaced with a guide post. The guide post extends in the length L direction of the beam 31'. The sliding portion 322' may be replaced with a sliding sleeve, which is sleeved on the guide post. The sliding sleeve is movable in the length L direction of the beam 31' relative to the guide post.

Optionally, the beam 31' is provided with two guide grooves 316'. The two guide grooves 316' are provided on two opposite sides of the beam 31', and the two sliding portions 322' respectively sink into the two guide grooves 316', which can improve connection reliability between the hanger 32' and the beam 31'.

Optionally, the sliding portion 322' is a roller. The roller is rotatable relative to the hanging portion 320', which can reduce friction between the hanger 32' and the beam 31'.

Further, the hanger 32' may further include a locking portion 324'. The locking portion 324' can abut against the beam 31' in a preset direction, to cause the hanger 32' and the beam 31' to remain fixed. An included angle is formed between the preset direction and the length L direction of the beam 31'. After the calibration element is aligned with the sensor, the locking portion 324' abuts against the beam 31', so that the calibration element can be stably aligned with the sensor.

Preferably, the preset direction is perpendicular to the length L direction of the beam 31', so that the locking portion 324' can abut against the beam 31' in a forward direction. In this way, when the beam 31' moves leftward and rightward, the locking portion 324' can abut against the beam 31'.

Specifically, the locking portion 324' is in screw-thread fit with the hanging portion 320', so that the locking portion 324' can approach or leave the beam 31' in the preset direction. Through screw-thread fit, the locking portion 324' can firmly abut against the beam 31' while the locking portion 324' and the hanging portion 320' can be flexibly adjusted. According to actual conditions, the locking portion 324' may further abut against the beam 31' by using a spring.

Referring to FIG. 6 again, the support assembly 30' further includes a supporting rod 33'. The supporting rod 33' is mounted to the beam 31'. The supporting rod 33' is configured to support the calibration element.

Specifically, the supporting rod 33' is detachably connected to the beam 31'.

One end of the supporting rod 33' is provided with a limiting plate 330. Cross-sectional dimensions of the limiting plate 330' are greater than cross-sectional dimensions of the supporting rod 33'. The other end of the supporting rod 33' is configured to support the calibration element.

The beam 31' is provided with a supporting rod seat 318'. The supporting rod seat 318' includes a connecting wall 3180' and two limiting blocks 3182'. The two limiting blocks 3182' are spaced apart from each other in a horizontal direction. The two limiting blocks 3182' are both spaced apart from the beam 31' in a vertical direction. The two limiting blocks 3182 are both connected to the beam 31' through the connecting wall 3180'.

The supporting rod 33' is located between the two limiting blocks 3182', and the two limiting blocks 3182' jointly support the limiting plate 330'.

The limiting plate 330' and the limiting block 3182' are fixed by using bolts.

Figure 7:
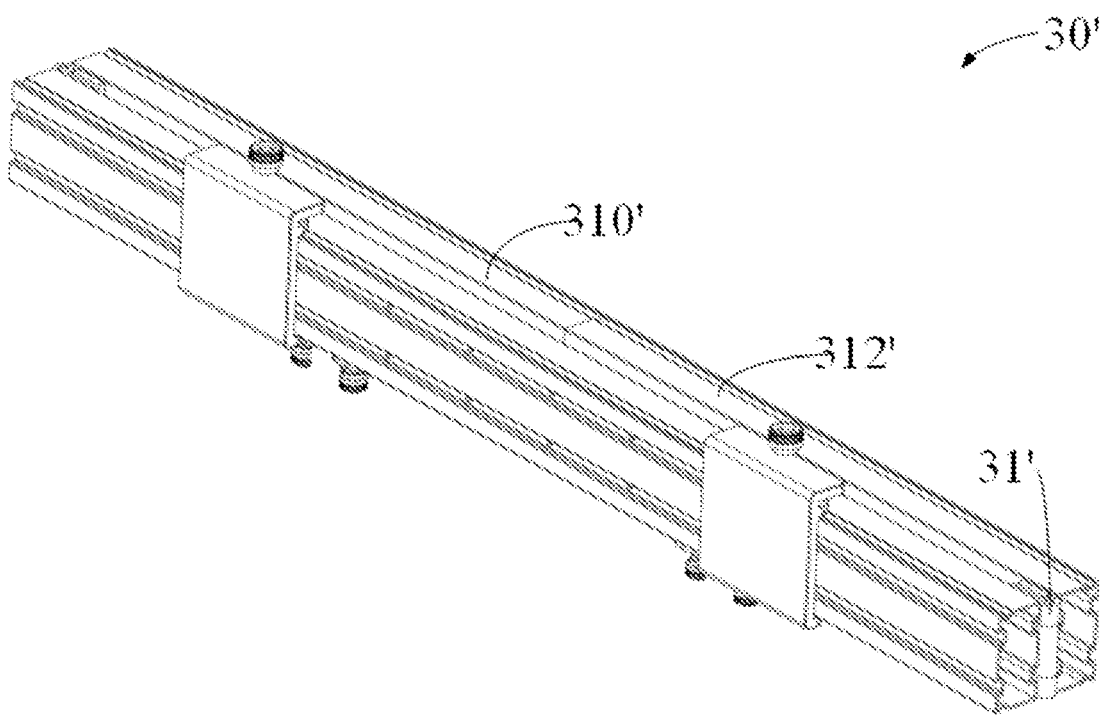
FIG. 7 is a three-dimensional view of a beam assembly of the calibration bracket shown in FIG. 4, where a beam of the beam assembly is in a folded state.

Referring to FIG. 7 and FIG. 8, the beam assembly 30' may further include a position adjustment mechanism 29. The position adjustment mechanism 29 includes a fixed plate 290, a movable support 292, a movable plate 294, an offset adjustment module 296 and a deflection adjustment module 298. The fixed plate 290 is fixedly mounted to the stand assembly 20, the movable support 292 is mounted to the fixed plate 290, the movable plate 294 is mounted to the movable support 292, and the beam 31 is fixedly mounted to the movable plate 294.

The movable support 292 can move in a preset direction O1 relative to the fixed plate 290. The preset direction O1 is perpendicular to a length direction of the stand assembly 20'. The offset adjustment module 296 is connected to the fixed plate 290 and the movable support 292. The offset adjustment module 296 is configured to drive the movable support 292 to move in the preset direction O1 relative to the fixed plate 290, thereby adjusting a horizontal position of the beam 31' relative to the stand assembly 20'.

The movable plate 294 can rotate about a preset axis O2 relative to the movable support 292. The preset axis O2 is parallel to the length direction of the first rod 22. The deflection adjustment module 298 is connected to the movable support 292 and the movable plate 294. The deflection adjustment module 298 is configured to drive the movable plate 294 to move in the preset axis O2 relative to the movable support 292, thereby adjusting the support assembly 30', that is, adjusting a horizontal orientation of the beam relative to the stand assembly 20'. The movable support 292 includes mounting walls 2920 and a support wall 2922. The two mounting walls 2920 are horizontal and opposite to each other, and the support wall 2922 is vertical and connected between the two mounting walls 2920.

A sliding block 2924 is fixed on one side of the support wall 2922 facing the fixed plate 290. The side of the fixed plate 290 facing the support wall 2922 is provided with a first bump 2900 and a second bump 2902 that are spaced apart from each other. A guide post 2904 extending in the preset direction O1 is connected between the first bump 2900 and the second bump 2902. The sliding block 2924 is sleeved on the guide post 2904, and the sliding block 2924 can move in the guide post 2904 relative to the fixed plate 290, thereby driving the movable support 292 to move together.

An adjustment rotation shaft 2926 is provided between the two mounting walls 2920. A rotation axis of the adjustment rotation shaft 2926 overlaps with the preset axis O2, and the movable plate 294 is fixedly mounted to the adjustment rotation shaft 2926.

The offset adjustment module 296 includes an adjusting block 2960, a first adjusting rod 2962, a first adjusting knob 2964 and a universal joint 2966.

The first adjusting rod 2962 extends in the preset direction O1, and one end of the first adjusting rod 2962 is only rotatably mounted to the first bump 2900. Specifically, a journal is provided at one end of the first adjusting rod 2962. The journal passes through the first bump 2900. The other end of the first adjusting rod 2962 is provided with a threaded structure. The adjusting block 2960 is fixedly mounted to the support wall 2922. The adjusting block 2960 is sleeved on the other end of the first adjusting rod 2962 and is in threaded connection to the other end of the first adjusting rod 2962. When the first adjusting rod 2962 rotates in the preset direction O1 relative to the fixed plate 290, the adjusting block 2960 moves in the preset direction O1 relative to the fixed plate 290, thereby driving the movable support 292 to move together.

The universal joint 2966 has an input end and an output end. The input end can rotate in any direction relative to the input end. The output end of the universal joint 2966 is fixedly mounted to one end of the first adjusting rod 2962. An included angle is formed between the input end and the output end. The input end is fixedly mounted to the first adjusting knob 2964 by passing through the fixed plate 290. When rotating, the first adjusting knob 2964 drives the first adjusting rod 2962 to rotate together by using the universal joint 2966.

It may be understood that the fixed plate 290 may be omitted. In other words, the movable support 292 is directly mounted to the stand assembly 20, and the offset adjustment module 296 is directly connected to the stand assembly 20 and the movable support 292. The offset adjustment module 296 is configured to directly drive the movable support 292 to move in the preset direction O1 relative to the stand assembly 20.

The deflection adjustment module 298 includes a second adjusting rod 2980, a second knob 2982 and an elastic member (not shown).

The second knob 2982 is fixedly mounted to one end of the second adjusting rod 2980, and the other end of the second adjusting rod 2980 passes through the support wall 2922 and abuts against the movable plate 294. The second adjusting rod 2980 is provided with a threaded structure. The second adjusting rod 2980 is in threaded connection to the support wall 2922. By screwing the second adjusting rod 2980, the other end of the second adjusting rod 2980 is advanced toward the movable plate 294, thereby deflecting the movable plate 294 in a forward direction. The elastic member may be a spring or a torsion spring. The elastic member is provided between the movable plate 294 and the support wall 2922, and is configured to provide an elastic force for the movable plate 294 to abut against the other end of the second adjusting rod 2980. On one hand, when the other end of the second adjusting rod 2980 retracts away from the movable plate 294, the movable plate 294 is deflected in a reverse direction by using the elastic force. On the other hand, after the second adjusting rod 2980 is screwed to a designated position, the movable plate 294 and the other end of the second adjusting rod 2980 are kept still by using the elastic force.

For other implementations of the deflection adjustment module 298, reference may be made to the adjustment mechanism described in some embodiments.

It may be understood that, in some other embodiments, the position adjustment mechanism 29 may be omitted, and the beam 31' is directly mounted to the stand assembly 20'.

The base 10' includes a base body 12', a roller 14', a height adjustment member 16' and a pull ring 18'.

The base body 12' has a triangular claw shape and includes three claws respectively extending in three different directions. The base body 12' may be made of a metal material.

The roller 14' is mounted to the bottom surface of the base body 12', and there may be three rollers 14. Each of the rollers 14' is mounted to a tail end of a corresponding one of the claws to facilitate movement of the base body 12'. In this embodiment, the roller 14' is a universal moving roller, so that the base body 12' can move in any direction.

The height adjustment member 16' is mounted to the base body 12' for adjusting a height of the base body 12. In this embodiment, the height adjustment member 16' is an adjustment knob, and there are three height adjustment members. There is at least one screw rod under the knob, and the screw rod is in screw-thread fit with a through hole at the base body 12' to implement height adjustment. Each of the height adjustment members 16' is mounted to a corresponding one of the claws and is close to a corresponding one of the rollers 14'. The three height adjustment members 16' are distributed in a regular triangle.

The pull ring 18' may be mounted on an upper surface of one of the claws to facilitate pulling of the calibration bracket 100'.

It may be understood that, in some other embodiments, a shape of the base body 12' may vary according to an actual demand, rather than be limited to a triangle claw shape. For example, the base body 12' may be a rectangle or a circle. Numbers of rollers 14' and height adjustment members 16' may be increased or reduced according to actual needs. For example, the base body 12' with the triangular claw shape may be provided with two height adjustment members and one foot with a fixed height, to adjust an angle of the base body 12'.

Compared with the prior art, in the calibration bracket 100' provided in the embodiments of the present invention, the adjacent beams 310' are connected in a folding manner in a horizontal plane. After the beam 31' is folded, the length of the beam 31' is shortened, facilitating carrying of the calibration bracket 100'.

Figure 12:
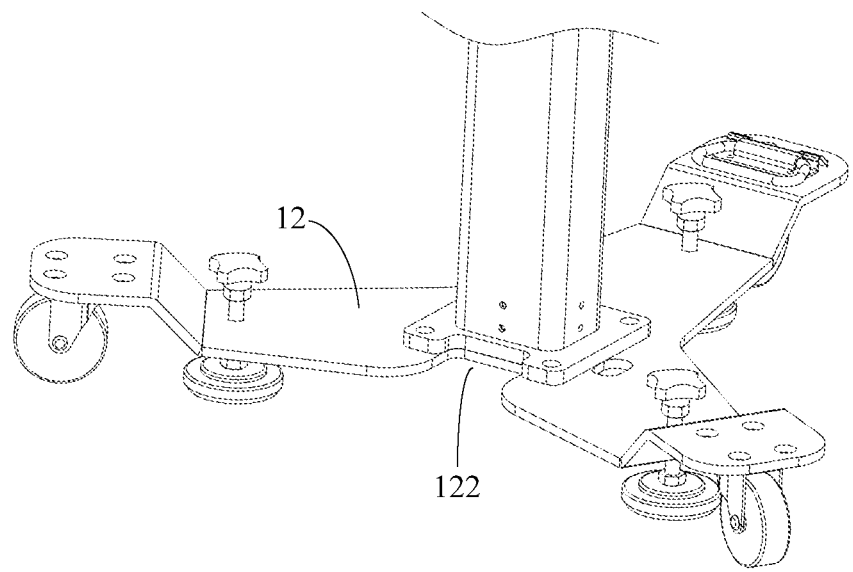
FIG. 12 is a partial three-dimensional view of the calibration bracket shown in FIG. 1.
Figure 13:
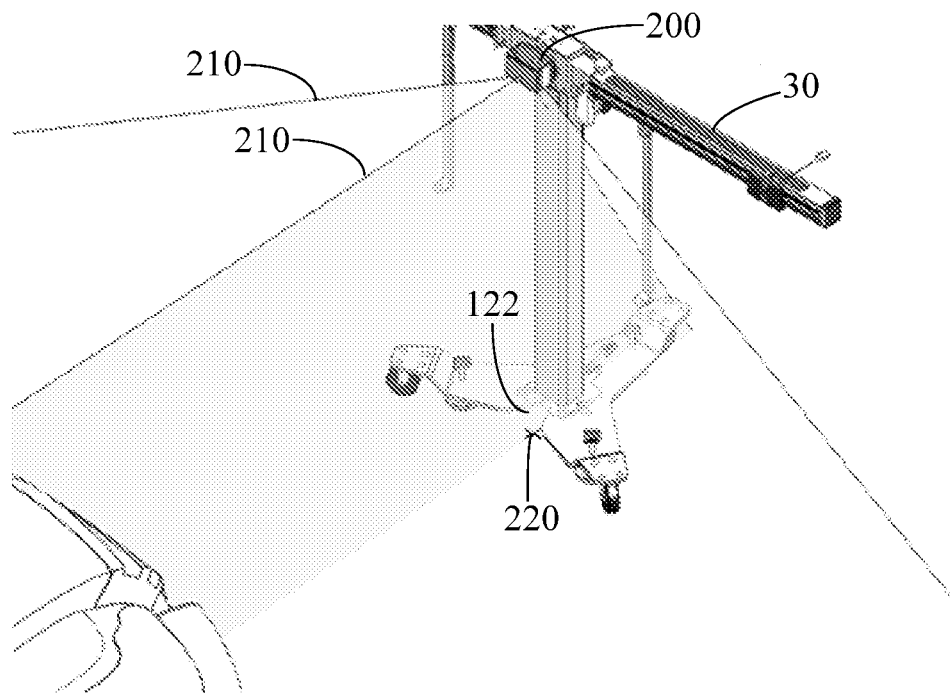
FIG. 13 is a schematic diagram of aligning a calibration system with an automobile by using a multi-line laser hung on the calibration bracket shown in FIG. 1.

In some embodiments, referring to FIG. 12, a base body 12 is further provided with a recess 122. The two claws are respectively located on two opposite sides of the recess 122 and are symmetrical about the recess 122. Referring to FIG. 13, during alignment of the calibration bracket 100 with an automobile, the multi-line laser 200 is mounted to the beam assembly 30. The multi-line laser 200 emits two sector-shaped rays of light 210 perpendicular to the ground and perpendicular to and intersecting each other. The two sector-shaped rays of light 210 penetrates the recess 122 to align with a cross mark 220 disposed on the ground. The base body 12 provided with the recess 122h has a simple structure and can further facilitate the alignment of the calibration bracket 100 with the automobile. It may be understood that the recess 122 is used in a situation in which an intersection point between two laser lines perpendicular to and intersecting each other is used to position the calibration bracket 100. When the base body 12 has other shapes, a recess or a hole may be similarly disposed at a corresponding position on the base body 12, so that the intersection point of laser lines used for positioning the calibration bracket 100 can aim at the ground.

Figure 14:
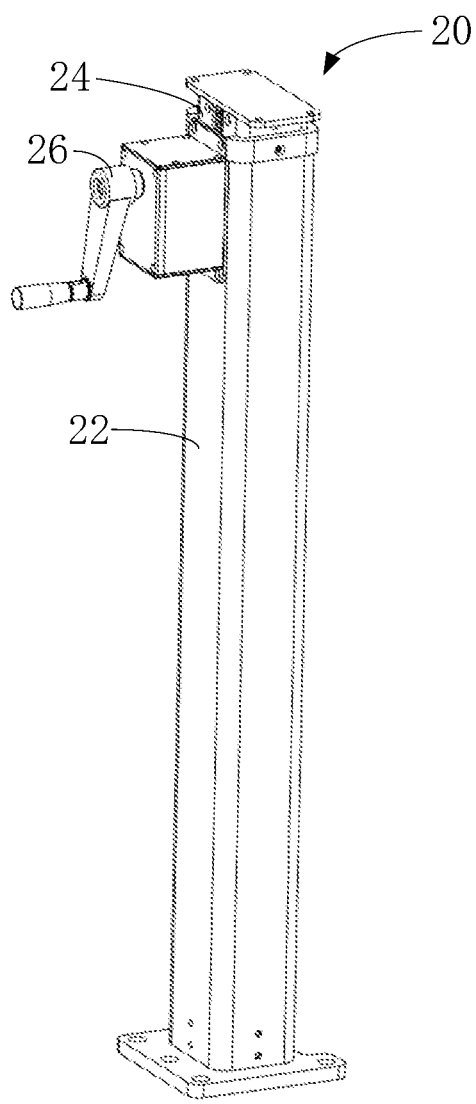
FIG. 14 is a three-dimensional view of a stand assembly of the calibration bracket shown in FIG. 1.
Figure 22:
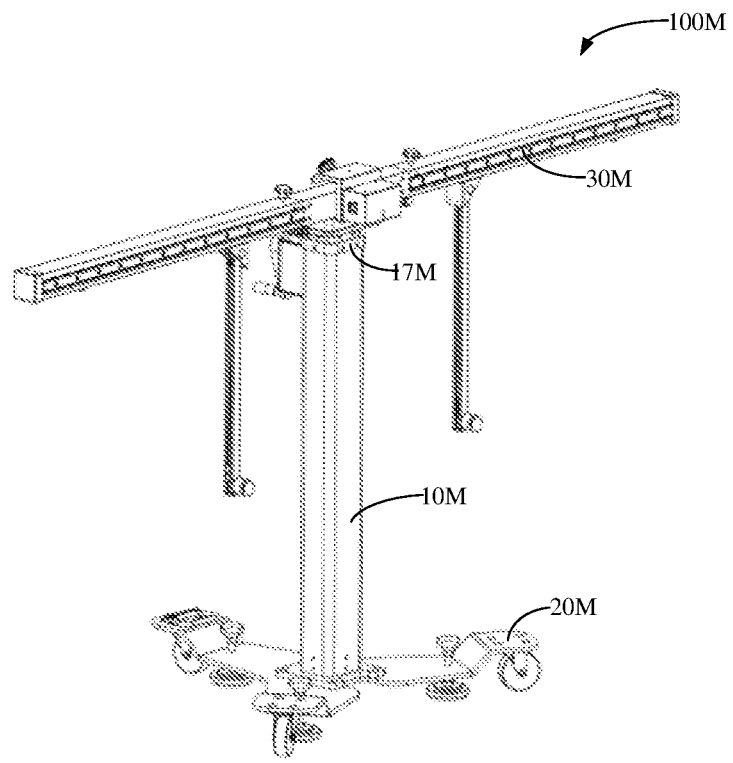
FIG. 22 is a three-dimensional view of a calibration bracket according to an embodiment of the present invention.

Referring to FIG. 14 and FIG. 22 together, the stand assembly 20 may include a fixed vertical rod 22, a movable vertical rod 24 and a driving mechanism 26. The movable vertical rod 24 is sleeved in the fixed vertical rod 22. The movable vertical rod 24 can move in a length direction of the fixed vertical rod 22 relative to the fixed vertical rod 22. The driving mechanism 26 is mounted to the fixed vertical rod 22 and configured to drive the movable vertical rod 24 to move in the length direction of the fixed vertical rod 22 relative to the fixed vertical rod 22.

The beam assembly 30 is mounted on the top surface of the movable vertical rod 24. In this way, a center of gravity of the beam assembly 30 is closer to a center of gravity of a stand assembly 20 compared with the traditional calibration bracket, so that stability of the calibration bracket can be improved and a base body 12 with a smaller area can be used.

By connecting the movable vertical rod 24 and the fixed vertical rod 22 in a sleeving manner, a height of the stand assembly 20 can be reduced to nearly half of an original height. In addition, the cross bar assembly 30 is folded, so that the stand assembly 20 can be very suitable to be carried in a trunk of a transportation means such as a vehicle.

It may be understood that the fixed vertical rod may also be used as an inner rod and the movable vertical rod as an outer rod as required. The driving mechanism 26 is mounted to the fixed vertical rod 22 and configured to drive the movable vertical rod 24 to move in the length direction of the fixed vertical rod 22 relative to the fixed vertical rod 22.

Optionally, the fixed vertical rod 22 and the movable vertical rod 24 are square tubes. The movable vertical rod 24 is closely sleeved in the fixed vertical rod 22, so that the movable vertical rod 24 can move only in the length direction of the fixed vertical rod 22 relative to the fixed vertical rod 22, and the movable vertical rod 24 can be prevented from moving in other directions relative to the fixed vertical rod 22. This configuration is very important for the calibration bracket 100 to be foldable, because during the calibration, a fixed relative position relationship between components of the calibration bracket 100 is required. For example, a laser may need to be fixed on an outer surface of the fixed vertical rod 22, and a center axis of the vehicle is positioned by using the laser, thereby determining a relative position between a target carried on the beam assembly 30 and the vehicle. Therefore, even a slight change in relative positions between the components affects calibration accuracy or requires an additional tuning mechanism for compensation. If the relative positions between the components change greatly, the additional tuning mechanism may fail. Therefore, in the sleeving mode, relative movement, such as relative rotation between the movable vertical rod 24 and the fixed vertical rod 22 other than relative movement in the length direction needs to be eliminated. A simple method is that both the movable vertical rod 24 and the fixed vertical rod 22 are square tubes, which can ensure that only relative movement in the length direction occurs therebetween.

It may be understood that, in some other embodiments, the fixed vertical rod 22 and the movable vertical rod 24 may also be tubes of other shapes, for example, tubes with polygonal cross-sections matching each other, so that the movable vertical rod 24 can move only in the length direction of the fixed vertical rod 22 relative to the fixed vertical rod 22, and can be prevented from moving in other directions relative to the fixed vertical rod 22. The expression "matching each other" herein does not necessarily require that the cross-sections of the fixed vertical rod 22 and the movable vertical rod 24 need to be the same. For example, the cross-section of the fixed vertical rod 22 disposed outside may be hexagonal, and the cross-section of the movable vertical rod 24 disposed inside may be a quadrilateral connected to the hexagon, which can also cause the movable vertical rod 24 to only move only in the length direction of the fixed vertical rod 22 relative to the fixed vertical rod 22. The cross-sections of the fixed vertical rod 22 and the movable vertical rod 24 may also be elliptical cylindrical tubes matching each other. The elliptical cross-section can also restrict the relative rotation between the fixed vertical rod and the movable vertical rod to a specific extent.

When cross-sections of the fixed vertical rod and the movable vertical rod are non-circular, it means that an entire tube wall of the fixed vertical rod serves as a guide rail to guide a moving direction of the movable vertical rod.

The fixed vertical rod 22 and the movable vertical rod 24 may also be cylindrical tubes with a circular cross-section. In this case, the fixed vertical rod 22 can be prevented, by using a guide mechanism, from rotating relative to the movable vertical rod 24. The guide mechanism is configured to guide the movable vertical rod 24 to move stably relative to the fixed vertical rod 22. Alternatively, a mechanism for detecting and adjusting the movement of the fixed vertical rod 22 relative to the movable vertical rod 24 in other directions other than the length direction is additionally disposed on other components of the calibration bracket 100. A simple guide mechanism is a guide rail and a slider apparatus matching the guide rail. The guide mechanism may be provided on a surface at which the fixed vertical rod 22 is in contact with the movable vertical rod 24. A guide rail is disposed on one of the fixed vertical rod and the movable vertical rod, and a slider apparatus such as a bump, a plastic rubber strip, a roller, a ball, a gear, and the like is disposed on the other. In this case, the slider apparatus is restricted to move on the guide rail, and it can also be ensured that only the relative movement in the length direction occurs between the two vertical rods. The guide rail may be a groove, a linear protrusion, a rack, and the like additionally disposed on the tube wall of the vertical rod, or may be a groove, a linear protrusion, a groove formed between two linear protrusions, and the like formed by the tube wall of the vertical rod. In other words, the vertical rod uses a special-shaped tube wall, and the tube wall has a part that can be used as the guide rail, such as a groove, a linear protrusion, and the like. Similarly, the slider apparatus may be an additional component that is additionally disposed on the tube wall of the vertical rod, or may be a protruding structure formed by the tube wall of the vertical rod without a need to dispose additional components on the tube wall of the vertical rod. In addition, a mechanism that achieves transmission through meshing such as a rack also has a guiding effect, which is also classified into a guide rail category in this specification. Transmission mechanisms such as a gear and a rack described in the following embodiments can also achieve a guiding effect. Optionally, the rack may be disposed in the groove guide rail.

It may be understood that positions for disposing the guide rail and the slider apparatus may be transposed. The guide rail may be disposed on the movable vertical rod, and the slider apparatus may be disposed on the fixed vertical rod, or the positions for disposing the guide rail and the slider apparatus may be transposed.

It may be understood that the guide mechanism is not limited to being used for the fixed vertical rod 22 and the movable vertical rod 24 with a circular cross-section. The fixed vertical rod 22 and the movable vertical rod 24 with other cross-sectional shapes may also use the guide mechanism to enhance a guiding effect and obtain more stable or less frictional relative movement. For non-circular cross-sectional shapes, the guide rail may also not be used, but only a linear motion apparatus is used to obtain more stable or less frictional relative movement. In this case, the non-circular external vertical rod plays a guiding role.

It may be understood that, in addition to the guide rail and the slider apparatus, the connection between the fixed vertical rod 22 and the movable vertical rod 24 may also be implemented in other manners.

A connection structure between the fixed vertical rod and the movable vertical rod is described in detail with reference to the accompanying drawings. In the following description, the fixed vertical rod 22 may be referred to as an "outer sleeve" and the movable vertical rod 24 may be referred to as an "inner sleeve".

Figure 15:
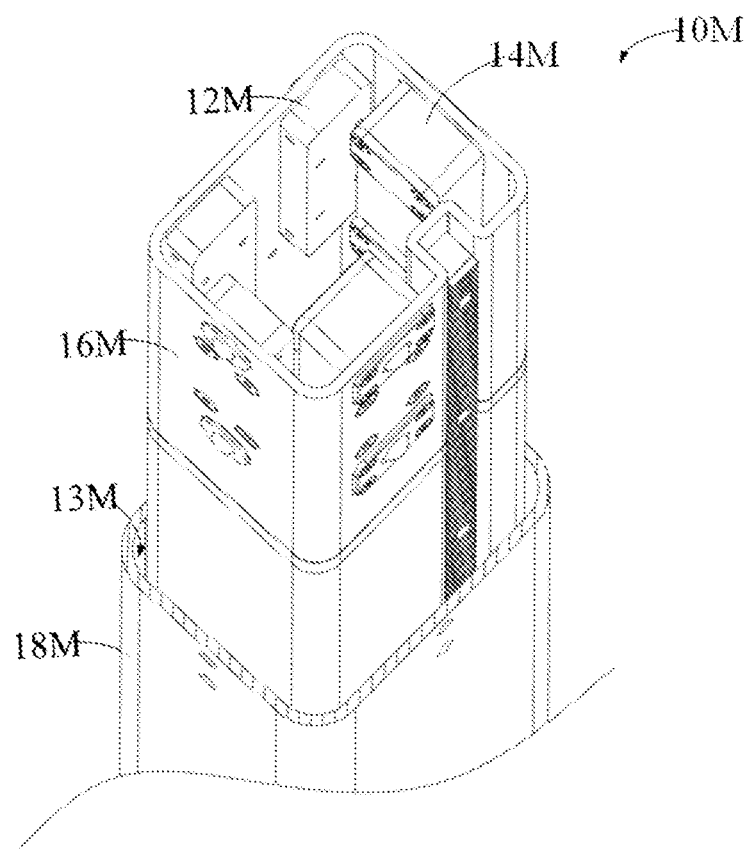
FIG. 15 is a three-dimensional view of a vertical rod assembly, which may also be referred to as of a stand assembly according to an embodiment of the present invention.
Figure 16:
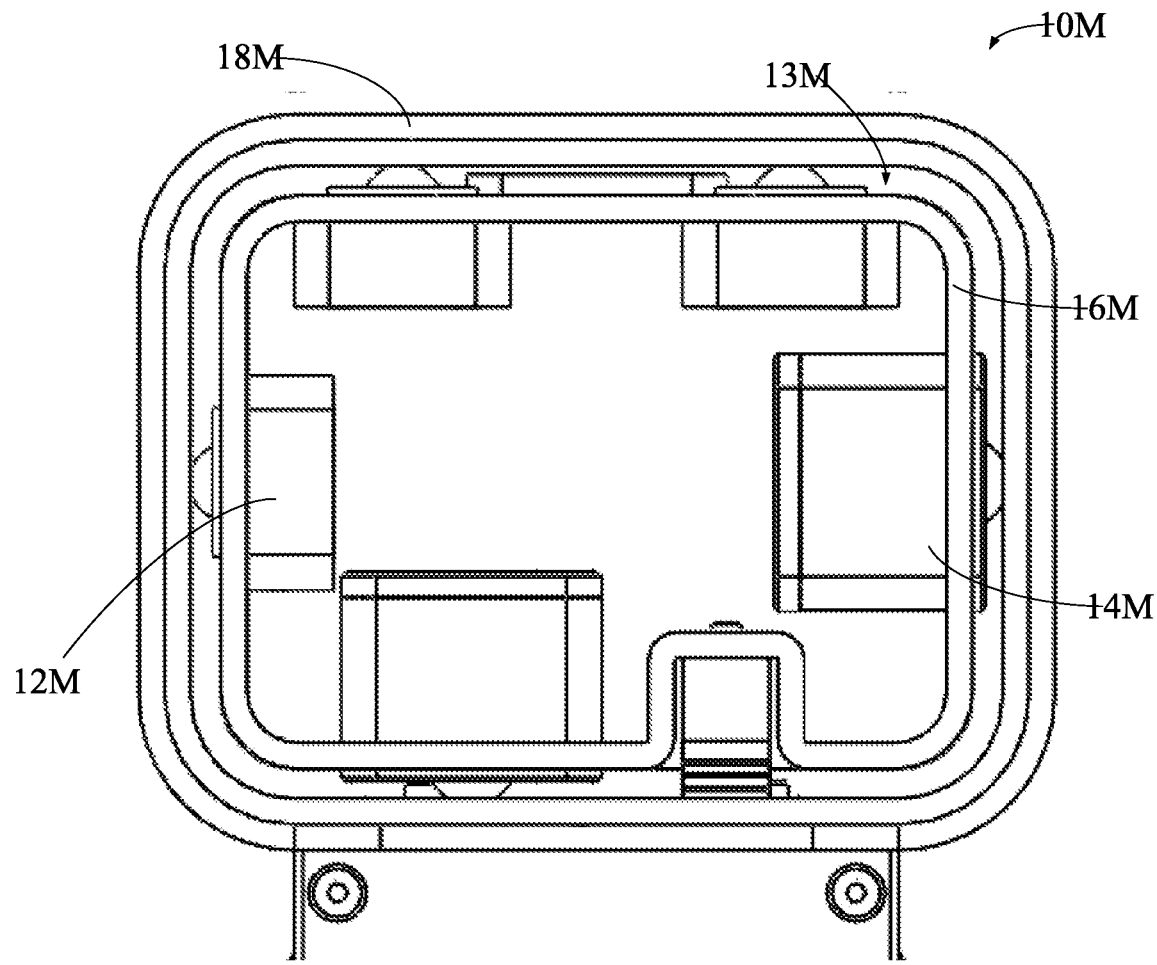
FIG. 16 is a top view of the vertical rod assembly shown in FIG. 15.

Referring to FIG. 15 and FIG. 16 together, an embodiment of the present invention provides a vertical rod assembly 10M, including a plurality of fixed ball assemblies 12M, a plurality of floating ball assemblies 14M, an inner sleeve 16M and an outer sleeve 18M. The inner sleeve 16M is sleeved in the outer sleeve 18M, and the inner sleeve 16M is movable in a length direction of the outer sleeve 18M relative to the outer sleeve 18M. The plurality of fixed ball assemblies 12M and the plurality of floating ball assemblies 14M are respectively fixedly mounted in the inner sleeve 16M. Each of the fixed ball assemblies 12M partially protrudes from an outer surface of the inner sleeve 16M, and the partially protruding fixed ball assembly 12M is not elastically retractable or extendable. Each of the floating ball assemblies 14M partially protrudes from the outer surface of the inner sleeve 16M, and the partially protruding floating ball assembly 14M is elastically retractable or extendable and always abuts against an inner surface of the outer sleeve 18M. The fixed ball assembly 12M and the floating ball assembly 14M are respectively located on two opposite sides of the inner sleeve 16M. During mounting, the protruding part of the fixed ball assembly 12M abuts against one side of the outer sleeve 18M, and the protruding part of the floating ball assembly 14M abuts against the opposite side of the outer sleeve 18. The protruding part of the fixed ball assembly 12M is not retractable or extendable, and therefore can play a positioning role during the mounting, and the protruding part of the floating ball assembly 14M is retractable or extendable and therefore facilitates sleeving of the outer sleeve 18M in the inner sleeve 16M, thereby facilitating the mounting. In addition, since the protruding parts of the fixed ball assembly 12M and the floating ball assembly 16M always abut against the inner surface of the outer sleeve 18M, a gap between the inner sleeve 16M and the outer sleeve 18M can be eliminated, thereby avoiding violent shaking. Each of the floating ball assemblies 14M partially protrudes from the outer surface of the inner sleeve 16M, and the partially protruding floating ball assembly 14M is elastically retractable or extendable and always abuts against the inner surface of the outer sleeve 18, so that the inner sleeve 16M is always closely attached to the outer sleeve 18M without being stuck or loosened, which can greatly reduce machining accuracy of the inner sleeve and the outer sleeve, thereby achieving mass production. The matching between the fixed ball assembly and the floating ball assembly can not only ensure that the inner sleeve 16M is always closely attached to the outer sleeve 18M to maintain stable relative movement between the inner sleeve 16M and the outer sleeve 18M, but also ensure smooth movement of the vertical rod assembly during extension and retraction to improve user experience.

The inner sleeve 16M and the outer sleeve 18M are both square tubes, which belong to a square tube type. The outer sleeve 18M is sleeved on the inner sleeve 16M, and an inner diameter of the outer sleeve 18M is greater than an inner diameter of the inner sleeve 16M, so that a gap 13M is left between the outer sleeve 18M and the inner sleeve 16M. The gap 13M is configured to accommodate the fixed ball assembly 12M and the floating ball assembly 14M that partially protrude from the outer surface of the inner sleeve 16M.

In some embodiments, the inner sleeve 16M and the outer sleeve 18M may be set to tubes of other shapes as required. For example, the inner sleeve 16M and the outer sleeve 18M both have cylindrical shapes. In this case, a fixed ball assembly and a floating ball assembly may be respectively disposed at two ends of the inner diameter of the inner sleeve 16M. Alternatively, cross-sectional shapes of the outer sleeve 18M and the inner sleeve 16M include at least three sides, that is, the cross-sectional shapes may be arbitrary polygons, for example, a trilateral, a quadrilateral, a pentagonal, or the like. The shapes of the inner sleeve 16M and the outer sleeve 18M may be the same or different. In some embodiments, in order to cause the inner sleeve 16M to move only in a length direction of the outer sleeve 18M relative to the outer sleeve 18M, and to prevent the inner sleeve 16M from moving in other directions relative to the outer sleeve 18M, cross-sections of the outer sleeve 18 and the inner sleeve 16M are polygonal tubes matching each other. The expression "matching each other" herein does not necessarily require that the cross-sections of the outer sleeve 18M and the inner sleeve 16M need to be the same. For example, the cross-section of the outer sleeve 18M disposed outside may be hexagonal, and the cross-section of the inner sleeve 16M disposed inside may be a quadrilateral connected to the hexagon, which can also cause the inner sleeve 16M to move only in the length direction of the outer sleeve 18M relative to the outer sleeve 18M. The cross-sections of the outer sleeve 18 and the inner sleeve 16M may also be elliptical cylindrical tubes matching each other. The elliptical cross-section can also restrict the relative rotation between the fixed vertical rod and the movable vertical rod to a specific extent.

Numbers of fixed ball assemblies 12M and floating ball assemblies 14M to be disposed on the inner sleeve may be related to the shape of the inner sleeve 16M. For example, when the cross-section of the inner sleeve 16M is circular, the fixed ball assembly 12M and the floating ball assembly 14M opposite to each other may be respectively disposed at two ends of one inner diameter. Alternatively, the fixed ball assembly 12M and the floating ball assembly 14M opposite to each other are disposed at each end of two inner diameters perpendicular to each other, to ensure stable relative sliding between the inner sleeve 16M and the outer sleeve 18M. When the cross-section of the inner sleeve 16M is square, fixed ball assemblies 12M are disposed on two adjacent sides, and floating ball assemblies 14M are disposed on the other two sides. When the cross-section of the inner sleeve 16M is triangular, fixed ball assemblies 12 are disposed on two of the sides, and the floating ball assembly 14M is disposed on the other side, or the fixed ball assembly 12M is disposed on one of the sides, and the floating ball assemblies 14M are disposed on the other two sides. The numbers of the fixed ball assemblies 12M and the floating ball assemblies 14 are not limited herein.

In order to ensure close attachment between the inner sleeve 16M and the outer sleeve 18M, a height of the fixed ball assembly 12M is the same as a height of the floating ball assembly 14M opposite to the fixed ball assembly.

The opposite positions of the fixed ball assembly 12M and the floating ball assembly 14M in the embodiments of the present application may mean that the fixed ball assembly 12M and the floating ball assembly 14M have the same height and are located on two opposite sides of the same cross-section of the inner sleeve 16M. Alternatively, the opposite positions of the fixed ball assembly 12M and the floating ball assembly 14M only mean that the two assemblies are located on two opposite sides of the same cross-section of the inner sleeve 16M.

The inner sleeve 16M is provided with a plurality of first accommodation holes and a plurality of second accommodation holes. Each of the fixed ball assemblies 12M may partially penetrate the first accommodation hole and protrude from the outer surface of the inner sleeve 16M. Each of the floating ball assemblies 14M may partially penetrate the second accommodation hole and protrude from the outer surface of the inner sleeve 16M.

Numbers of the first accommodation holes and the second accommodation holes may be respectively set according to the numbers of the fixed ball assemblies 12 and the floating ball assemblies 14M or numbers of balls in the assemblies. In this embodiment, one fixed ball assemblies 12M may include two balls, which further correspond to two first accommodation holes. One floating ball assemblies 14M may include two balls, which further correspond to two second accommodation holes. The foregoing structure can not only ensure that the inner sleeve 16M is more closely attached to the outer sleeve 18M, but also ensure higher movement smoothness of the vertical rod assembly 10M during extension and retraction, thus improving user experience.

Shapes of the first accommodation hole and the second accommodation hole may be respectively set according to shapes of the protruding parts of the fixed ball assemblies 12 and the floating ball assemblies 14. In this embodiment, the first accommodation hole is a circular hole, and the second accommodation hole is a square hole.

The surface of the inner sleeve 16M is provided with a plurality of fixing holes, which are configured to fix the fixed ball assembly 12M and the floating ball assembly 14M to the inner sleeve 16M. Shapes and a number of the fixing holes may be set arbitrarily as required.

The fixed ball assembly 12 and the floating ball assembly 14M are fixedly mounted on inner surfaces of the inner sleeve 16M, respectively. In order to facilitate sleeving of the outer sleeve 18M on the inner sleeve 16 during the mounting, in this embodiment, the fixed ball assembly 12M and the floating ball assembly 14M are opposite to each other in the inner sleeve 16M. The plurality of fixed ball assemblies 12M are fixedly mounted on two adjacent inner surfaces of the inner sleeve 16M. One of the inner surfaces is provided with two fixed ball assemblies 12M, the two fixed ball assemblies 12M being disposed at an interval of a preset distance, and the other of the inner surfaces is provided with one fixed ball assembly 12M at a middle part. In order to cause the inner sleeve 16M and the outer sleeve 18M to be more closely attached without being stuck or loosened, the plurality of floating ball assemblies 14M are fixedly mounted on other two adjacent inner surfaces of the inner sleeve 16M, each of the other two adjacent inner surfaces being provided with one floating ball assembly 14M.

In order to facilitate sleeving of the outer sleeve 18M on the inner sleeve 16M during the mounting, in some embodiments, when the cross-sectional shapes of the inner sleeve 16M and the outer sleeve 18M are polygonal, there are at least two fixed ball assemblies 12M, and there is at least one floating ball assembly 14M. The at least two fixed ball assemblies 12M are fixedly mounted on consecutive adjacent inner surfaces of the inner sleeve 16M. The at least one floating ball assembly 14M is fixedly mounted on any other one or more adjacent inner surfaces of the inner sleeve 16M, so long as it is ensured that the floating ball assembly 14M is opposite to at least one of the fixed ball assemblies 12M in the inner sleeve 16M.

For example, when the cross-sectional shapes of the inner sleeve 16M and the outer sleeve 18M are trilateral, the fixed ball assembly 12M is fixedly mounted on two of the inner surfaces of the inner sleeve 16M, and the floating ball assembly 14M is fixedly mounted on the other one of the inner surfaces of the inner sleeve 16M.

When the cross-sectional shapes of the inner sleeve 16M and the outer sleeve 18M are square, the fixed ball assembly 12M is fixedly mounted on two consecutive adjacent inner surfaces of the inner sleeve 16M, and the floating ball assembly 14M is fixedly mounted on the other two adjacent inner surfaces of the inner sleeve 16M.

In some embodiments, the numbers and mounting positions of the fixed ball assemblies 12 and the rolling ball assemblies to be mounted on the inner surface of the inner sleeve 16M may be arbitrarily set according to the shapes and dimensions of the inner surfaces of the inner sleeve 16M.

Figure 17:
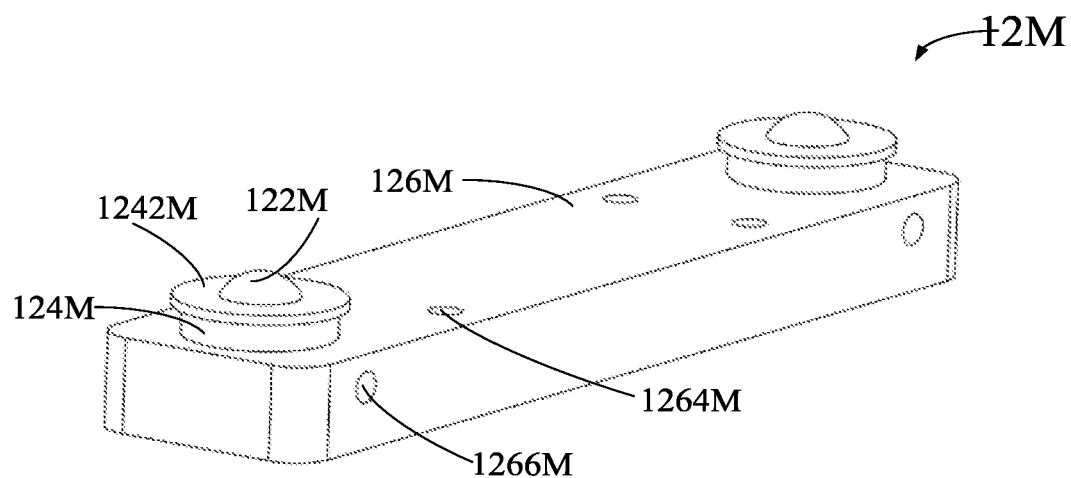
FIG. 17 is a three-dimensional view of a fixed ball assembly of the vertical rod assembly shown in FIG. 15.
Figure 18:
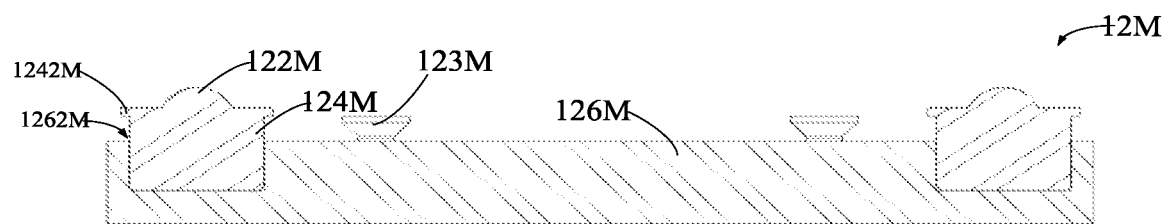
FIG. 18 is a cross-sectional view of the fixed ball assembly of the vertical rod assembly shown in FIG. 15.

Referring to FIG. 17 to FIG. 18 together, the fixed ball assembly 12M includes at least one limiting ball 122M, at least one fixed base 124M, at least one fixing member 123M and a mounting base 126M. The mounting base 126M is fixedly mounted on the inner surface of the inner sleeve 16M. A plurality of fixed bases 124M are fixedly received in the mounting base 126M. The limiting balls 122M are spherical. One limiting ball 122M corresponds to one fixed base 124M, and a part of the limiting ball 122M is received in one corresponding fixed base 124M.

The limiting ball 122M may roll randomly at any angle in the fixed base 124M without being detached from the fixed base 124M. The other part of the limiting ball 122M protrudes from the outer surface of the inner sleeve 16M.

The mounting base 126M is provided with a plurality of accommodation cavities 1262M. The plurality of fixed bases 124M are in one-to-one correspondences with the plurality of accommodation cavities 1262M. Each of the fixed bases 124M is accommodated and fixed in a corresponding one of the accommodation cavities 1262M.

In this embodiment, two ends of the mounting base 126M are respectively provided with one accommodation cavity 1262M. The accommodation cavity 1262M is circular. The fixed ball assembly 12M includes two fixed bases 124M, the fixed bases 124M being cylindrical. The accommodation cavities 1262M match the fixed bases 124M, so that the two fixed bases 124M are respectively fixedly received in the corresponding two of the accommodation cavities 1262M.

In some embodiments, the shapes of the accommodation cavity 1262M and the fixed base 124M may be arbitrarily set as required, so long as the fixed base 124M is fixedly received in the accommodation cavity 1262M. For example, the shapes of the accommodation cavity 1262M and the fixed base 124M are square, elliptical, and the like.

In some embodiments, numbers of accommodation cavities 1262M and fixed bases 124M may be arbitrarily set according to dimensions and shapes of the mounting bases 126M, so long as the fixed bases 124M are in one-to-one correspondences with the accommodation cavities 1262.

The mounting base 126M is provided with a plurality of fastening holes 1264M. The fixing member 123M penetrates the fixing holes on the inner sleeve 16M and the fastening holes 1264M to fix the mounting base 126M to the inner surface of the inner sleeve 16M.

The mounting base 126M is provided with a plurality of reinforcing holes 1266M. The plurality of reinforcing holes 1266M are provided at two opposite sides of the accommodation cavity 1262M, and are in communication with the accommodation cavity 1262M. The fixing member 123M penetrates the reinforcing holes 1266M to fixedly accommodate the fixed base 124M in the accommodation cavity 1262M.

In this embodiment, both the fastening hole 1264M and the reinforcing hole 1266M are circular screw holes, and the fixing member 123M is a screw or a bolt. In some embodiments, fixing between the mounting base 126M and the inner sleeve 16M and between the fixed base 124M and the mounting base 126M may adopt other fixing manners as required, such as riveting, key pin connection, elastic buckle connection, welding, bonding, or the like.

The fixed base 124M is provided with a rolling cavity. A part of the limiting ball 122M is received in the rolling cavity, and the limiting balls 122M match the rolling cavity, so that the limiting balls 122M can roll randomly at any angle in the rolling cavity without being detached from the rolling cavity.

The other part of the limiting ball 122M protrudes from the rolling cavity. The limiting ball 122M partially protruding from the rolling cavity penetrates the first accommodation hole of the inner sleeve 16M and extends to a preset gap 13M between the outer sleeve 18M and the inner sleeve 16*m*.

The fixed base 124M is provided with a fixed engaging portion 1242M at an edge of the rolling cavity. The fixed engaging portion 1242M is a circular step, which is engaged with an edge of the first accommodation hole and is configured to engage the limiting ball 122M partially protruding from the rolling cavity with the outer surface of the inner sleeve 16M.

Figure 19:
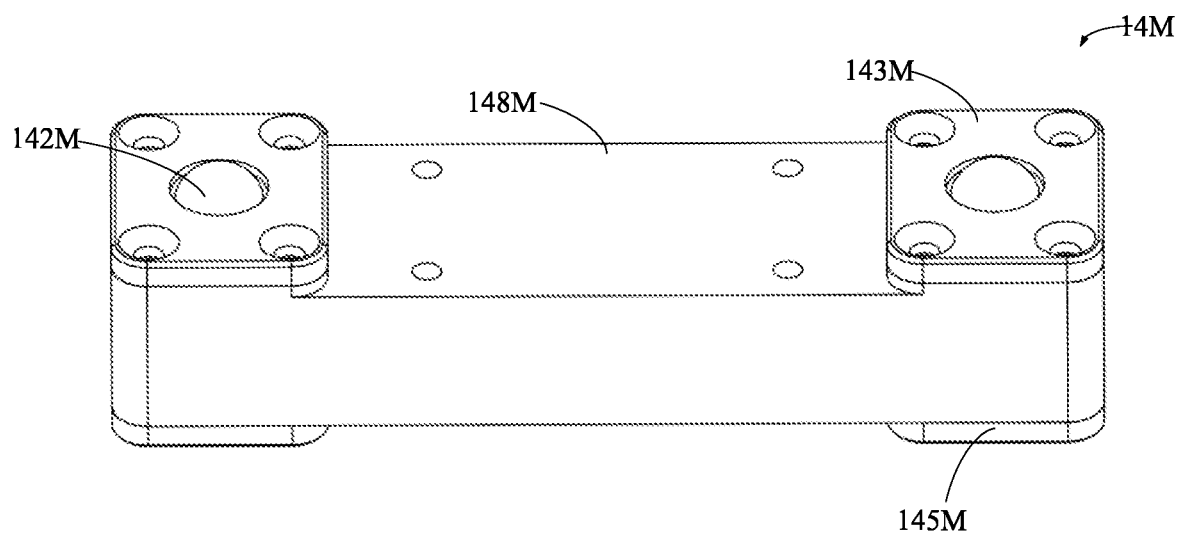
FIG. 19 is a three-dimensional view of a floating ball assembly of the vertical rod assembly shown in FIG. 15.
Figure 20:
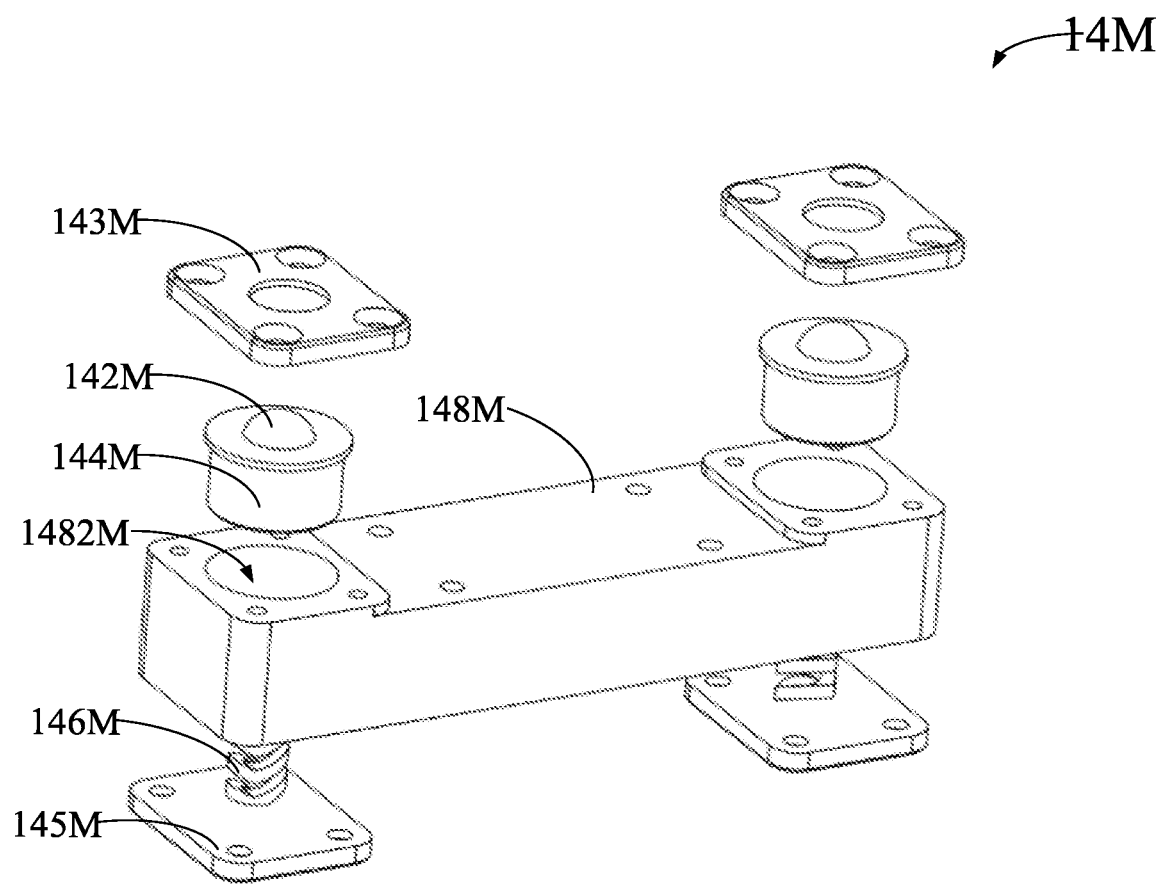
FIG. 20 is an exploded view of the floating ball assembly of the vertical rod assembly shown in FIG. 15.
Figure 21:
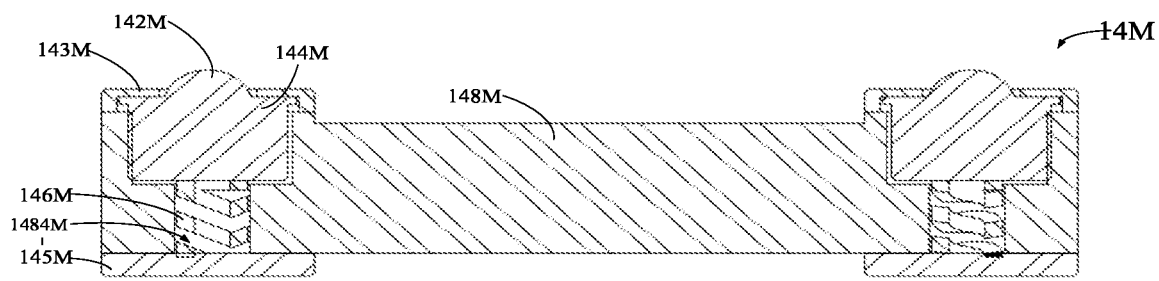
FIG. 21 is a cross-sectional view of the floating ball assembly of the vertical rod assembly shown in FIG. 15.

Referring to FIG. 19 to FIG. 21 together, the floating ball assembly 14M includes at least one floating ball 142M, at least one support base 144M, at least one elastic member 146M and a pedestal 148M. The pedestal 148M is fixedly mounted on the inner surface of the inner sleeve 16M. The support bases 144M are in one-to-one correspondences with the elastic members 146M, and the support base 144M and the elastic member 146M are accommodated at two opposite sides of the pedestal. One end of the elastic member 146M is fixedly connected to the support base bottom 148M, and the other end of the elastic member 146M is fixedly connected to the bottom of the support base 144M. The elastic member 146M can drive the support base 144M to move upward and downward in the pedestal 148M.

The floating balls 142M are spherical. One floating ball 142M corresponds to one support base 144M, and a part of the floating ball 142M is received in the support base 144M. The floating ball 142M can roll randomly at any angle in the support base 144M without being detached from the support base 144M, and the support base 144M can drive the floating ball 142M to move upward and downward. The part of the floating ball 142M protrudes from the outer surface of the inner sleeve 16M and always abuts against the inner surface of the outer sleeve 18M.

The pedestal 148M further includes a first fixing member 143M and a second fixing member 145M. The first fixing member 143M and the second fixing member 145M are respectively disposed on two opposite sides of the pedestal. The first fixing member 143M is configured to engage the floating ball 142M partially protruding from the support base 144M with the outer surface of the inner sleeve 16M, and fixedly mount the pedestal 148M on the inner surface of the inner sleeve 16M. The second fixing member 145M is configured to fixedly accommodate one end of the elastic member 146M in the pedestal 148M.

One side of the pedestal 148M is provided with a plurality of first accommodation cavities 1482M, and the other corresponding side of the pedestal 148M is provided with a plurality of second accommodation cavities 1484M. The first accommodation cavities 1482M are in one-to-one correspondences with the second accommodation cavities 1484M, and the first accommodation cavity 1482M is in communication with a corresponding one of the second accommodation cavities 1484M. The first accommodation cavity 1482M and the second accommodation cavity 1484M are both cylindrical cavities, and a diameter of the first accommodation cavity 1482M is greater than a diameter of the second accommodation cavity 1484M. Therefore, an annular step is formed at a junction between the first accommodation cavity 1482M and the second accommodation cavity 1484M. The bottom of the support base 144M can abut against the annular step.

In this embodiment, preferably, two opposite ends of one side of the pedestal 148M are respectively provided with one first accommodating cavity 1482M, and two ends of the other opposite side of the pedestal 148M are respectively provided with one corresponding second accommodation cavity 1484M.

The plurality of support bases 144M are in one-to-one correspondences with the plurality of first accommodation cavities 1482M. Each of the support bases 144M is received in a corresponding one of the first accommodation cavities 1482M. The support base 144M matches the corresponding one of the first accommodation cavities 1482M, to cause the support base 144M to be received in the first accommodation cavity 1482M and cause the support base 144M to move upward and downward in the first accommodation cavity 1482M under action of the elastic member 146M. After the support base 144M moves downward by a preset distance, the bottom surface of the support base 144M can abut against the annular step.

In some embodiments, shapes of the first accommodation cavity 1482M and the support base 144M may be set randomly as required, so long as the support base 144M is received in the first accommodation cavity 1482M and can move upward and downward in the first accommodation cavity 1482M. For example, shapes of the first accommodation cavity 1482M and the support base 144M are respectively square, elliptical, or the like.

In some embodiments, numbers of first accommodation cavities 1482M and support bases 144M may be randomly set according to dimensions and a shape of the pedestal 148M, so long as the support bases 144M are in one-to-one correspondences with the first accommodation cavities 1482M.

The support base 144M is provided with a floating rolling cavity, a part of the floating ball 142M being received in the floating rolling cavity. The floating ball 142M matches the floating rolling cavity, so that the floating ball 142M rolls randomly at any angle in the ball cavity without being detached from the floating rolling cavity.

The other part of the floating ball 142M protrudes from the floating rolling cavity. The floating ball 142M partially protruding from the floating rolling cavity penetrates the second accommodation hole of the inner sleeve 16M, extends to the preset gap 13M between the outer sleeve 18M and the inner sleeve 16M and abuts against the inner surface of the outer sleeve 18M, so that the inner sleeve 16M is always closely attached to the outer sleeve 18M without being stuck or loosened, which can greatly reduce the machining accuracy of the inner sleeve and the outer sleeve, thereby achieving mass production.

The support base 144M is provided with a floating engaging portion at an edge of the floating rolling cavity. The floating engaging portion is a circular step, which is engaged with an edge of the second accommodation hole and is configured to engage the floating ball 142M partially protruding from the floating rolling cavity with the outer surface of the inner sleeve 16M.

The elastic member 146M is received in the second accommodation cavity 1484M. One end of the elastic member 146M is fixedly connected to the bottom of the support base 144M, and the other end of the elastic member 146M is fixedly connected to the second fixing member 145M of the pedestal 148M. The elastic member 146M can elastically retract and extend, and can drive the support base 144M to move upward and downward, so that the support base 144M can drive the floating ball 142M partially protruding from the floating rolling cavity to move upward and downward, to cause the floating ball to always abut against the inner surface of the outer sleeve 18M, and the inner sleeve 16M and the outer sleeve 18M can be closely attached together through the floating ball 142M partially protruding from the floating rolling cavity without being stuck or loosened.

The elastic member 146M is a compression spring. In some implementations, strength of the attachment between the inner sleeve 16M and the outer sleeve 18M may be adjusted as required by changing a size, a length and a material of the spring.

In this embodiment, fixing between the pedestal 148M and the inner sleeve 16M, between the first fixing member 143M and the pedestal 148M, and between the second fixing member 145M and the pedestal 148M is implemented by using bolts. For example, a plurality of screw holes are respectively provided on the pedestal 148M and the inner sleeve 16M, and then screws or bolts penetrate the screw holes for fixing.

In some embodiments, fixing between the pedestal 148M and the inner sleeve 16M, between the first fixing member 143M and the pedestal 148M, and between the second fixing member 145M and the pedestal 148M may adopt other different manners as required, such as riveting, bolted connection, key pin connection, elastic buckle connection, welding, bonding, or the like.

The expressions "fixedly mounted to", "fixedly connected to" and "accommodated and fixed" include fixed mounting such as welding mounting as well as detachable mounting.

The expressions "fixedly mounted to", "fixedly connected to" and "accommodated and fixed" may be different fixing manners, such as riveting, bolted connection, key pin connection, elastic buckle connection, welding, bonding, or the like.

Referring to FIG. 8, another embodiment of the present invention further provides a calibration bracket 100M. The calibration bracket 100M is configured to support a calibration element. The calibration element is configured to calibrate a device in an auxiliary driving system of a vehicle. The calibration bracket 100M includes the vertical rod assembly 10M, the base 20M and the beam assembly 30M according to any of the foregoing embodiments. The vertical rod assembly 10M is fixedly connected to the base 20M. The beam assembly 30M includes a first beam portion, a second beam portion and a connecting portion. The connecting portion is mounted to the vertical rod assembly 10M. One end of the connecting portion is hinged to the first beam portion, and the other end of the connecting portion is hinged to the second beam portion. The first beam portion and the second beam portion can respectively rotate toward each other relative to the connecting portion, to fold the beam assembly. The first beam portion and the second beam portion can also respectively rotate away from each other relative to the connecting portion, to unfold the beam assembly. In the calibration bracket 100M in this embodiment, the first beam portion and the second beam portion can respectively rotate toward each other relative to the connecting portion, to fold the beam assembly, so that a volume of the calibration bracket 100M can be reduced to facilitate shipment.

It may be understood that the calibration bracket 100M further includes a driving mechanism. The driving mechanism is provided with a gear stop mechanism, such as a pawl stop apparatus, or the like, so that the vertical rod assembly 10M can stop at a required position.

In some embodiments, one end of the outer sleeve 18M close to the beam assembly 30M is provided with a fixing portion 17M. The fixing portion 17M is sleeved on an outer surface of the outer sleeve 18M. The fixing portion 17M and the outer sleeve 18M are respectively provided with screw holes. The screw holes on the fixing portion 17M and the outer sleeve 18M being in one-to-one correspondences and in communication with each other. When the inner sleeve 16M moves to a position on the outer sleeve 18M, screws or bolts respectively penetrate the screw holes on the fixing portion 17M and the outer sleeve 18M, and abut against the inner surface of the inner sleeve 16M for fixing, so that the vertical rod assembly 10M can stop at a required position.

In some embodiments, referring to FIG. 9M and FIG. 10M together, the vertical rod assembly 10M further includes a fastening mechanism 17aM and an elastic body 19M.

The fastening mechanism 17aM may be mounted to one end of the outer sleeve 18M and configured to fix the inner sleeve 16 to the outer sleeve 18M. The fastening mechanism 17aM includes a fastening ring 172M and a bolt 174M. The fastening ring 172M is sleeved on the outer sleeve 18M, and may be formed by bending a metal strip. The bolt 174M is mounted to two ends of the fastening ring 172M.

The elastic body 19M is located in the outer sleeve 18 and the inner sleeve 16, and the elastic body 19M is compressed between the bottom of the outer sleeve 18M and the inner sleeve 16M. The elastic body 19M may be connected to the inner sleeve 16M at a position on the bottom, the top or the middle of the inner sleeve 16M as required. When the movable vertical rod moves to a position closest to the bottom of the fixed vertical rod, the elastic body is in a compressed state. In this embodiment, the elastic body 19M is a compression spring. It may be understood that, in some other embodiments, the elastic body 19M may be other elastic elements such as an elastic piece, a pneumatic rod, a hydraulic rod, or the like.

When the inner sleeve 16M needs to be raised relative to the outer sleeve 18M, the bolt 174M is rotated, so that the fastening ring 172M loosens the outer sleeve 18M, and an upward force is applied on the inner sleeve 16M, so that the inner sleeve 16M can rise in a length direction of the outer sleeve 18M. By virtue of an elastic force of the elastic body 19M, an external force, for example, an external force to be applied by an operator, to be applied on the inner sleeve 16M can reduced. When the required position is reached, the bolt 174M is rotated to fasten the outer sleeve 18M, so that the inner sleeve 16M is fixed at the required position. When the inner sleeve 16M needs to be lowered relative to the outer sleeve 18M, the bolt 174M is rotated, so that the fastening ring 172M loosens the outer sleeve 18M. Under the gravity of the inner sleeve 16M and the beam assembly 30M, the inner sleeve 16M can fall in the length direction of the outer sleeve 18M. By virtue of the elastic force of the elastic body 19M, a falling speed of the inner sleeve 16M can be reduced, so that damage caused by collision on the outer sleeve 18M due to an excessively large falling speed of the inner sleeve 16M can be avoided.

It may be understood that, in some other embodiments, the fastening mechanism 17aM may also be other structures, so long as the inner sleeve 16M can be fixed at a required position. For example, the fastening mechanism 17aM may be a screw. The screw passes through the outer sleeve 18M to be in screw-thread fit with the outer sleeve 18M. When the inner sleeve 16M moves to the required position relative to the outer sleeve 18M, the screw is rotated to abut against the inner sleeve 16M, so that the inner sleeve 16M is fixed at the required position. The screw is rotated to be detached from the inner sleeve 16M, so that the inner sleeve 16M can move in the length direction of the outer sleeve 18M relative to the outer sleeve 18M.

In some embodiments, the vertical rod assembly 10M may be fixed in other different manners as required, such as riveting, bolted connection, key pin connection, elastic buckle connection, welding, bonding, or the like.

Compared with the prior art, the present invention provides a vertical rod assembly. The vertical rod assembly includes a floating ball assembly, an inner sleeve and an outer sleeve. The inner sleeve is sleeved in the outer sleeve. The floating ball assembly is respectively fixedly mounted on an inner surface of the inner sleeve. A part of the floating ball assembly protrudes from an outer surface of the inner sleeve, and the protruding part of the floating ball assembly is elastically retractable or extendable and always abuts against the inner surface of the outer sleeve. The floating ball assembly is disposed in the inner sleeve. Since the floating ball assembly partially protruding from the outer surface of the inner sleeve can be elastically retracted or extended to always abut against the inner surface of the outer sleeve, the inner sleeve and the outer sleeve are always closely attached to each other without being stuck or loosened, which can greatly reduce machining accuracy of parts.

For the driving mechanism 26, in an implementation, the driving mechanism 26 includes a rack 260, a housing 261, a handle 262 and a gear reduction assembly. The gear reduction assembly includes a first helical gear 263, a second helical gear 264, a first transmission gear 265 and a second transmission gear 266.

The rack 260 is fixedly mounted to the movable vertical rod 24 and is disposed in a length direction of the movable vertical rod 24. When the base 10 is placed on a horizontal plane, the fixed vertical rod 22, the movable vertical rod 24 and the rack 260 are all vertically disposed.

The housing 261 is fixedly mounted to the fixed vertical rod 22.

The handle 262 is mounted to the housing 261 and can rotate about a first rotation axis O1.

The gear reduction assembly can cause the movable vertical rod to move to a position more accurately and effortlessly, which facilitates accurate determining of a height of a calibration target. In the gear reduction assembly, the first helical gear 263 is located in the housing 261 and is fixedly mounted to the handle 262. A rotation axis of the first helical gear 263 overlaps with a rotation axis of the handle 262, and the first helical gear 263 and the handle 262 can rotate together about the first rotation axis O1.

The second helical gear 264 is mounted to an inner wall of the housing 261 and can rotate about a second rotation axis O2. The first helical gear 263 meshes with the second helical gear 264, and a diameter of the first helical gear 263 is less than a diameter of the second helical gear 264.

The first transmission gear 265 is fixedly mounted to the second helical gear 264, the rotation axis of the first transmission gear 265 overlaps with a rotation axis of the second helical gear 264, and the first transmission gear 265 and the second helical gear 264 can rotate together about the second rotation axis O2.

The second transmission gear 266 is mounted to the inner wall of the housing 261 and can rotate about a third rotation axis O3. The second transmission gear 266 meshes with the first transmission gear 265 and the rack 260, respectively. The second transmission gear 266 is provided with a convex pillar 2662 matching a ratchet wheel (not shown), so that the second transmission gear 266 is stopped at a preset position. The first transmission gear 265 and the second transmission gear 266 are both spur gears. A diameter of the first transmission gear 265 is less than a diameter of the second transmission gear 266.

The first rotation axis O1 is perpendicular to the second rotation axis O2 and the third rotation axis O3, and the first rotation axis O1 is perpendicular to the rack 260. The second rotation axis O2 and the third rotation axis O3 are disposed in parallel. The second rotation axis O2 and the third rotation axis O3 are perpendicular to the rack 260.

When the handle 262 rotates about the first rotation axis O1, the first helical gear 263 is driven to rotate about the first rotation axis O1, the second helical gear 264 and the first transmission gear 265 are driven to rotate about the second rotation axis O2, and the second transmission gear 266 is driven to rotate about the third rotation axis O3. When the second transmission gear 266 rotates about the third rotation axis O3, the rack 260 is driven to rise or fall in the length direction of the movable vertical rod 24, so that the movable vertical rod 24 rises or falls relative to the fixed vertical rod 22.

In this embodiment, the first helical gear 263 meshes with the second helical gear 264. The first transmission gear 265 and the second helical gear 264 can rotate together about the second rotation axis O2. The second transmission gear 266 meshes with the first transmission gear 265 and the rack 260, respectively, so that the movable vertical rod 24 can be driven to move stably relative to the fixed vertical rod 22. In addition, the diameter of the first helical gear 263 is less than the diameter of the second helical gear 264, and the diameter of the first transmission gear 265 is less than the diameter of the second transmission gear 266, so that the movable vertical rod 24 can be driven through merely a relatively small force to move relative to the fixed vertical rod 22.

It may be understood that, in some other embodiments, the first helical gear 263 and the second helical gear 264 may be omitted. The first transmission gear 265 is fixedly mounted to the handle 262, and the handle 262 can rotate about the second rotation axis O2, thereby driving the first transmission gear 265 to rotate about the second rotation axis O2.

It may be understood that, in some other embodiments, the first helical gear 263, the second helical gear 264 and the first transmission gear 265 may be omitted. The second transmission gear 266 is fixedly mounted to the handle 262, and the handle 262 can rotate about the third rotation axis O3, thereby driving the second transmission gear 266 to rotate about the third rotation axis O3.

Referring to FIG. 8, in some embodiments, the first helical gear 263, the second helical gear 264 and the first transmission gear 265 may be replaced with a worm mechanism. The worm mechanism includes a worm 263a and a worm gear 265a.

One end of the worm 263a is fixedly mounted to the handle 262. A rotation axis of the worm 263a overlaps with the rotation axis of the handle 262. The worm 263a and the handle 262 can rotate together about the first rotation axis O1.

The worm 263a is cylindrical, and an outer surface of the worm has a tooth portion 264a. The tooth portion 264a meshes with the worm gear 265a.

The worm gear 265a is fixedly mounted to the second transmission gear 266. A rotation axis of the worm gear 265a overlaps with a rotation axis of the second transmission gear 266. The worm gear 265a and the second transmission gear 266 can rotate together about the second rotation axis O2. A diameter of the worm gear 265a is less than the diameter of the second transmission gear 266, so that the movable vertical rod 24 can be driven through merely a relatively small force to move relative to the fixed vertical rod 22. The first rotation axis O1 is perpendicular to the second rotation axis O2, and the second rotation axis O2 is perpendicular to the rack 260.

When the movable vertical rod 24 moves to a required position relative to the fixed vertical rod 22, the movable vertical rod 24 can be fixed at the required position by using a self-locking function of the worm mechanism.

It may be understood that, in some other embodiments, the handle 262 may be replaced with a motor.

It may be understood that, in some other embodiments, in addition to a gear box, the driving mechanism 26 may be other driving mechanisms, such as a screw drive, a timing belt, or the like, so long as the movable vertical rod 24 can be driven to move relative to the fixed vertical rod 22.

In some embodiments, the movable vertical rod 24 is provided with a limiting member 242. The limiting member 242 is located in the fixed vertical rod 22. An inner wall of the fixed vertical rod 22 is provided with a flange. The flange is close to the top end of the fixed vertical rod 22. When the movable vertical rod 24 moves relative to the fixed vertical rod 22 until the limiting member 242 abuts against the flange, the movable vertical rod 24 stops moving, which can prevent the movable vertical rod 24 from being detached from the fixed vertical rod 22. In this embodiment, the limiting member 242 is a lantern ring sleeved on an outer wall of the movable vertical rod 24.

In another implementation, referring to FIG. 24 to FIG. 27 together, the driving mechanism 26 includes a transmission assembly 260k, a unidirectional rotation assembly 262k, a wrapping spring 264k, a first revolving body 266k, a second revolving body 268k and a handle 269k. The unidirectional rotation assembly 262k includes a fixed support 2620 and a rotating member 2622.

The fixed support 2620 is fixedly mounted to the fixed vertical rod 22, and the rotating member 2622 is mounted to the fixed support 2620. The rotating member 2622 can rotate about only a preset axis O in a first rotation direction S1 relative to the fixed support 2620.

The wrapping spring 264k is sleeved on and wraps the rotating member 2622.

Figure 26:
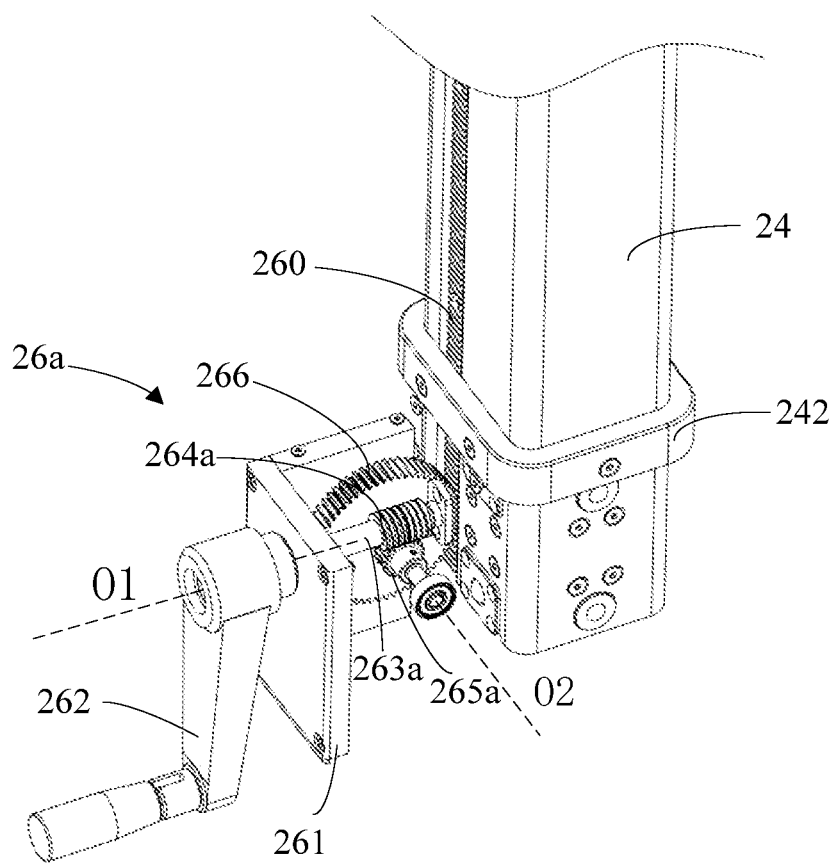
FIG. 26 is a three-dimensional view of a stand assembly according to some embodiments, where some elements are omitted.
Figure 27:
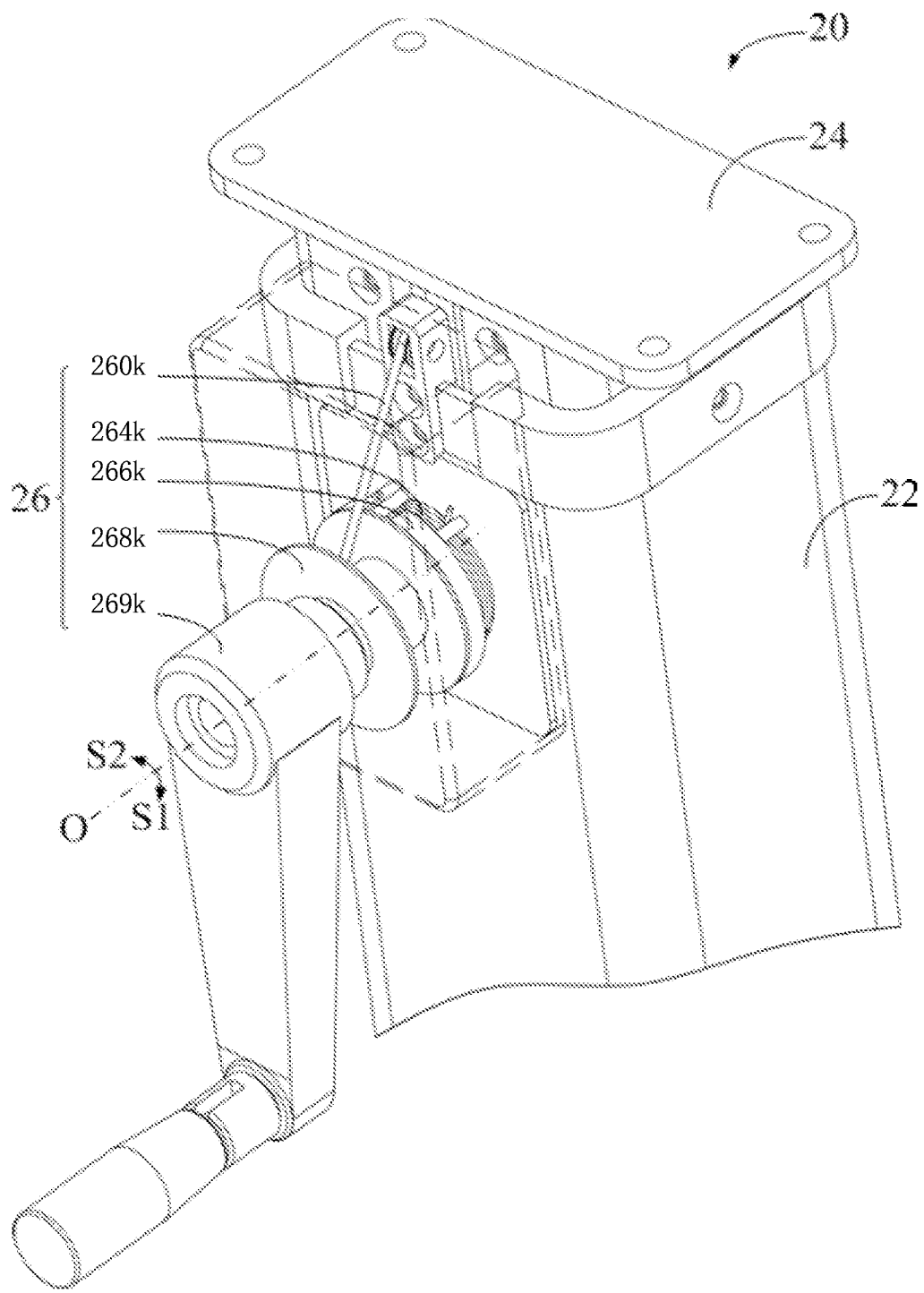
FIG. 27 is a partial enlarged view of a stand assembly according to some embodiments.

The first revolving body 266k is mounted to the fixed support 2620. The first revolving body 266k is rotatable about the preset axis O relative to the fixed support 2620. The first revolving body 266k is configured to squeeze the wrapping spring 264k. As shown in FIG. 26, when the first revolving body 266k squeezes the wrapping spring 264k in the first rotation direction S1, the wrapping spring 264k drives the rotating member 2622 to rotate. As shown in FIG. 27, when the first revolving body 266k squeezes the wrapping spring 264k in a second rotation direction S2, the wrapping spring 264k loosens the rotating member 2622 and rotates relative to the rotating member 2622. The second rotation direction S2 is opposite to the first rotation direction S1.

Figure 28:
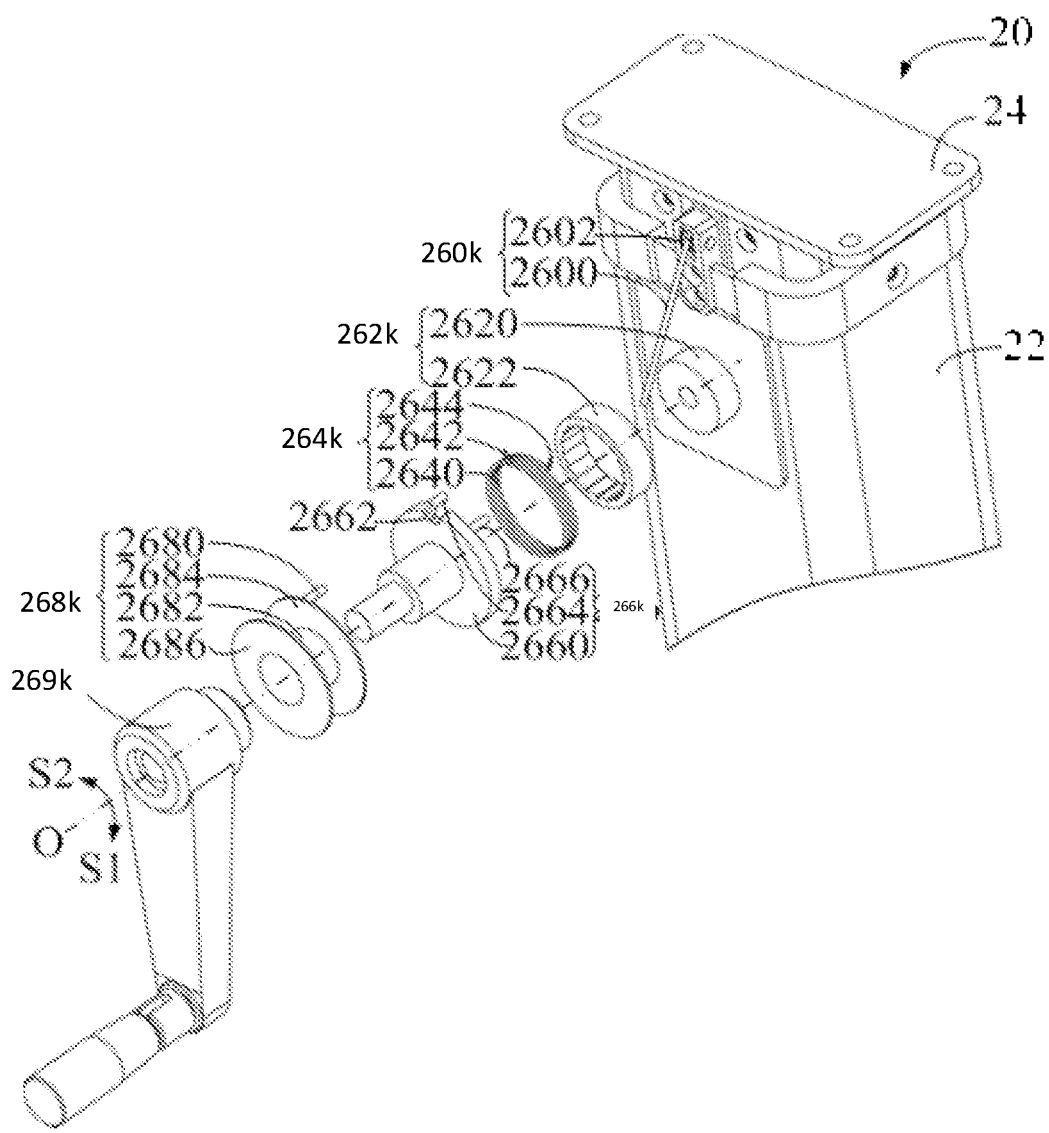
FIG. 28 is an exploded view of a driving mechanism of the stand assembly shown in FIG. 247.

The second revolving body 268k is mounted to the first revolving body 266k. The second revolving body 268k is rotatable between a first position and a second position about the preset axis O relative to the first revolving body 266k. The second position is at one side of the first position facing the first rotation direction S1. The second revolving body 268k is configured to push the first revolving body 266k to rotate. When the second revolving body 268k rotates to the first position, the second revolving body 268k is capable of pushing the first revolving body 266k in the first rotation direction S1. When the second revolving body 268k rotates to the second position, the second revolving body 268k is capable of pushing the first revolving body 266k in the second rotation direction S2. As shown in FIG. 28, when the second revolving body 268k rotates to a position between the first position and the second position, and the second revolving body 268k rotates in the second rotation direction S2k, the wrapping spring 264k abuts against the second revolving body 268k to prevent the second revolving body 268k from continuing to rotate.

The transmission assembly 260k is connected to the second revolving body 268k and the movable vertical rod 24. When the second revolving body 268*k* rotates in the first rotation direction S1, the second revolving body 268*k* drives the movable vertical rod 24 to rise through the transmission assembly 260*k*. When the first revolving body 266*k* rotates in the second rotation direction S2, the second revolving body 268*k* drives the movable vertical rod 24 to fall through the transmission assembly 260*k*.

The handle 269*k* is fixedly mounted to the second revolving body 268*k*. The hand wheel 269*k* and the second revolving body 268*k* are rotatable together about the preset axis O relative to the first revolving body 266*k*.

It is to be noted that, in a first aspect, the second revolving body 268*k* at the first position rotates in the first rotation direction S1, and the second revolving body 268*k* pushes the first revolving body 266*k* to rotate. The first revolving body 266*k* squeezes the wrapping spring 264*k*, so that the wrapping spring 264*k* wraps the rotating member 2622, which causes the second revolving body 268, the first revolving body 266*k*, the wrapping spring 264*k* and the rotating member 2622 to rotate together relative to the fixed support 2620. In addition, the second revolving body 268*k* rotates in the first rotation direction S1, which can drive the movable vertical rod 24 to rise through the transmission assembly 260*k*. In a second aspect, the second revolving body 268*k* at the second position rotates in the second rotation direction S2, and the second revolving body 268*k* pushes the first revolving body 266*k* to rotate. The first revolving body 266*k* squeezes the wrapping spring 264*k*, so that the wrapping spring 264*k* loosens the rotating member 2622, which causes the second revolving body 268*k*, the first revolving body 266*k* and the wrapping spring 264*k* to rotate together relative to the rotating member 2620. In addition, the second revolving body 268*k* rotates in the second rotation direction S2, which can drive the movable vertical rod 24 to fall through the transmission assembly 260*k*. In a final aspect, when the movable vertical rod 24 tends to fall, the movable vertical rod 24 pulls the second revolving body 268*k* through the transmission assembly 260*k*, so that the second revolving body 268*k* tends to rotate in the second rotation direction S2, and the second revolving body 268*k* is pressed by the wrapping spring 264*k* to prevent the movable vertical rod 24 from falling. Based on the foregoing, the driving mechanism 26 can prevent the movable vertical rod 24 from falling while driving the movable vertical rod 24 to rise and fall. According to actual conditions, the hand wheel 269*k* may be replaced with a motor. Pressing the second revolving body 268*k* by using the wrapping spring 264*k* can prevent the beam for hanging a calibration element from falling easily.

The transmission assembly 260 includes a traction rope 2600. The traction rope 2600 may be a steel wire. One end of the traction rope 2600 is wound around the second revolving body 268*k*, and the other end of the traction rope 2600 is fixedly mounted to the movable vertical rod 24. The second revolving body 268*k* rotates in the first rotation direction S1, so that one end of the traction rope 2600 is wound around the second revolving body 268*k*, thereby pulling the movable vertical rod 24 to rise relative to the fixed vertical rod 22. Alternatively, the second revolving body 268*k* rotates in the second rotation direction S2, so that one end of the traction rope 2600 is unwound from the second revolving body 268*k*, which causes the movable vertical rod 24 to fall relative to the fixed vertical rod 22 due to a weight thereof.

It may be understood that, according to actual conditions, the transmission assembly 260 is not limited to the form of the traction rope 2600. In some other embodiments, the transmission assembly 260*k* includes a gear and a rack. The gear is fixedly mounted to the second revolving body 268*k*, and the rack is fixed to the movable vertical rod 24. The gear meshes with the rack. The gear and the second revolving body 268*k* can rotate together to drive the rack to rise or fall. In some other embodiments, the transmission assembly 260*k* may also be a screw rod assembly, a sprocket assembly, a belt pulley assembly, or the like, so long as the rotation of the second revolving body 268*k* can drive the movable vertical rod 24 to rise or fall through the transmission assembly 260*k*.

In this embodiment, the transmission assembly 260 may further include a pulley 2602. The pulley 2602 is mounted on the top of the fixed vertical rod 22. The pulley 2602 can rotate about a rotation axis thereof relative to the fixed vertical rod 22. The other end of the traction rope 2600 is fixedly mounted to the movable vertical rod 24 via the pulley 2602. The pulley 2602 and the traction rope 2600 form a fixed pulley mechanism. By disposing the pulley 2602, the traction rope 2600 can be prevented from abrasion, and friction between the traction rope 2600 and the fixed vertical rod 22 is also reduced, thereby facilitating the rotation of the second revolving body 268*k*.

The unidirectional rotating assembly 262*k* is a ratchet assembly, and the rotating member 2622 is a ratchets. For example, the ratchet is an internal meshing ratchet. The ratchet assembly further includes a pawl (not shown) and an elastic member (not shown). The ratchet is overall ring-shaped. One side of a ring of the ratchet is provided with ratchet teeth. The ratchet is sleeved on the fixed support 2620. One end of the pawl is mounted to the fixed support 2620, and the pawl can swing relative to the fixed support 2620. The other end of the pawl abuts against the ratchet teeth of the ratchet. The elastic member is disposed between the pawl and the fixed support 2620, and is configured to provide an elastic force for the pawl to abut against the ratchet teeth.

It may be understood that, according to actual conditions, the unidirectional rotating assembly 262*k* is not limited to the ratchet assembly. In some other embodiments, the unidirectional rotating assembly 262*k* may also be a toothed disc assembly. The fixed support 2620 is a first-end toothed disc, and the rotating member 2622 is a second-end toothed disc. The toothed disc assembly includes the first-end toothed disc, the second-end toothed disc and a compression spring. The second-end toothed disc meshes with the first-end toothed disc through ratchet teeth, and the compression spring presses the first-end toothed disc toward the second-end toothed disc, so that the first-end toothed disc keeps meshing with the second-end toothed disc, and the second-end toothed disc can rotate only in one rotation direction relative to the first-end toothed disc. In some other embodiments, the unidirectional rotating assembly 262*k* may also be a roller brake, so long as the unidirectional rotation assembly 262*k* can rotate only in one rotation direction.

The wrapping spring 264 includes a spiral portion 2640 and an abutting portion. The spiral portion 2640 has elasticity. The spiral portion 2640 spirals about the preset axis O, and the spiral portion 2640 is sleeved on and wraps the rotating member 2622.

The abutting portion is connected to and protrudes from the spiral portion 2640, and the first revolving body 266*k* is configured to squeeze the abutting portion. When the first revolving body 266*k* squeezes the abutting portion in the first rotation direction S1, the spiral portion 2640 drives the rotating member 2622 to rotate. When the first revolving body 266*k* squeezes the abutting portion in the second rotation direction S2, the spiral portion 2640 loosens the rotating member 2622 and rotates relative to the rotating member 2622. When the second revolving body 268k rotates to a position between the first position and the second position, and the second revolving body 268k rotates in the second rotation direction S2, the abutting portion abuts against the second revolving body 268k. The first revolving body 266k and the second revolving body 268k squeeze the abutting portion, which can facilitate application of a force to the wrapping spring 264k. For example, the wrapping spring 264k and the rotating member 2622 are pushed. For another example, the wrapping spring 264k is loosened and caused to loosen the rotating member 2622 and then for example, abut against the second revolving body 268k.

It may be understood that a manner of connecting the first revolving body 266k and the second revolving body 268k to the wrapping spring 264k is not limited to the form of squeezing the abutting portion. According to actual conditions, the first revolving body 266k and the second revolving body 268k may also pull the abutting portion. Therefore, the abutting portion is also not limited to protruding from the spiral portion 2640. Alternatively, the first revolving body 266k and the second revolving body 268k may directly squeeze the spiral portion 2640, and therefore the abutting portion may also be omitted accordingly, so long as the first revolving body 266k and the second revolving body 268k squeeze the wrapping spring 264k to deform the spiral portion 2640 and loosen the rotating member 2622.

Specifically, the abutting portion includes a first abutting portion 2642 and a second abutting portion 2644. Both the first abutting portion 2642 and the second abutting portion 2644 are connected to and protrude from the spiral portion 2640. The first revolving body 266k is configured to squeeze the first abutting portion 2642 or the second abutting portion 2644. When the first revolving body 266k squeezes the first abutting portion 2642 in the first rotation direction S1, the spiral portion 2640 drives the rotating member 2622 to rotate. When the first revolving body 2622 squeezes the second abutting portion 2644 in the second rotation direction S2, the spiral portion 2640 loosens the rotating member 2622 and rotates relative to the rotating member 2622. When the second revolving body 268k rotates to the position between the first position and the second position, and the second revolving body 268k rotates in the second rotation direction S2, the first abutting portion 2642 abuts against the second revolving body 268k to prevent the second revolving body 268k from continuing to rotate.

It is to be noted that the first abutting portion 2642 and the second abutting portion 2644 are two leading ends of the spiral portion 2640. Since the spiral portion 2640 spirals in one rotation direction, the first revolving body 266k squeezes the first abutting portion 2642 in the first rotation direction S1 or squeezes the second abutting portion 2644 in the second rotation direction S2, which can both deform the spiral portion 2640 and cause the spiral portion 2640 to loosen the rotating member 2622 or to tend to loosen the rotating member 2622. Whether the spiral portion 2640 loosens the rotating member 2622 or tends to loosen the rotating member 2622 depends on a difference between pressure applied to two fulcrums of the wrapping spring 264k. One of the fulcrums is the first abutting portion 2642 and the second abutting portion 2644, and the other of the fulcrums is the rotating member 2622. However, since resistance between the rotating member 2622 and the fixed support 2620 is relatively small, but pressure required for deforming the spiral portion 2640 to loosen the rotating member 2622 is far greater than the resistance, the spiral portion 2640 may be pushed in the first rotation direction S1 to rotate with the rotating member 2622 relative to the fixed support 2620, and the spiral portion 2640 does not easily slip relative to the rotating member 2622. The first abutting portion 2642 abuts against the second revolving body 268k, that is, the second revolving body 268k squeezes the first abutting portion 2642 in the second rotating direction S2, and the spiral portion 2640 is deformed to further wrap the rotating member 2622.

In this embodiment, the second abutting portion 2644 is located on one side of the first abutting portion 2642 facing the first rotation direction S1.

The first revolving body 266k includes a first main revolving body 2660 and a stopping portion. The first main revolving body 2660 is mounted to the fixed support. The first main revolving body 2660 can rotate about the preset axis O relative to the fixed support 2620. The first main revolving body 2660 is provided with an arc-shaped notch 2662. The arc-shaped notch 2662 has a first end and a second end. The arc-shaped notch 2662 is used for the second revolving body 268k to pass through.

The stopping portion is provided on one side of the first main revolving body 2660 facing the wrapping spring 264k. When the stopping portion squeezes the first abutting portion 2642 in the first rotation direction S1, the spiral portion 2640 drives the rotating member 2622 to rotate. When the stopping portion squeezes the second abutting portion 2644 in the second rotation direction S2, the spiral portion 2640 loosens the rotating member 2622 and rotates relative to the rotating member 2622.

Specifically, the stopping portion includes a first stopping portion 2664 and a second stopping portion 2666. The first stopping portion and the second stopping portion are both provided on one side of the first main revolving body 2660 facing the wrapping spring 264k. The first stopping portion 2664 is configured to squeeze the first abutting portion 2642, and the second stopping portion 2666 is configured to squeeze the second abutting portion 2644. When the first stopping portion 2664 squeezes the first abutting portion 2642 in the first rotation direction S1, the spiral portion 2640 drives the rotating member 2622 to rotate. When the second stopping portion 2666 squeezes the second abutting portion 2644 in the second rotation direction S2, the spiral portion 2640 loosens the rotating member 2622 and rotates relative to the rotating member 2622.

In this embodiment, the first abutting portion 2642 and the second abutting portion 2644 are both located between the first stopping portion 2664 and the second stopping portion 2666 in the first rotation direction S1, the first abutting portion 2642 is closer to the first stopping portion 2664, and the second abutting portion 2644 is closer to the second stopping portion 2666.

In this embodiment, the arc-shaped notch 2662 is located between the first stopping portion 2664 and the second stopping portion 2666 in the first rotation direction S1. The arc-shaped notch 2662 is closer to the first stopping portion 2664. The first end is closer to the first stopping portion 2664, and the second end is closer to the second stopping portion 2666.

The second revolving body 268k includes a second main revolving body and a limiting rod 2680. The second main revolving body is mounted to the first revolving body 266k. The second main revolving body can rotate about the preset axis O relative to the first revolving body 266k.

The limiting rod 2680 is provided on one side of the second main revolving body facing the first revolving body 266k. The limiting rod 2680 passes through the arc-shaped notch 2662. The limiting rod 2680 is located between the first abutting portion 2642 and the second abutting portion 2644 in the first rotation direction S1. The limiting rod 2680 is configured to push the first revolving body 266k to rotate. When the second main revolving body rotates to the first position, the limiting rod 2680 is located at the first end, and the limiting rod 2680 can push the first revolving body 266k in the first rotation direction S1. When the second main revolving body rotates to the second position, the limiting rod 2680 is located at the second end, and the limiting rod 2680 can push the first revolving body 266k in the second rotation direction S2. When the second main revolving body rotates to the position between the first position and the second position, and the second main revolving body rotates in the second rotation direction S2, the limiting rod 2680 is located between the first end and the second end, and the first abutting portion 2642 abuts against the limiting rod 2680.

It may be understood that, according to actual conditions, in some embodiments, the limiting rod 2680 may include a first limiting rod and a second limiting rod. The first limiting rod is located in the arc-shaped notch 2662, and the second limiting rod spans the first main revolving body 2660 and is located between the first abutting portion 2642 and the second abutting portion 2644 in the first rotation direction S1. When the second main revolving body rotates to the first second position, the first limiting rod is located at the first end. When the second main revolving body rotates to the second position, the first limiting rod is located at the second end. When the second main revolving body rotates to the position between the first position and the second position, the first limiting rod is located between the first end and the second end. The first abutting portion 2642 abuts against the second limiting rod, to prevent the second revolving body 266k from continuing to rotate.

The second main revolving body includes a rope shaft body 2682 and a baffle. The rope shaft body is mounted to the first revolving body 266k. The rope shaft body can rotate about the preset axis O relative to the first revolving body 266k. One end of the traction rope 2600 is wound around the rope shaft body 2682.

The baffle is provided at a tail end of the rope shaft body 2682. Cross-sectional dimensions of the baffle are greater than horizontal axis surface dimensions of the rope shaft body 2682. One end of the traction rope 2600 is limited on the rope shaft body 2682 by using the baffle, to prevent the traction rope 2600 from being detached from the rope shaft body 2682.

Specifically, the baffle includes a first baffle 2684 and a second baffle 2686. The first baffle 2684 is provided at one end of the rope shaft body 2682 close to the first revolving body 266k. The second baffle 2686 is provided at the other end of the rope shaft body 2682 away from the first revolving body 266k. Cross-sectional dimensions of the first baffle 2684 and cross-sectional dimensions of the second baffle 2686 are both greater than the cross-sectional dimensions of the rope shaft body 2682.

The handle 269k is fixedly mounted to the second revolving body 268k, so that the handle 269k and the second revolving body 268k can rotate together about the preset axis O. The handle 269k can help rotate the second revolving body 268k.

Figure 10:
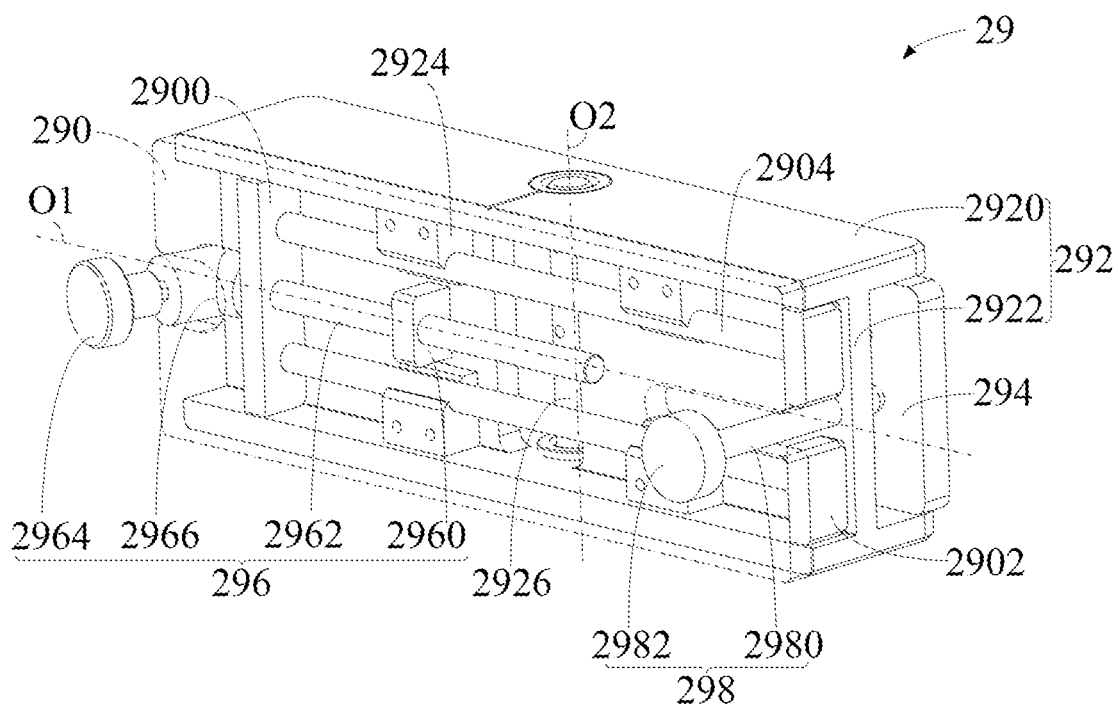
FIG. 10 is a three-dimensional view of a position adjustment mechanism of the calibration bracket shown in FIG. 4, where a fixed plate of the position adjustment mechanism is blurred.

Referring to FIG. 9 and FIG. 10, in some embodiments, the driving mechanism 26 is omitted, and the stand assembly 20 further includes a fastening mechanism 27 and an elastic body 28.

The fastening mechanism 27 may be mounted to one end of the fixed vertical rod 22 and configured to fix the movable vertical rod 24 to the fixed vertical rod 22. The fastening mechanism 27 includes a fastening ring 272 and a bolt 274. The fastening ring 272 is sleeved on the fixed vertical rod 22. The fastening ring 272 may be formed by bending a metal strip. The bolt 274 is mounted to two ends of the fastening ring 272.

The elastic body 28 is located in the fixed vertical rod 22 and the movable vertical rod 24. The elastic body 28 is compressed between the bottom of the fixed vertical rod 22 and the movable vertical rod 24. The elastic body 28 may be connected to the movable vertical rod 24 at a position at the bottom, the top or the middle of the movable vertical rod 24 as required. When the movable vertical rod moves to a position closest to the bottom of the fixed vertical rod, the elastic body is in a compressed state. In this embodiment, the elastic body 28 is a compression spring. It may be understood that, in some other embodiments, the elastic body 28 may be other elastic elements such as an elastic piece, a pneumatic rod, a hydraulic rod, or the like.

When the movable vertical rod 24 needs to be raised relative to the fixed vertical rod 22, the bolt 274 is rotated, so that the fastening ring 272 loosens the fixed vertical rod 22, and an upward force is applied on the movable vertical rod 24, so that the movable vertical rod 24 can rise in the length direction of the fixed vertical rod 22. By virtue of an elastic force of the elastic body 28, an external force, for example, an external force to be applied by an operator, to be applied on the movable vertical rod 24 can be reduced. When a required position is reached, the bolt 274 is rotated to fasten the fixed vertical rod 22, so that the movable vertical rod 24 is fixed at the required position. When the movable vertical rod 24 needs to be lowered relative to the fixed vertical rod 22, the bolt 274 is rotated, so that the fastening ring 272 loosens the fixed vertical rod 22. Under the gravity of the movable vertical rod 24 and the beam assembly 30, the movable vertical rod 24 can fall in the length direction of the fixed vertical rod 22. By virtue of the elastic force of the elastic body 28, a falling speed of the movable vertical rod 24 can be reduced, so that damage caused by collision on the vertical rod 24 due to an excessively large falling speed of the movable vertical rod 24 can be avoided.

It may be understood that, in some other embodiments, the fastening mechanism 27 may also be other structures, so long as the movable vertical rod 24 can be fixed at a required position. For example, the fastening mechanism 27 may be a screw. The screw passes through the fixed vertical rod 22 to be in screw-thread fit with the fixed vertical rod 22. When the movable vertical rod 24 moves to the required position relative to the fixed vertical rod 22, the screw is rotated to abut against the movable vertical rod 24, so that the movable vertical rod 24 is fixed at the required position. The screw is rotated to be detached from the movable vertical rod 24, so that the movable vertical rod 24 can move in the length direction of the fixed vertical rod 22 relative to the fixed vertical rod 22.

It may be understood that the fixed vertical rod may also be used as an inner rod and the movable vertical rod as an outer rod as required. The driving mechanism is mounted to the fixed vertical rod and configured to drive the movable vertical rod to move in the length direction of the fixed vertical rod relative to the fixed vertical rod.

Figure 11:
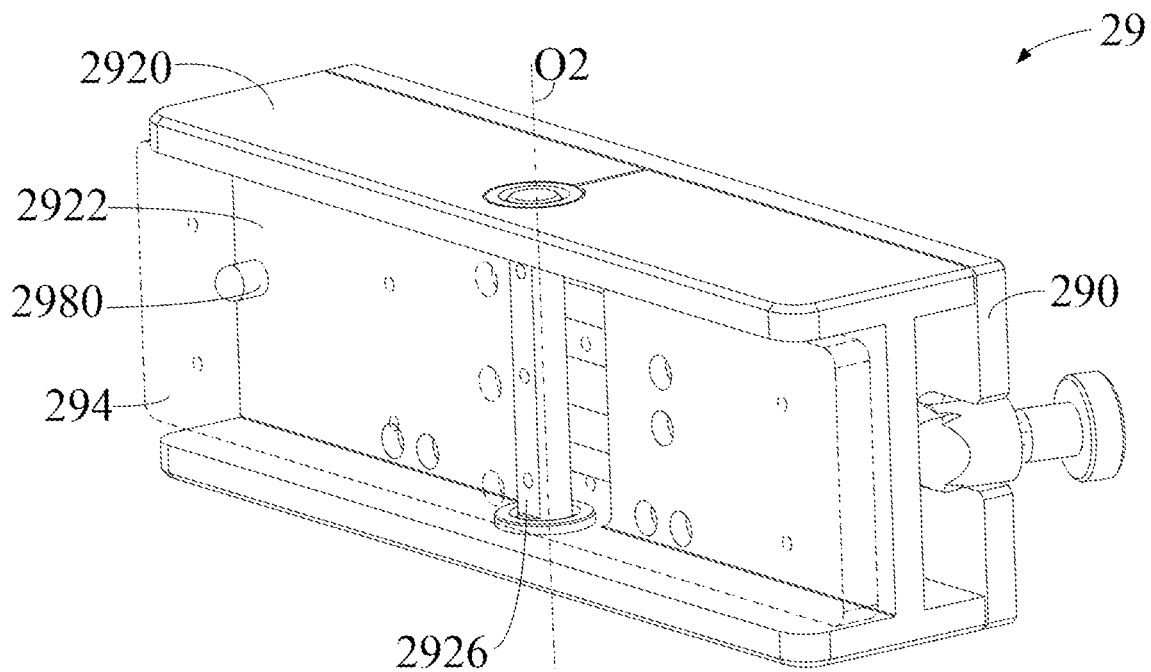
FIG. 11 is a three-dimensional view of the position adjustment mechanism of the calibration bracket shown in FIG. 4 from another perspective, where a movable plate of the position adjustment mechanism is blurred.

Referring to FIG. 11 to FIG. 13, in some embodiments, the stand assembly 20b includes a fixed vertical rod 22b, a movable vertical rod 24b and a driving mechanism 26b. One end of the fixed vertical rod 22b is mounted to the base body 12, and the movable vertical rod 24b is sleeved on the fixed vertical rod 22b from the other end of the fixed vertical rod 22b. The driving mechanism 26b passes through the movable vertical rod 24b and is mounted to the fixed vertical rod 22b for driving the movable vertical rod 24b to move in the length direction of the fixed vertical rod 22b relative to the fixed vertical rod 22b. The beam assembly 30 is mounted on the top surface of the movable vertical rod 24b. The movable vertical rod 24b is provided with a guide groove 240b. The guide groove 240b is disposed in a length direction of the movable vertical rod 24b.

The driving mechanism 26b includes a gear bearing 260b, a screw rod 262b, a driving gear 264b and a handle 266b. The handle 266b passes through the guide groove 240b and can slide in the guide groove 240b. One end of the handle 266b is provided with a helical gear 268b. The helical gear 268b meshes with the driving gear 264b and can rotate about a first rotation axis A1 to drive the driving gear 264b to rotate. The driving gear 264b is sleeved on the screw rod 262b. The driving gear 264b is in screw-thread fit with the screw rod 262b. The driving gear 264b can rotate about a second rotation axis A2 to drive the screw rod 262b to move in the second rotation axis A2. The second rotation axis A1 overlaps a central axis of the screw rod 262b, and the first rotation axis A1 and the second rotation axis A2 are mutually perpendicular to and intersect each other. The top end of the screw rod 262b is fixed to the top of the movable vertical rod 24b, and is configured to drive the movable vertical rod 24 to move in the length direction of the fixed vertical rod 22b relative to the fixed vertical rod 22b. The gear bearing 260b is sleeved on the driving gear 264b. The gear bearing 260b is fixed to an inner wall of the fixed vertical rod 22b. The driving gear 264b can rotate about only the second rotation axis A2 relative to the gear bearing 260b. The driving gear 264b cannot move in the second rotation axis A2 relative to the gear bearing 260b. The helical gear 268b, the gear bearing 260b, the driving gear 264b and the screw rod 262b are all located in the fixed vertical rod 22b.

The handle 266b is rotated, so that the helical gear 268b rotates about the first rotation axis A1 to drive the driving gear 268b to rotate about the second rotation axis A2 relative to the gear bearing 260b. The driving gear 264b is in screw-thread fit with the screw rod 262b. When the driving gear 264b rotates about the second rotation axis A2, the screw rod 262b can be driven to move in the second rotation axis A2, thus driving the movable vertical rod 24b to move in the length direction of the fixed vertical rod 22b relative to the fixed vertical rod 22b.

It may be understood that the driving mechanism may be further provided with a gear stop mechanism, for example, a pawl stop apparatus, or the like, to cause the movable vertical rod to stop at a required position.

Referring to FIG. 14, FIG. 15 and FIG. 16, the beam assembly 30 includes a first supporting rod 31, the left beam portion 32, a second supporting rod 33, the right beam portion 34, a mounting base 35, the connecting portion 36, an adjustment mechanism 37 and a joint mechanism 39. The first supporting rod 31 and the second supporting rod 33 are configured to support a target to prevent falling, especially when the target has relatively large area and weight.

One end of the first supporting rod 31 may be pivotally connected to the left beam portion 32 through an articulation mechanism, a hinge mechanism, or the like. The first supporting rod 31 can rotate relative to the left beam portion 32 to be unfolded to be perpendicular to the left beam portion 32, or may be engaged with the left beam portion 32 in parallel to the left beam portion 32.

The first supporting rod 31 includes a first supporting rod body 310 and a first supporting member 312. One end of the first supporting rod body 310 is hinged to the left beam portion 32, and the first supporting member 312 is mounted to the other end of the first supporting rod body 310.

The first supporting member 312 is substantially cylindrical and is perpendicular to the first supporting rod body 310. An outer wall of the first supporting member 312 is provided with an annular first positioning mechanism 3120. The first positioning mechanism 3120 may be a positioning structure such as a slot, a bump, or the like.

A side wall of the first supporting rod body 310 is provided with a first slot (not shown).

Similarly, one end of the second supporting rod 33 may be pivotally connected to the right beam portion 34 through an articulation mechanism, a hinge mechanism, or the like. The second supporting rod 33 can rotate relative to the right beam portion 34 to be unfolded to be perpendicular to the right beam portion 34, or may be engaged with the right beam portion 34 in parallel to the right beam portion 34. The second supporting rod 33 includes a second supporting rod body 330 and a second supporting member 332. One end of the second supporting rod body 330 is hinged to the right beam portion 34, and the second supporting member 332 is mounted to the other end of the second supporting rod body 330.

The second supporting member 332 is substantially cylindrical and is perpendicular to the second supporting rod body 330. An outer wall of the second supporting member 332 is provided with an annular second positioning mechanism 3320. The second positioning mechanism 3320 may be a positioning structure such as a slot, a bump, or the like. The first positioning mechanism 3120 and the second positioning mechanism 3320 are located on the same plane. A side wall of the second supporting rod body 330 is provided with a second slot 3300. The first supporting member 312 and the second supporting member 332 extend in the same direction. When the first supporting rod 31 is unfolded to be perpendicular to the left beam portion 32, and the second supporting rod 33 is unfolded to be perpendicular to the right beam portion 34, the first slot and the second slot 3300 face away from each other. The first supporting member 312 and the second supporting member 332 may be configured to jointly support a calibration element, such as a large-sized target plate (which is usually a large-sized pattern plate).

The left beam portion 32 is provided with a first fixture block 320 and a first guide rail 322. The first fixture block 320 and the first supporting rod 31 are both connected to the same side of the left beam portion 32. When the first supporting rod 31 is rotated to be parallel to the left beam portion 32, the first fixture block 320 is snapped into the first slot to snap the first supporting rod 31 at the left beam portion 32. The first guide rail 322 is disposed on the other side of the left beam portion 32 in parallel to the left beam portion 32. The first guide rail 322 is configured to hang a hanger for hanging the calibration element, for example, hanging a calibration target, a reflector, a laser, and the like. The hanger can slide in the first guide rail 322.

Similarly, the right beam portion 34 is provided with a second fixture block 340 and a second guide rail 342. The second fixture block 340 and the second supporting rod 33 are both connected to the same side of the right beam portion 34. When the second supporting rod 33 is rotated to be parallel to the right beam portion 34, the second fixture block 340 is snapped into the second slot 3300 to snap the second supporting rod 33 at the right beam portion 34. The second guide rail 342 is disposed on the other side of the right beam portion 34 in parallel to the right beam portion 34. The second guide rail 342 is configured to hang a hanger for hanging a calibration element, for example, hanging a reflector, and the like. The hanger can slide in the second guide rail 342. The first guide rail 322 and the second guide rail 342 are disposed symmetrically about the connecting portion 36, and the left beam portion 32 and the right beam portion 34 are also disposed symmetrically about the connecting portion 36. When the base 10 is placed on a horizontal plane, the first guide rail 322, the second guide rail 342, the left beam portion 32 and the right beam portion 34 are all horizontally disposed.

The first positioning mechanism 3120 and the second positioning mechanism 3320 are located on the same vertical plane, and are configured to jointly clamp the bottom end of a target plate.

It may be understood that, in some other embodiments, the positions of the first fixture block 320 and the first slot may be transposed, that is, the first fixture block 320 is mounted to the first supporting rod body 310, and the first slot is provided on the left beam portion 32. Similarly, the positions of the second fixture block 340 and the second slot 3300 may also be transposed, that is, the second fixture block 340 is mounted to the second supporting rod body 330, and the second slot 3300 is provided on the right beam portion 34. Optionally, the first slot and the second slot 3300 are recessed in the corresponding beam portions.

It may be understood that, in some other embodiments, the first guide rail 322 and the second guide rail 342 may be disposed on other surfaces, such as the top surface of the beam. In some other embodiments, the first guide rail 322 and the second guide rail 342 do not need to be disposed, and the calibration element may be directly hung on the beam by using a hook or the like. The first guide rail 322 and the second guide rail 342 may also have other shapes, which are not limited to that shown in the figure. For example, the guide rail may be one or more groove lines disposed on the top surface of the beam, and the groove line may be formed by using an outer wall of the beam without a need to mount additional guide rails.

It may be understood that a number of supporting rods is not limited by the foregoing embodiment. For example, there may be only one supporting rod that is disposed at an approximately central position of the connecting portion 36. In this case, the target located at the approximately central position of the beam assembly 30 can also be well supported. When the target used for calibration is at other positions, the supporting rod may also be disposed at a corresponding position for supporting. There may also be more than two supporting rods. In addition, the supporting rod may also be disposed on a supporting rod guide rail (not shown). The supporting rod guide rail is disposed on a lateral surface or the bottom surface of the beam assembly 30, so that the supporting rod moves in the assembled beam assembly 30 to lift support, at a suitable position, the targets that may be at different positions.

It may be understood that, when the guide rail is used to cause the supporting rod to be movable, the supporting rod may also be snapped on the beam assembly 30 by using a fixture block and a slot.

The limiting structure 3303 (see FIG. 16) for limiting may also be retained on the guide rail.

The connecting portion 36 of the beam is sleeved in the mounting base 35. A first surface 360 of the connecting portion 36 is recessed with positioning holes 3604. Preferably, there are two positioning holes 3604, which are disposed in a length direction of the connecting portion 36.

Accordingly, a positioning mechanism matching the positioning hole 3604, for example, a positioning post 3524 is provided at a corresponding position on the mounting base 35 (see FIG. 22). In addition, the connecting portion 36 and the mounting base 35 may also be provided with positioning mechanisms in other forms. For example, a positioning groove 3564 is disposed on the mounting base 35, and a positioning mechanism (not shown in the figure) matching the positioning groove is disposed at a corresponding position on the connecting portion 36, so that the connecting portion 36 of the beam is placed at a predetermined position on the mounting base 35 more conveniently and accurately.

Referring to FIG. 17, the connecting portion 36 is provided with a fixing groove 3620. A fixing surface 3624 is disposed in the fixing groove 3620. The fixing groove 3620 is used in conjunction with a fixing rod 354 in FIG. 18 to fix the beam assembly onto the mounting base 35. Optionally, the fixing groove 3620 is disposed to form a specific angle between the fixing surface 3624 and the bottom surface of the mounting base 35. Advantages of this arrangement are described in combination with the fixing rod 354 in FIG. 17. For example, the fixing groove 3620 may be disposed between a second surface 362 and the top surface of the beam. The second surface 362 is arranged parallel to the first surface 360, and there is an included angle between the fixing surface 3624 and the first surface 360 and the second surface 362. For example, the fixing surface 3624 is disposed at 45 degrees, 30 degrees or 60 degrees to the first surface 360 and the second surface 362.

In this embodiment, the left beam portion 32, the right beam portion 34 and the connecting portion 36 are all square tubes, so that a weight of the calibration bracket 100 can be reduced and the connecting portion 36 can be firmly sleeved in the adjustment mechanism 38 easily. It may be understood that, in some other embodiments, the left beam portion 32, the right beam portion 34 and the connecting portion 36 may also be tubes of other shapes, special-shaped materials, rods, or the like, for example, may be polygonal or circular tubes or rods. When the beam is a tube of other shapes, the fixing groove 3620 may be disposed at a position at which a specific angle can be formed between the fixing surface 3624 and the bottom surface of the mounting base 35.

Referring to FIG. 18 and FIG. 19, the mounting base 35 is configured to sleeve the connecting portion 36. The mounting base 35 includes a holder 352, a fixing rod 354 and a mounting casing 356.

Optionally, the mounting base 35 may be disposed on the adjustment mechanism 37, so that the mounting base 35 can rotate about an adjustment rotation axis L relative to the stand assembly 20 under adjustment of the adjustment mechanism 37, to adjust the mounting base 35 and the horizontal angle of the beam assembly 30. Preferably, the adjustment mechanism 37 is disposed above the mounting base, so as to facilitate removal and mounting of the beam from above while implementing adjustment of the horizontal angle. The adjustment rotation axis L is disposed in parallel to the fixed vertical rod 22 and the movable vertical rod 24, that is, when the calibration bracket 100 is placed on a horizontal plane, the adjustment rotation axis L is vertically disposed. The mounting base 35 is provided with a notch 350 for facilitating placement of the connecting portion 36 in the mounting base 35 or removal of the connecting portion 36 from the mounting base 35.

The holder 352 is substantially hook-shaped to facilitate holding of the connecting portion 36. One end of the holder 352 is fixedly connected to the mounting casing 356, for example, mounted on an upper surface or a lateral surface of the mounting casing 356, and the other end surrounds and grasps the connecting portion 36 of a beam assembly 20, leaving the notch 350. For example, the holder 352 may have the shape shown in FIG. 18, or may have other shapes, such as a circular hook shape, a hook shape of other polygons, a hook shape with a combination of a circular ring and a polygon, so long as the connecting portion 36 can be stably held. The expression "substantially hook-shaped" herein means that the holder 352 can extend by a specific length at a specific angle, thereby supporting and holding the connecting portion 36.

The holder 352 and the mounting casing 356 form a mounting channel through enclosure for accommodating the connecting portion 36. The mounting channel is in communication with the notch 350. Two positioning columns 3524 are provided on an inner surface of the holder 352. The two positioning columns 3524 are located in the mounting channel and are to be inserted into the two positioning holes 3604 (see FIG. 16), to facilitate positioning of the connecting portion 36 in the mounting channel. The positioning hole 3604 is configured to further reduce any displacement of the beam assembly 20 relative to the mounting base 35 in the horizontal direction during calibration. The positioning column 3524 may also be disposed on the upper surface of the mounting casing 356 or on both the upper surface of the mounting casing 356 and the inner surface of the holder 352. The expression "positioning column" herein includes circular, square, and elongated positioning columns, and the expression "positioning hole" includes circular, square, and elongated positioning holes. When the positioning column and the positioning holes are substantially point-shaped, there are preferably at least two positioning columns 3524 in the length direction of the connecting portion 36, to ensure that the connecting portion 36 does not move in the length direction thereof. When the positioning column and the positioning hole are substantially elongated, only one pair of positioning column and positioning hole may be used. It may be understood that, in some other embodiments, positions of the positioning hole 3604 and the positioning column 3524 may be transposed, that is, the positioning hole 3604 is provided on the holder 352 in communication with the mounting channel, and the positioning column 3524 is disposed on the first surface 360 (see FIG. 16).

Optionally, the fixing rod 354 is disposed on the holder 352, which includes a knob and at least one screw rod and is in screw-thread fit with the holder 352. When the connecting portion 36 is sleeved on the mounting base 35, a central axis of the fixing rod 354 is perpendicular to the fixing surface 3624 at the beam connecting portion 36. By rotating the fixing rod 354, the fixing rod 354 can abut against the fixing surface 3624, so that the connecting portion 36 of the beam assembly 30 can be fixed to the mounting base 35. Alternatively, by rotating the fixing rod 354, the fixing rod 354 can be detached from the fixing surface 3624, so that the connecting portion 36 can be removed from the mounting base 35 through the notch 350.

Optionally, a specific angle is formed between the fixing surface 3624 and the bottom surface (that is, a horizontal plane) of the mounting base 35 and between the fixing rod 354 and the bottom surface of the mounting base 35. The angle is greater than 0 degrees and less than 90 degrees. Optionally, the angle is substantially 45 degrees, or may be substantially 30 degrees, 60 degrees or any other angle between 0 degrees and 90 degrees. In this arrangement, only one fixing rod 354 needs to be used to apply, to the connecting portion 36, a pressing force toward the bottom surface and a lateral surface of the mounting base. The lateral surface is a side opposite to a direction in which the fixing rod 354 extends, so that the fixed base fixes the connecting portion 36 with high stability, and the beam assembly can be easily disassembled and assembled.

It may be understood that, the mounting base 35 may be other structures. For example, a notch may not necessarily be maintained. After the connecting portion 36 is placed in the mounting base 35, a baffle or the like may be used to shield the notch. The connecting portion 36 may also be mounted in other manners. For example, the mounting base 35 may be a complete ring structure without a notch for placing the beam. In this case, the beam may be assembled first and then inserted, and then the beam is fixed through screwing by using the fixing rod 354.

It may be understood that the bottom surface or the lateral surface of the mounting base 35 pressed by the connecting portion 36 may be arc-shaped or other irregular shapes. In this case, the connecting portion 36 can also be pressed against on the surfaces by using the fixing rod 354. In this case, there may be line contact instead of surface contact between the fixing rod and the surfaces, but a compression effect is not affected.

Optionally, when the mounting base 35 includes a notch 350, a surface of the mounting base 35 facing away from the notch 350 may be further configured to mount a calibration element, for example, a multi-line laser 200 (see FIG. 1 and FIG. 5).

The multi-line laser 200 and the recess 122 on the base 12 are located on the same side of the surface of the mounting base 35 facing away from the notch 350.

The mounting casing 356 is substantially a cube with an opening on one side. The adjustment mechanism 37 is disposed in the opening of the mounting casing 356. The mounting casing 356 is provided with a threaded hole 3562, and a mounting post 3560 is disposed in the mounting casing 356. The adjustment mechanism 37 includes a supporting shaft 371, a first elastic member 372, a rotating member 373, a bearing base 374, a pedestal 375 and an adjusting rod 376. The adjustment mechanism 37 is configured to adjust an angle (that is, a yaw angle) of the beam assembly 20 in a horizontal direction.

The supporting shaft 371 is received in the mounting casing 356 and fixedly mounted to the inner wall of the mounting casing 356. A central axis of the supporting shaft 371 overlaps with the adjustment rotation axis L.

One end of the first elastic member 372 is fixed to the mounting column 3560, and the other end of the first elastic member 372 is fixed to the rotating member 373. In this embodiment, the first elastic member 372 is a tension spring.

The rotating member 373 is substantially a cube. One end of the rotating member is provided with a protrusion 3732. The protrusion 3732 and the first elastic member 372 are respectively located on two opposite sides of the rotating member 373. The rotating member 373 is sleeved on the bearing base 374.

The bearing base 374 is fixedly mounted on a surface of the pedestal 375, and a central axis of the bearing base 374 overlaps with the adjustment rotation axis L. The rotating member 373 is fixedly mounted to the pedestal 375 and sleeved on the bearing base 374. One end of the supporting shaft 371 is inserted into the bearing base 374, so that the supporting shaft 371 and the mounting casing 356 can rotate together about the adjustment rotation axis L relative to the rotating member 373, the bearing base 374 and the pedestal 375.

The pedestal 375 is mounted to the movable vertical rod 24. The movable vertical rod 24 can drive the pedestal 375 to rise or fall. In this embodiment, the pedestal 375 is a cube. The pedestal 375 covers the opening of the mounting casing 356. The supporting shaft 371, the first elastic member 372 and the rotating member 373 are all received in a cavity formed by the mounting casing 356 and the pedestal 375.

The expression "cube" in this specification includes a thin plate shape.

The adjusting rod 376 is mounted in the threaded hole 3562. By rotating the adjusting rod 376, the adjusting rod 376 abuts against the protrusion 3732, and pushes the mounting base 35 to rotate about the adjustment rotation axis L relative to the rotating member 373 and the pedestal 375, thereby adjusting the mounting base 35 and the horizontal angle of the connecting portion 36, so that the first elastic member 372 is stretched. The adjusting rod 376 is rotated in an opposite direction, and the mounting base 35, rotates, through pulling of the first elastic member 372, about the adjustment rotation axis L relative to the rotating member 373 and the pedestal 375 to return to its original position.

It may be understood that, in some other embodiments, the pedestal 375 may be omitted, and the rotating member 373 and the bearing base 374 may be fixedly mounted on the top surface of the movable vertical rod 24 directly.

It may be understood that the foregoing adjustment mechanism 37 may be selectively used. When the adjustment mechanism 37 is cancelled, the mounting casing 356 of the mounting base 35 may be cancelled, and the holder 352 is mounted on the top surface of the movable vertical rod 24 or other additional mounting surfaces. It should be understood that the holder 352 may also extend to form a bottom surface and surround the lower surface of the connecting portion 36 of the beam assembly 30, that is, the holder 352 may have a bottom surface mounted to the mounting casing 356.

It may be understood that other fixing mechanisms may also be adopted to press the connecting portion 36 against both the bottom surface and one lateral surface of the mounting base 35. For example, in some embodiments, a cam handle 354a shown in FIG. 20 may be used. The cam handle 354a is mounted to the holder 352. The cam handle 354a can rotate relative to the holder 352 to abut against the fixing surface 3624 so that the cam handle 354a presses the connecting portion 36 against the bottom surface and one lateral surface of the mounting base 35, or to be detached from the fixing surface 3624 so that the connecting portion 36 can be removed from the mounting base 35.

Referring to FIG. 21, the cam handle 354a includes a cam portion 3542a and a handle portion 3544a. The handle portion 3544a is connected to one end of the cam portion 3542a. The cam portion 3542a is provided with a shaft hole 3540a. A rotating shaft passes through the shaft hole 3540a, and two ends of the rotating shaft are fixed to the holder 352, so that the cam handle 354 can rotate about the rotating shaft. The cam portion 3542a is a disc cam, which is a disc-shaped member rotating about the rotating shaft and having varying diameters. The cam portion can rotate about the rotating shaft in a first rotation direction to abut against the fixing surface 3624, or can rotate about the rotating shaft in a second rotation direction to be detached from the fixing surface 3624. The first rotation direction is opposite to the second rotation direction.

In an embodiment, the cam handle 354 presses the beam against the mounting base in a direction at a predetermined angle to the horizontal direction. The angle may be predetermined. The predetermined pressing angle may be calculated according to a distance between the rotating shaft of the cam portion 3542a and the connecting portion 36 and the shape design of the cam portion 3542a. Preferably, a surface at which the cam portion 3542a is in contact with the connecting portion 36 is also disposed at a specific angle to the horizontal direction. The angle of the contact surface matches the above pressing angle, so that a pressing effect can improved. Since compaction does not require a very precise angle, the expression "match" only requires that the two angles are at an obvious angle to the horizontal direction. For example, the pressing angle may be 30 degrees, 45 degrees or 60 degrees, and the angle of the contact surface may be a similar angle.

It may be understood that the cam handle 354a is not limited to directly pressing the beam on the mounting base 35. The cam handle 354a may also cooperate with other movable members to press the beam against the mounting base 35.

Figure 23:
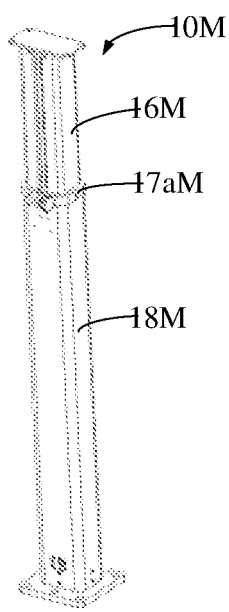
FIG. 23 is a three-dimensional view of a fastening mechanism and an elastic body of the vertical rod assembly shown in FIG. 15.
Figure 24:
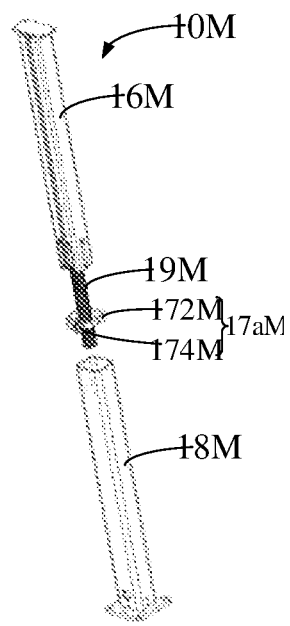
FIG. 24 is an exploded view of a fastening mechanism and an elastic body of the vertical rod assembly shown in FIG. 15.
Figure 25:
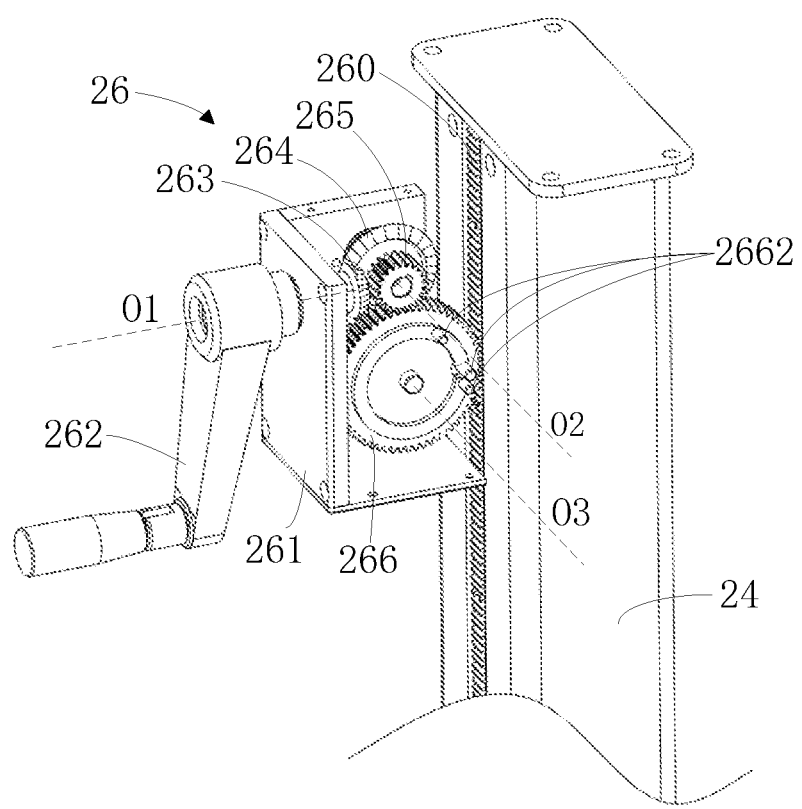
FIG. 25 is a three-dimensional view of the stand assembly shown in FIG. 14, where some elements are omitted.

Referring to FIG. 22 to FIG. 25 together, in an embodiment, the fixing mechanism further includes a limiting rod 356a and a hold-down spring 358a. The limiting rod 355 is mounted to the holder 352. The limiting rod 356a can move relative to the holder 352. A direction in which the limiting rod 356a moves is substantially perpendicular to the horizontal direction. One end of the limiting rod 356a abuts against the cam portion 3542a. When the cam handle 354a rotates relative to the holder 352, the limiting rod 356a is driven to move relative to the holder 352, to cause the other end of the limiting rod 356a to press the beam against the bottom surface and the one lateral surface of the mounting base 35 from a first angle, which as shown in FIG. 24, or to cause the other end of the limiting rod 356a to be detached from the beam, so that the beam can be removed from the mounting base 35, which is shown in FIG. 25.

The holder 352 is provided with a sliding groove 353a. A length direction of the sliding groove 353a is substantially perpendicular to the horizontal direction. The limiting rod 356a passes through the sliding groove 353a. The sliding groove 353a includes a square groove 3530a and a circular groove 3532a that are in communication with each other. One end of the limiting rod 356a abutting against the cam portion 3542a is closer to the circular groove 3532a, and the other end of the limiting rod 356a for pressing the beam is closer to the square groove 3530a. An inner wall of the sliding groove 353a is provided with an annular blocking portion 3534a. The annular blocking portion 3534a is located at a junction between the square groove 3530a and the circular groove 3532a, and the limiting rod 356a is sleeved on the annular blocking portion 3532a.

One end of the limiting rod 356a is provided with a limiting portion 3560a, and the other end of the limiting rod 356a is provided with a pressing portion 3562a. One end of the limiting rod 356a abuts against the cam portion 3542a through the limiting portion 356a. Cross-sectional dimensions of the limiting portion 356a are greater than cross-sectional dimensions of the circular groove 3532a. When the limiting rod 356a moves, the limiting portion 356a can abut against an opening of the sliding groove 353a of the holding portion 352, to prevent the limiting rod 356a from continuing to moving.

A cross-section of the pressing portion 3562a is rectangular, and the pressing portion 3562a matches the square groove 3530a, which limits rotational freedom of the limiting rod 356a, so that the limiting rod 356 can move only relative to the holding portion 352. The pressing portion 3562a has a pressing inclined surface 3563a and a pressing plane 3564a. The pressing inclined surface is perpendicular to a direction of the first angle, that is, the pressing inclined surface 3563a is inclined relative to the bottom surface of the mounting base 35. The other end of the limiting rod 356a presses the beam against the mounting base 35 by using the pressing inclined surface 3563a.

The pressing plane 3564a is parallel to the bottom surface of the mounting base 35 in a horizontal direction, that is, the pressing plane 3564a. The other end of the limiting rod 356a is pressed against the mounting base 35 through both the pressing inclined surface 3563a and the pressing plane 3564a, which improves stability of the abutting of the other end of the limiting rod 356a against the beam.

The hold-down spring 358a is configured to cause one end of the limiting rod 356a to keep abutting against the cam portion 3542a. The hold-down spring 358a is sleeved on the limiting rod 356a. The hold-down spring 358a is received in the circular groove 3532a. In addition, the hold-down spring 358a abuts between the annular blocking portion 3534a and the limiting portion 3560a.

It may be understood that the hold-down spring 358a may be replaced with other elastic structures. For example, a pneumatic cylinder is provided in the limiting rod 356a, so that the limiting rod 356a elastically extends and retracts, so long as one end of the limiting rod 356a can keep abutting against the cam portion 3542a.

It may be understood that, in addition to the foregoing embodiments, the fixing mechanism can also press the beam against the mounting base in other manners in a direction at a preset angle to the horizontal direction. For example, the fixing mechanism may apply a force vertically downward, but a stress surface (corresponding to the "contact surface" in the foregoing embodiments) disposed on or fixedly connected to the beam is at a specific angle to the horizontal direction, so that the fixing mechanism can also press the beam against the mounting base in the direction at the preset angle to the horizontal direction.

It may be understood that, in addition to the foregoing embodiments, the fixing mechanism can also press the beam against the mounting base in other manners in a direction at a preset angle to the horizontal direction. For example, the fixing mechanism may apply a force vertically downward, but a stress surface (corresponding to the "contact surface" in the foregoing embodiments) disposed on or fixedly connected to the beam is at a specific angle to the horizontal direction, so that the fixing mechanism can also press the beam against the mounting base in the direction at the preset angle to the horizontal direction.

Referring to FIG. 22 and FIG. 23 together, in some embodiments, the fixing mechanism 37a includes an adjusting worm 370a and an adjusting worm gear 372a. The adjusting worm 370a passes through the pedestal 375. The adjusting worm 370a is mounted to the pedestal 375 and can rotate about a central axis thereof relative to the pedestal 375. The adjusting worm 370a includes a worm thread 374a. The adjusting worm gear 372a is fixed to the mounting casing 356 and located in a cavity formed by the mounting casing 356 and the pedestal 375 through enclosure. The adjusting worm gear 372a includes a worm gear tooth 376a. The worm gear tooth 376a meshes the worm thread 374a. When the fixed vertical rod 22 and the movable vertical rod 24 are both vertically disposed, the adjusting worm 370a is horizontally disposed, and a rotation center line of the adjusting worm gear 372a is vertically disposed.

The adjusting worm 370a is rotated, and the worm thread 374a drives the worm gear tooth 376a to rotate, so that the adjusting worm gear 372a rotates about a rotation center line thereof, to drive the mounting casing 356 of the mounting base 35 to rotate, thereby adjusting the horizontal angle of the beam assembly 30.

It may be understood that, in some other embodiments, the positions of the adjusting worm 370a and the adjusting worm gear 372a may be transposed, that is, the adjusting worm gear 372a may be fixed to the pedestal 375, and the adjusting worm 370a passes through the mounting casing 356.

Referring to FIG. 15 again, there are two joint mechanisms 39. One of the joint mechanisms 39 is connected between the left beam portion 32 and the connecting portion 36, and the other of the joint mechanisms 39 is connected between the right beam portion 34 and the connecting portion 36. In some embodiments, the joint mechanism 39 is fixed in wall tubes of the left beam portion 32, the right beam portion 34 and the connecting portion 36. In some embodiments, the joint mechanism 39 is fixed outside the wall tubes of the left beam portion 32, the right beam portion 34 and the connecting portion 36, and is connected to cross-sections of the wall tubes of the left beam portion 32, the right beam portion 34 and the connecting portion 36 through snapping, screwing, bonding, or the like.

FIG. 24, FIG. 25 and FIG. 26 together show a first implementation of a structure of a joint mechanism 39. The joint mechanism 39 includes a first fixing member 391, a second fixing member 396, a first rotating shaft 397, a fastener 392, a second rotating shaft 393, a second elastic member 394 and a locking mechanism 395.

The first fixing member 391 and the second fixing member 396 are hinged to each other through the first rotating shaft 397. The first fixing member 391 is substantially a cube. One end of the first fixing member is hinged to one end of the second fixing member 396. The first fixing member 391 is provided with a first through hole 3910.

The fastener 392 is received in the first through hole 3910, the second rotating shaft 393 passes through the middle of the fastener 392, and two ends of the second rotating shaft 393 are respectively mounted to side walls of the first fixing member 391. The fastener 392 can rotate about the second rotating shaft 393. A hook portion 3922 extends from one end of the fastener 392. One end of the second elastic member 394 abuts against the other end of the fastener 392, and the other end of the second elastic member 394 abuts against an inner wall of the first fixing member 391. The second elastic member 394 is a compression spring for restoration from elastic deformation, so as to push the fastener 392 to rotate about the second rotating shaft 393.

The locking mechanism 395 is a screw, which includes a knob and at least one screw rod. One end of the locking mechanism 395 passes through the first fixing member 391 from the outside of the first fixing member 391 to abut against the fastener 392. The locking mechanism 395 and the second elastic member 394 are located on the same side of a central axis of the second rotating shaft 393, and the hook portion 3922 is located on the other side of the central axis of the second rotating shaft 393.

The second fixing member 396 is also substantially a cube and provided with a second through hole 3960. An inner wall of the second through hole 3960 is provided with a bulge 3962. The first fixing member 391 is fixed inside the connecting portion 36, and the second fixing member 396 is fixed inside the left beam portion 32 or the right beam portion 34, so that the left beam portion 32 or the right beam portion 34 is engaged with the connecting portion 36.

When the first fixing member 391 and the second fixing member 396 are closed, the first fixing member 391 is in contact with the second fixing member 396, and the first through hole 3910 is in communication with the second through hole 3960. Under pushing of the second elastic member 394, the hook portion 3922 is fastened to the bulge 3962, and the locking mechanism 395 is rotated to cause the locking mechanism 395 to press the fastener 392, so that the hook portion 3922 is further locked to the bulge 3962. In this way, the left beam portion 32 or the right beam portion 34 is in a stable state relative to the connecting portion 36.

The locking mechanism 395 is rotated to be detached from the fastener 392, so that the first fixing member 391 rotates relative to the second fixing member 396, and the hook portion 3922 is detached from the bulge 3962, so that the first fixing member 391 is separated from the second fixing member 396. In this way, the left beam portion 32 or the right beam portion 34 can rotate relative to the connecting portion 36, to fold the beam assembly 30.

In this embodiment, under pushing of the second elastic member 394, the hook portion 3922 can be easily fastened to the bulge 3962, so that the hook portion 3922 and the bulge 3962 are fastened to each other in advance, and then the locking mechanism 395 presses the fastener 392, so that the hook portion 3922 is further locked to the bulge 3962.

It may be understood that the locking mechanism 395 may abut against other parts of the fastener 392, to cause the hook portion 3922 to be further locked to the bulge 3962, so long as a lever using the second rotating shaft 393 as a fulcrum cannot move. For example, referring to FIG. 26, the locking mechanism 395 may abut against the hook portion 3922 from a lower portion of the hook portion 3922. In this case, the hook portion 3922 may be appropriately lengthened, so that a locking mechanism 395 capable of abutting against the hook portion 3922 can be disposed at a lower portion of the second fixing member 396.

It may be understood that, in some other embodiments, positions of the first fixing member 391 and the second fixing member 396 may be transposed, that is, the first fixing member 391 is fixed inside the left beam portion 32 or the right beam portion 34, and the second fixing member 396 is fixed inside the connecting portion 36.

It may be understood that the first fixing member 391 and the second fixing member 396 may also be integrally formed with the inner wall of the left beam portion 32, the right beam portion 34 or the connecting portion 36, that is, the first fixing member 391 and the second fixing member 396 may be a part of the inner wall of the left beam portion 32, the right beam portion 34 or the connecting portion 36. The first fixing member 391 and the second fixing member 396 may also not be connected by using the first rotating shaft. The first fixing member and the second fixing member are not connected, but the left beam portion 32 or the right beam portion 34 is connected to the outer wall of the connecting portion 36 by using an additional rotating shaft, which can also implement a pivotable connection between the left beam portion 32 or the right beam portion 34 and the connecting portion 36.

It may be understood that relative positions between the second elastic member 394 and the locking mechanism 395 and the second rotating shaft 393 may be changed, that is, the second elastic member 394 may be closer to the second rotating shaft 393 than the locking mechanism 395, so long as the fastener 392 can be locked to the bulge 3962.

FIG. 27 and FIG. 28 together show a second implementation of a structure of a joint mechanism 39*a*. The joint mechanism 39*a* provided in the second implementation is substantially the same as the joint mechanism 39 in the foregoing embodiment. A difference is that one end of the fastener 392*a* is provided with a hook portion 3922*a* and a bump 3924*a*. Two hook portions 3922*a* are located on two opposite sides of the bump 3924*a*. An inner wall of the second through hole 3960 is provided with a bulge 3962*a*. There are two bulges 3962*a*. A position of each of the bulges 3962*a* corresponds to a position of a corresponding one of the hook portions 3922*a*. The knob 395 is replaced with a button 395*a*. The button 395*a* is mounted to the second fixing member 396. The second elastic member 394 is a compression spring compressed between the first fixing member 391 and the fastener 392*a*.

When the first fixing member 391 and the second fixing member 396 are closed, the first fixing member 391 is in contact with the second fixing member 396, and the first through hole 3910 is in communication with the second through hole 3960. The second elastic member 394 abuts against the fastener 392*a*, so that the two hook portions 3922*a* are respectively fastened to the two bulges 3962*a*. The first fixing member 391 and the second fixing member 396 are fastened to each other, so that the left beam portion 32 or the right beam portion 34 is unfolded relative to the connecting portion 36.

When the button 395*a* is pressed to push the bump 3924*a* so as to push the fastener 392*a* to rotate about the second rotating shaft 393, the hook portion 3922*a* is detached from the bulge 3962*a*, and the second elastic member 394 is further compressed. In this case, the first fixing member 391 can rotate relative to the second fixing member 396, to cause the first fixing member 391 and the second fixing member 396 to be separated from each other, so that the left beam portion 32 or the right beam portion 34 can rotate relative to the connecting portion 36, to fold the beam assembly 30. The button 395*a* is lifted away from the fastener 392*a*, to cause the second elastic member 394 to restore from elastic deformation, to push the fastener 392*a* to rotate about the second rotating shaft 393, so that the hook portion 3922*a* is fastened to the bulge 3962*a*.

It may be understood that, when the components such as fasteners and bulges in FIG. 24 to FIG. 28 are made of slightly elastic hard materials, the spring is not needed to provide an elastic restoration force. By adjusting a structural design, in a similar manner such as the joint structure shown in FIG. 24 to FIG. 28, the first fixing member is engaged with the second fixing member through slight deformation of the fastener and the bulge, the engagement between the first fixing member and the second fixing member can be prevented from being loosened by using hard materials of the fastener and the bulge, and the first fixing member is detached from the second fixing member through deformation of the fastener and the bulge under a relatively large external force. In addition, a similar structure such as a screwing mechanism, a button, or the like may be further designed.

Figure 29:
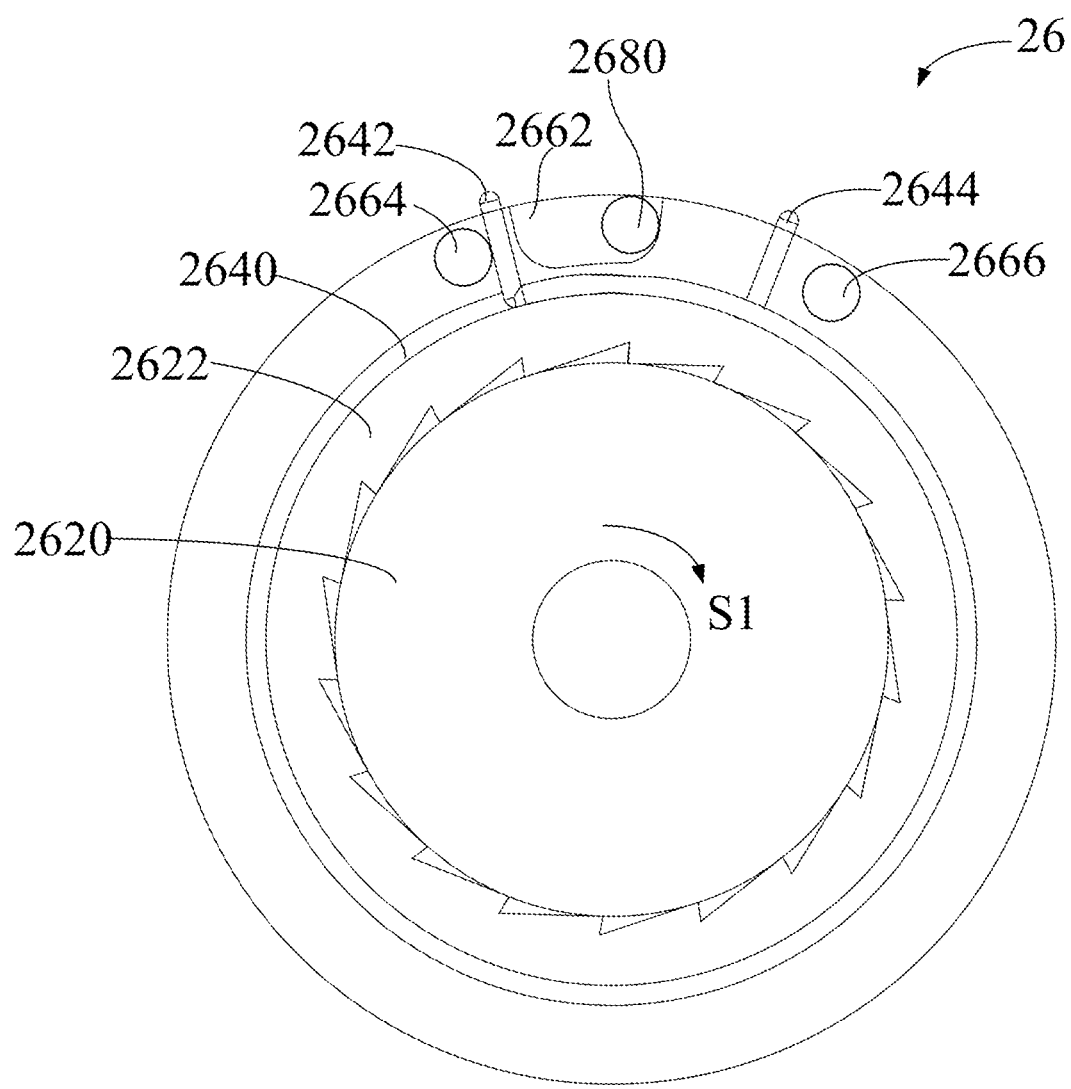
FIG. 29 is a perspective view of the driving mechanism shown in FIG. 28 in a first state.

Referring to FIG. 29, in order to increase strength of the engagement between the left beam portion 32 and the connecting portion 36 and between the right beam portion 34 and the connecting portion so that the left beam portion 32 and the right beam portion 34 can hang a heavier calibration element, a locking mechanism 50, for example, a buckle structure 50 may be further disposed on the beam of the calibration bracket 100. One of the buckle structures 50 is connected between the left beam portion 32 and the connecting portion 36, and the other one of the buckle structures 50 is connected between the right beam portion 34 and the connecting portion 36.

Each of the buckle structures 50 includes a first buckle 52 and a second buckle 54. The connecting portion 36 is provided with a first buckle 52. One end of the first buckle 52 is hinged to the connecting portion 36. The one end of the first buckle 52 hinged to the connecting portion 36 is provided with a pulling portion 522. The other end of the first buckle 52 is provided with a hook rod 524. The left beam portion 32 or the right beam portion 34 is provided with a second buckle 54. The second buckle 54 is provided with a buckle portion 544. A position at which the left beam portion 32 or the right beam portion 34 is hinged to the connecting portion 36 is located on one side of the connecting portion 36, and the first buckle 52 and the second buckle 54 are located on the other side of the connecting portion 36. When the left beam portion 32 and the right beam portion 34 are unfolded relative to the connecting portion 36, the left beam portion 32 and the right beam portion 34 are respectively in contact with the connecting portion 36, and the hook rod 524 is fastened to the buckle portion 544. By pulling the pulling portion 522, the hook rod 524 is detached from the buckle portion 544, and the first buckle 52 and the second buckle 54 may be separated from each other, so that the left beam portion 32 or the right beam portion 34 can be folded relative to the connecting portion 36.

It may be understood that, in some other embodiments, the positions of the first buckle 52 and the second buckle 54 may be transposed, that is, the first buckle 52 is disposed on the left beam portion 32 or the right beam portion 34, and the second buckle 54 is disposed on the connecting portion 36. In some embodiments, the first buckle 52 and the second buckle 54 may be used in conjunction with the joint mechanism 39. In other words, in this case, the joint mechanism 39 is disposed in the inner walls of the left beam portion 32, the right beam portion 34 and the connecting portion 36. In some embodiments, the first buckle 52 and the second buckle 54 may also be used alone. In other words, in this case, no joint mechanism 39 is disposed in the inner walls of the left beam portion 32, the right beam portion 34 and the connecting portion 36, and a gemel is added at a position at which the left beam portion 32, the right beam portion 34 and the connecting portion 36 need to be connected.

It may be understood that, an advantage that the locking mechanism such as the buckle 50 when used together with the joint mechanism 39 is that the buckle 50 can temporarily fasten components of the beam. Since the beam of the calibration bracket 100 is usually long, the left beam portion 32 and the right beam portion 34 are usually designed to be long, and therefore are relatively heavy. Supporting the left beam portion 32 or the right beam portion 34 while operating the locking mechanism 50 between either and the connecting portion 36 is very inconvenient for an operator. However, the buckle 50 resolves the problem. The operator does not need to support the left beam portion 32 or the right beam portion 34, and then locks the components of the beam by operating the locking mechanism, so that the two ends of the beam can bear relatively heavy calibration elements.

It may be understood that the embodiment provided in this specification is not the unique implementation to implement temporary engagement. For example, when the fastener or the bulge in the joint mechanism is made of a hard material with specific elasticity, the temporary engagement can also be implemented without the structure such as the spring and the rotating shaft described in the embodiments. In this case, the knob may also be used to push the buckle and the bulge to prevent falling, or the button may be used to implement the quick detachment between the fastener and the bulge.

Figure 30:
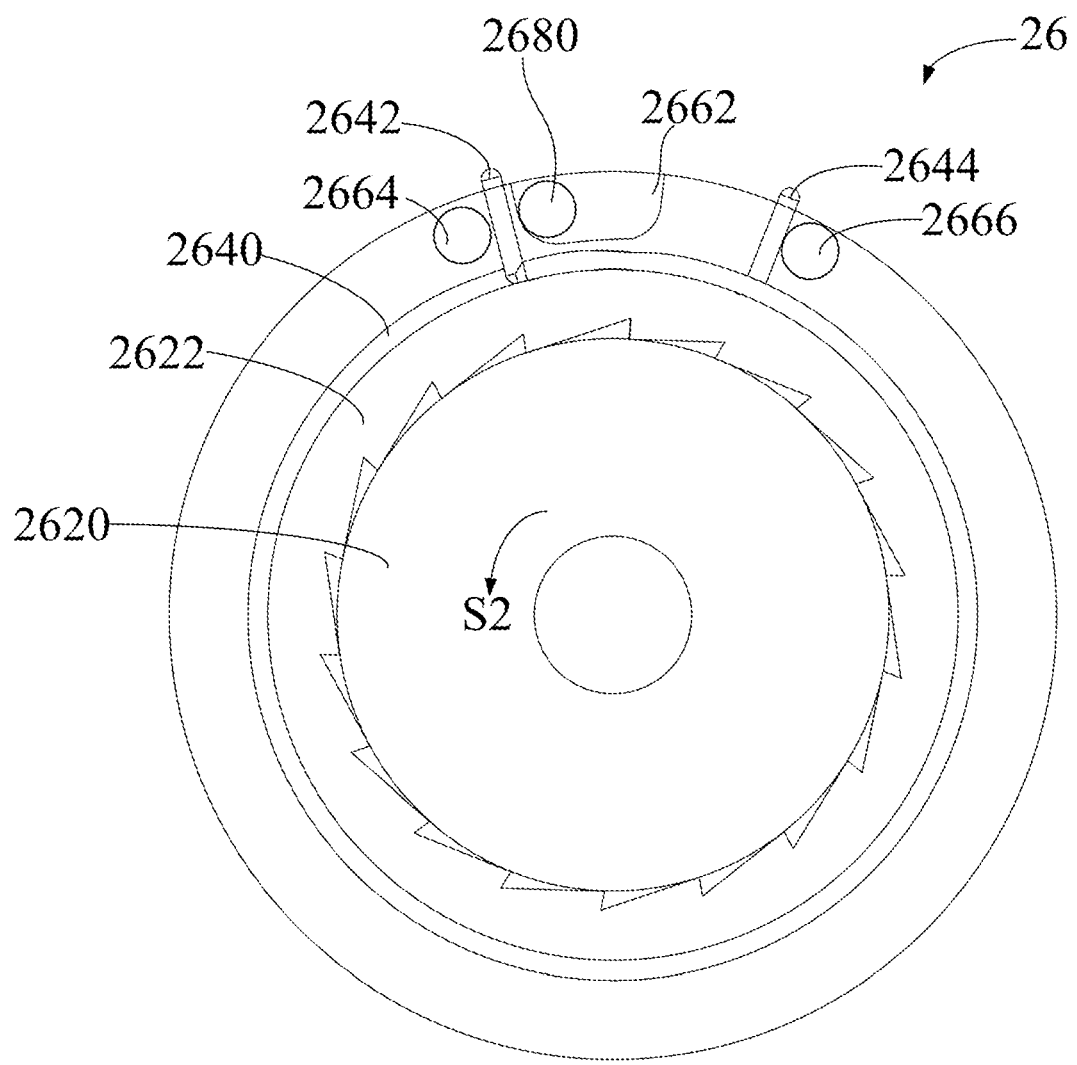
FIG. 30 is a perspective view of the driving mechanism shown in FIG. 28 in a second state.
Figure 31:
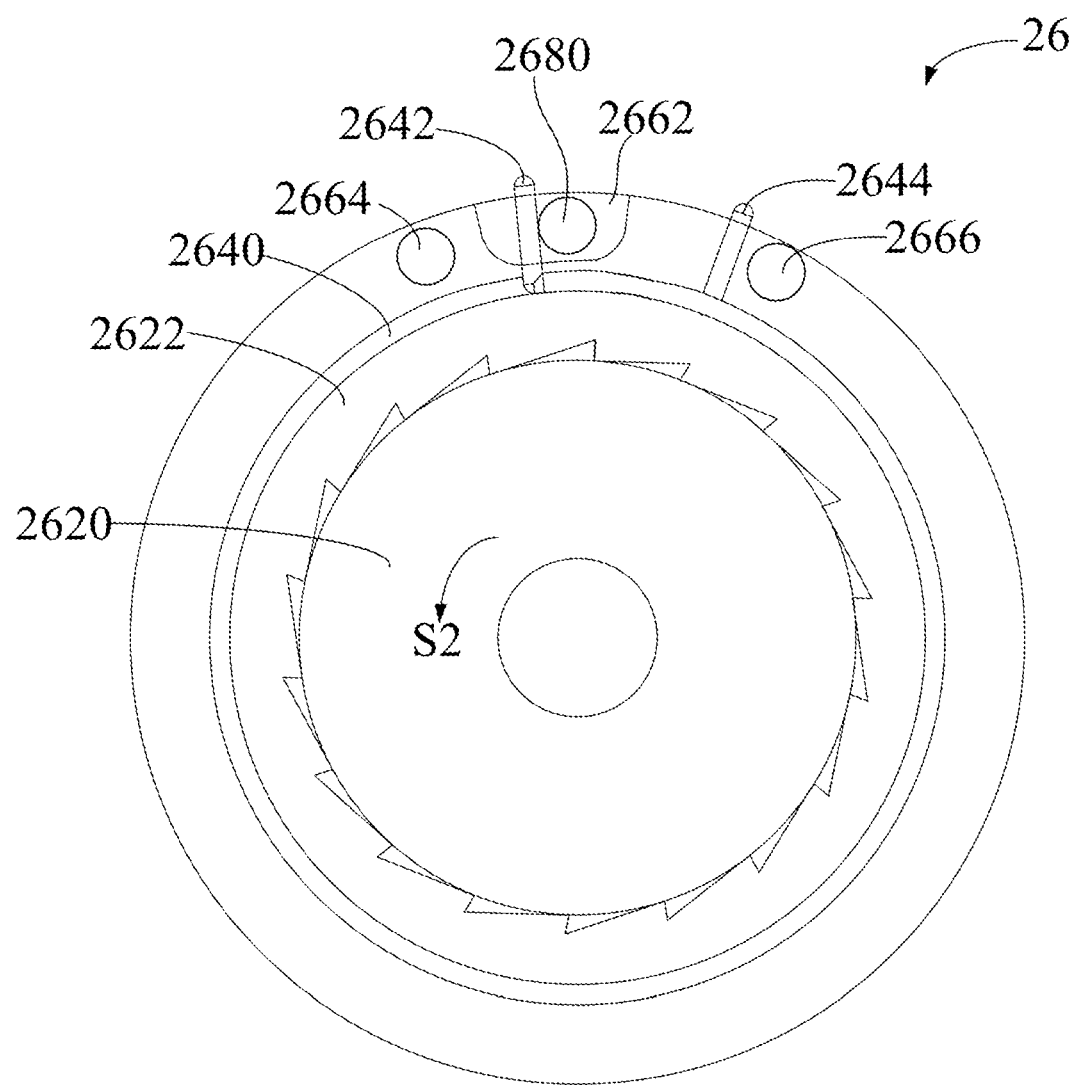
FIG. 31 is a perspective view of the driving mechanism shown in FIG. 28 in a third state.

It may be understood that other locking mechanisms may also be used, for example, a locking mechanism 395*b* shown in FIG. 30 and FIG. 31. The locking mechanism 395*b* includes a mounting support 3950*b*, a locking cam handle 3952*b*, an urging post 3954*b* and a third elastic member 3956*b*. The mounting support 3950*b* is mounted to the first fixing member 391. The locking cam handle 3952*b* is mounted to the mounting support 3950*b*. The locking cam handle 3952*b* can rotate relative to the mounting support 3950*b*, to drive the urging post 3954*b* to abut against the fastener 392, so that the first fixing member 391 and the second fixing member 396 are fastened to each other. The locking cam handle 3952*b* has a structure the same as the structure of the cam handle 354*a* shown in FIG. 20 and FIG. 21, and the structure of the locking cam handle 3952*b* is not described in detail herein. The urging post 3954*b* passes through the first fixing member 391. One end of the urging post is configured to abut against the locking cam handle 3952*b*, and the other end is configured to abut against a fastener 392*b*. The third elastic member 3956*b* is a compression spring. The compression spring is sleeved on the urging post 3954*b*. One end of the third elastic member 3956*b* is fixed to the urging post 3954*b*, and the other end abuts against the fastener 392.

The locking cam handle 3952*b* is rotated to push the urging post 3954*b* to abut against the fastener 392, so that the first fixing member 391 and the second fixing member 396 are fastened to each other. In this case, the third elastic member 3956*b* is compressed. The locking cam handle 3952*b* is rotated in an opposite direction, to cause the third elastic member 3956*b* to push the urging post 3954*b* to move upward to be detached from the fastener 392, so that the first fixing member 391 and the second fixing member 396 can be separated from each other.

It may be understood that, in some embodiments, both the locking mechanism 395 in FIG. 24, FIG. 25 and FIG. 26 and the button 395*a* in FIG. 27 and FIG. 28 may be replaced with the locking mechanism 395*b*.

In this embodiment, the beam assembly 30 is mounted on the top surface of the movable vertical rod 24. In this way, a center of gravity of the beam assembly 30 is closer to a center of gravity of a stand assembly 20 compared with the traditional calibration bracket, so that stability of the calibration bracket can be improved and a base body 12 with a smaller area can be used. It may be understood that, in some other embodiments, the beam assembly 30 may be mounted at different positions on the stand assembly 20 according to different requirements, so that the beam assembly 30 is located at an appropriate height and may be configured to hang calibration elements with a relatively small weight, for example, a radar absorption/reflection plate, a reflector, and the like.

Figure 32:
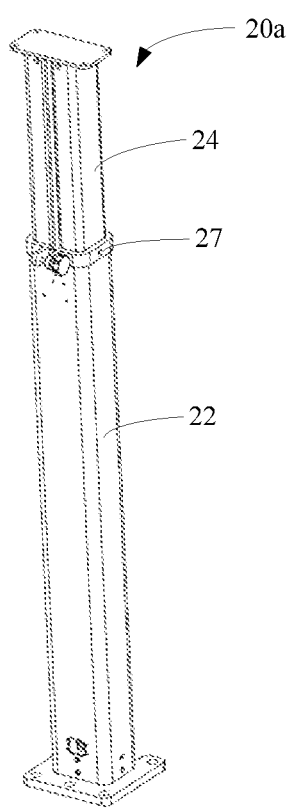
FIG. 32 is a three-dimensional view of a stand assembly according to still other embodiments.
Figure 33:
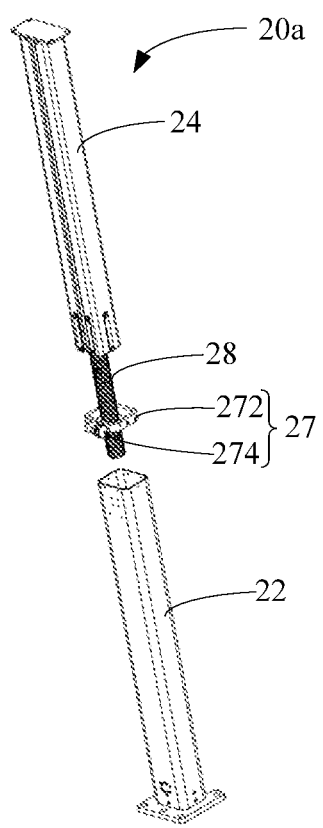
FIG. 33 is an exploded view of the stand assembly shown in FIG. 32.

Referring to FIG. 32 and FIG. 33 together, another embodiment of the present invention further provides a calibration system 600, including a calibration element and the calibration bracket 100 provided in the foregoing embodiments. The calibration element may be hung on the calibration bracket 100. For example, the calibration element is a reflector 300 and a distance measurement apparatus 400 (see FIG. 32). The reflector 300 may be hung on a first guide rail 322 or a second guide rail 342 through a slider or a fixing block. The slider or the fixing block is mounted to the first guide rail 322 or the second guide rail 342, and can slide in the first guide rail 322 or the second guide rail 342 together with the reflector 300, and the distance measurement apparatus 400 is fixedly mounted to the beam assembly 30. The reflector 300 may also be a target 300. Two targets are hung on the first guide rail 322 and the second guide rail 342 through the slider or the fixing block. The reflector or the target 300 may be further directly mounted to the beam assembly 30 by using a hook, or the like. In this case, the first guide rail 322 and the second guide rail 342 may be cancelled.

The foregoing distance measurement apparatus 400 is configured to measure a height of the beam assembly 30 from the ground, which is preferably displayed on a liquid crystal display screen of the distance measurement apparatus 400. In an embodiment, the distance measurement apparatus 400 is a laser rangefinder. A through hole 120 is disposed on the base 10 so that a laser of the laser rangefinder 400 aims at the ground to measure the height of the beam assembly 30 from the ground.

Since the distance measurement apparatus 400 has specific dimensions, during measurement of a vertical distance between a beam emitting surface and a center point of the calibration element, parameters in measurement software inside the distance measurement apparatus 400 may be adjusted for compensation.

For another example, the calibration element is a pattern plate 500 (see FIG. 33). The first supporting member 312 and the second supporting member 332 jointly support the pattern plate 500 to prevent falling. In addition, a first fixing block 510 may be further mounted to the first guide rail 322. The first fixing block 510 can slide in the first guide rail 322. A second fixing block 520 is mounted to the second guide rail 342. The second fixing block 520 can slide in the second guide rail 342. The first fixing block 510 and the second fixing block 520 are respectively located on two opposite sides of the pattern plate 500. The first fixing block 510 and the second fixing block 520 collaboratively clamp the pattern plate 500.

In an optional embodiment, the first fixing block 510 and the second fixing block 520 are sliders for mounting the reflector 300. A slot for clamping the pattern plate 500 is provided on opposite sides of the slider, to form a fixing block. For specific descriptions of the solution, refer to details in embodiments shown in FIG. 34, FIG. 35 and FIG. 36. It may be understood that the first fixing block 510 and the second fixing block 520 may also be magnetic blocks, which attract the pattern plate 500 from the back through magnetic absorption, to cause the pattern plate 500 to be more firmly mounted to the beam assembly 30.

Figure 34:
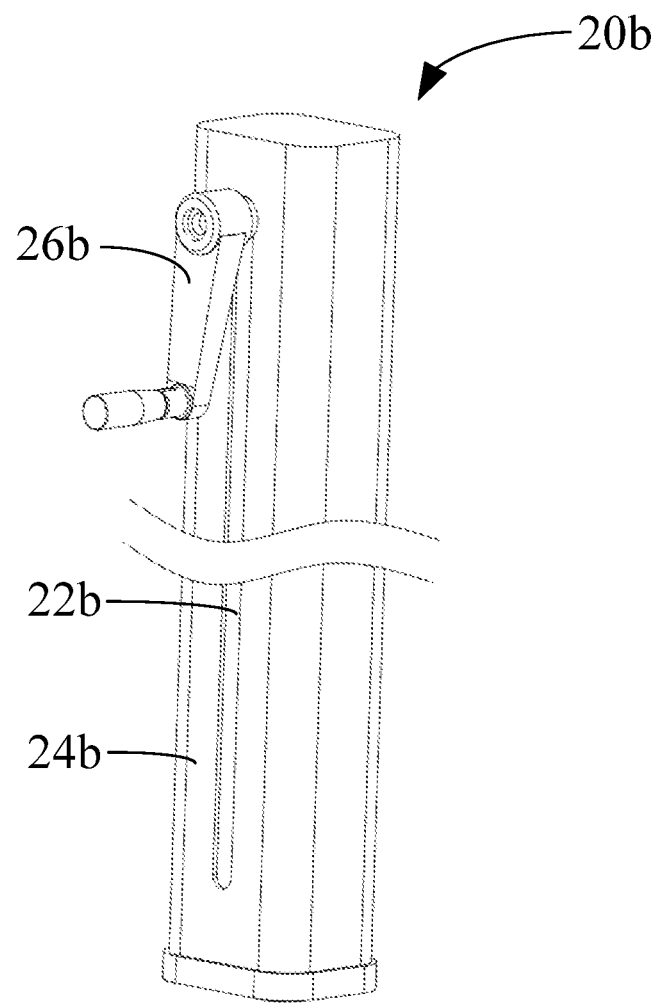
FIG. 34 is a three-dimensional view of a stand assembly according to yet other embodiments.
Figure 35:
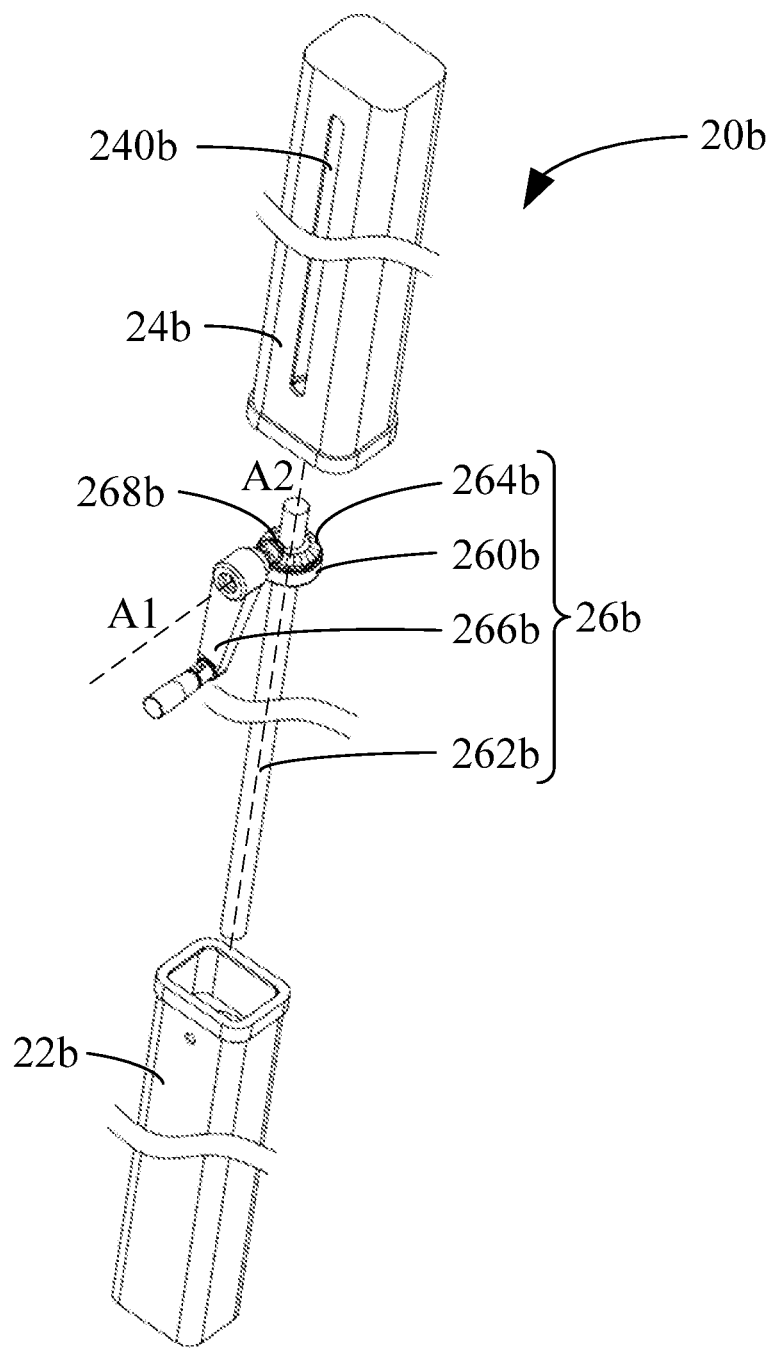
FIG. 35 is an exploded view of the stand assembly shown in FIG. 34.
Figure 36:
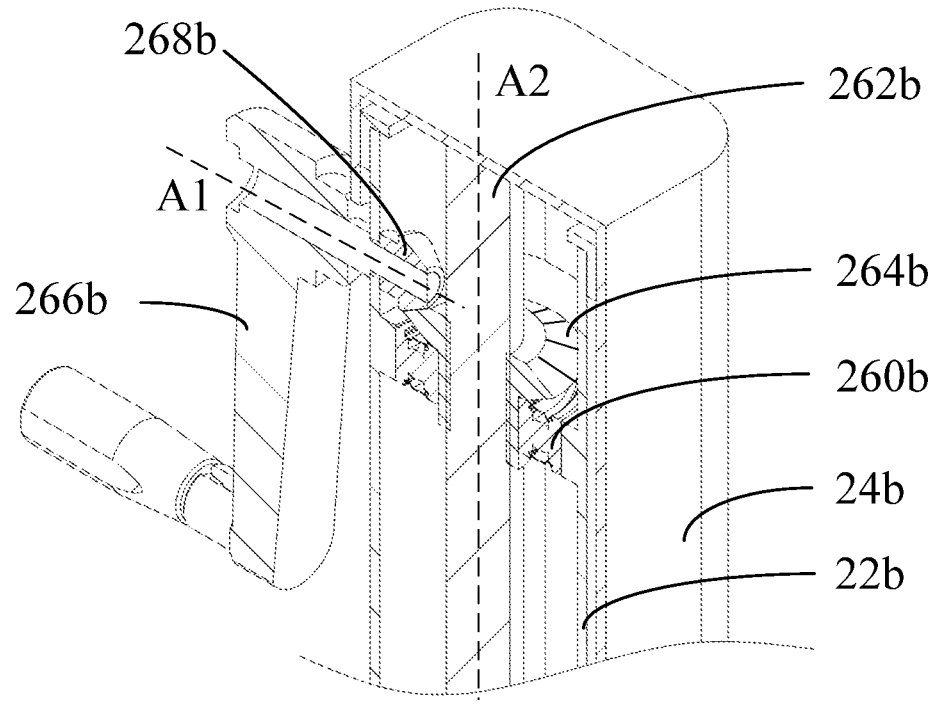
FIG. 36 is a partial cross-sectional view of the stand assembly shown in FIG. 34.

Referring to FIG. 34, FIG. 35 and FIG. 36 together, in a foldable bracket 100, there is no vertical rod portion on the mounting base 35. Therefore, unlike a common calibration bracket, large-sized calibration elements such as a large-sized pattern plate for calibrating a front windshield camera cannot be firmly mounted by using an upper end of a vertical rod. Therefore, it is necessary to design a foldable bracket structure in which large-sized calibration elements can also be firmly mounted.

In an embodiment, the beam assembly 30 includes a beam and at least one supporting rod. The beam is connected to the at least one supporting rod. The beam supports the first fixing block 510 and the second fixing block 520. The first fixing block 510 and the second fixing block 520 can move in the beam. Each of the fixing blocks 510, 520 is configured to mount a small-sized calibration element. The first fixing block 510 and the second fixing block 520 and the at least one supporting rod can collaboratively support a large-sized calibration element. The first fixing block 510 and the second fixing block 520 respectively fix the large-sized calibration element from left and right ends, and the at least one supporting rod supports the large-sized calibration element underneath the large-sized calibration element.

Specifically, a hanging surface of the first fixing block 510 is provided with first positioning protrusions 512. The two first positioning protrusions 512 are disposed in a length direction of the beam. The two first positioning protrusions 512 are configured to accurately position a target during mounting of the target. Optionally, the first fixing block 510 is coated with a magnetic material or a magnetic element is mounted thereon, or the first fixing block is a magnetic block, to mount the target in an absorption manner. Optionally, the first fixing block 510 is provided with a first holding mechanism 514. The first holding mechanism 514 may be a positioning structure such as a slot, a bump, or the like.

Similarly, a hanging surface of the second fixing block 520 is provided with second positioning protrusions 522. The two second positioning protrusions 522 are disposed in the length direction of the beam. The two second positioning protrusions 522 are configured to accurately position a target during mounting of the target. Optionally, the second fixing block 520 is coated with a magnetic material or a magnetic element is mounted thereon, or the second fixing block is a magnetic block, to mount a small-sized target in an absorption manner. Optionally, the second fixing block 520 is provided with a second holding mechanism 524. The second holding mechanism 524 may be a positioning structure such as a slot, a bump, or the like. The first holding mechanism 514 and the second holding mechanism 524 face each other.

In this embodiment, the first positioning mechanism 3120, the second positioning mechanism 3320, the first holding mechanism 514 and the second holding mechanism 524 are slots and are located on the same plane to collaboratively support a large-sized calibration element. It may be understood that in some other embodiments, one or more of the first positioning mechanism 3120, the second positioning mechanism 3320, the first holding mechanism 514 and the second holding mechanism 524 may also be bumps, and the large-sized calibration element may be correspondingly provided with a groove matching the bump, so that the first positioning mechanism 3120, the second positioning mechanism 3320, the first holding mechanism 514 and the second holding mechanism 524 can collaboratively support the large-sized calibration element.

The mounting base 35 includes a backing plate 357. The bottom end of the backing plate 357 is connected to a hanging surface of the mounting base 35 through a gemel, a hinge, or the like, and the backing plate 357 can rotate upward and downward relative to the mounting base 35. The backing plate 357 includes a hanging surface and an inner surface that are oppositely disposed. The hanging surface of the backing plate 357 is provided with third positioning protrusions 3572. The two third positioning protrusions 3572 are disposed in the length direction of the beam.

The hanging surface of the mounting base 35 is provided with a receiving groove 358. A shape of the receiving groove 358 matches a shape of the backing plate 357 so that the backing plate 357 can be clamped in the receiving groove 358.

The backing plate 357 can rotate between a first position and a second position.

At the first position, the backing plate 357 is clamped in the receiving groove 358, and the hanging surface of the backing plate 357, the hanging surface of the mounting base 35, the hanging surface of the first fixing block 510 and the hanging surface of the second fixing block 520 face the same direction. The hanging surface of the backing plate 357 protrudes from the hanging surface of the mounting base 35, and the hanging surface of the backing plate 357, the hanging surface of the first fixing block 510 and the hanging surface of the second fixing block 520 are located on the same plane (see FIG. 35). During calibration of a vehicle-mounted element, the backing plate 357, the first fixing block 510 and the second fixing block 520 may be respectively configured to hang a calibration element. In this case, all of the hanging surfaces are on the same plane, which means that surfaces for calibration by calibration elements (which are supposed to have the same thickness) hung thereon are on the same plane. Preferably, the hanging surface of the backing plate 357, the hanging surface of the first fixing block 510 and the hanging surface of the second fixing block 520 are provided with positioning structures configured to accurately mount the calibration elements at predetermined positions on the hanging surfaces, for example, the first positioning protrusion 3572, the second positioning protrusion 512 and the third positioning protrusion 522. In this case, the backing plate 357, the first fixing block 510 and the second fixing block 520 may be independently configured to hang small-sized calibration elements with a relatively small weight, for example, reflectors, small-sized pattern plates, or the like (see FIG. 29). Optionally, a back surface or a lateral surface of the calibration element may be provided with a positioning structure matching the positioning structure on the above hanging surface, for example, a positioning hole (not shown in the figure). The first positioning protrusion 3572, the second positioning protrusion 512 or the third positioning protrusion 522 may be inserted into the positioning hole for positioning. Optionally, the first positioning protrusion 3572, the second positioning protrusion 512 or the third positioning protrusion 522 may be magnetic to enhance an absorption force to the calibration element.

At the second position, the backing plate 357 rotates to a position below the mounting base 35, and an inner surface of the backing plate 357 is flush with the hanging surface of the mounting base in the same direction. In this case, the calibration bracket 100 may be configured to hang large-sized calibration elements with relatively large weight and volume, for example, a large-sized target plate (which is usually a large-sized pattern plate). The bottom side of the large-sized pattern plate is supported on a first slot 3120 and a second slot 3320, and left and right sides of the large-sized pattern plate are respectively clamped in a third slot 514 and a fourth slot 524 (see FIG. 36). Since the first fixing block 510 and the second fixing block 520 have specific thicknesses, if the target is to be mounted by using the first slot 514 and the second slot 524 on sides thereof, the target is bound to be mounted on a plane slightly behind the hanging surfaces of the first fixing block 510 and the second fixing block 520. The switching of the backing plate 357 between the first position and the second position is to adjust a distance difference between target mounting planes in the two mounting manners. A back surface of the pattern plate may also not abut against the hanging surface of the mounting base 35. Practice has proved that the large-sized pattern plate can be firmly mounted merely by using fixing action of the first fixing block 510 and the second fixing block 520 and supporting action of the supporting rod. Optionally, the back surface of the pattern plate may abut against the hanging surface of the mounting base 35, and the hanging surface of the mounting base 35 may be coated with magnetic materials or magnetic units may be mounted thereon, or the mounting base 35 is made of magnetic materials for attracting the back surface of the large-sized pattern plate. Optionally, the inner surface of the backing plate 357 may also be coated with magnetic materials or magnetic units may be mounted thereon, or the backing plate 357 is made of the magnetic material for attracting the back surface of the large-sized pattern plate. Optionally, the inner surface of the backing plate 357 and the hanging surface of the mounting base 35 may also have no mounting function (for example, located behind the back surface of the large-sized calibration element). Mere clamping action of the third slot 514 and the fourth slot 524 and the supporting action of the first supporting member 312 and the second supporting member 332 are sufficient to support a pattern plate with a relatively large area.

In an embodiment, the first holding mechanism 514 and the second holding mechanism 524 are protrusions, and a front surface of the large-sized calibration element is provided with a groove matching the protrusion. At the second position, the protrusion is positioned in the groove, the hanging surface of the mounting base 35 abuts against the back surface of the large-sized calibration element, and the hanging surface of the mounting base 35 and the protrusion cooperatively hold the large-sized calibration element from the front and the back. Optionally, the inner surface of the backing plate 357 may be flush with the hanging surface of the mounting base 35 and together abut against the back surface of the large-sized calibration element. Further, the inner surface of the backing plate 357 and the hanging surface of the mounting base 35 may be magnetic to attract a back surface of the large-sized calibration element.

It may be understood that, in some other embodiments, the backing plate 357 can rotate in any direction, so that the backing plate 357 is clamped in the receiving groove 358 or is detached from the receiving groove 358 to rotate until the inner surface of the backing plate 357 does not affect the mounting of the target between the third slot 514 and the fourth slot 524.

In some other embodiments, a large-sized target may be mounted through the magnetic attraction of the hanging surfaces of the first fixing block 510 and the second fixing block 520. Similarly, in this case, a lower end of the large-sized target is supported by the first supporting member 312 and the second supporting member 332 and positioned by the first slot 3120 and the second slot 3320. Optionally, the backing plate 357 is at the first position, and an absorption force to the large-sized target is enhanced by using the magnetic absorption of the backing plate 357. Optionally, the hanging surface of the mounting base 35 may be a whole without the groove 358 and the backing plate 357 disposed thereon, and the hanging surface of the mounting base 35 is made to be flush with the hanging surfaces of the first fixing block 510 and the second fixing block 520. When a large-sized target is to be mounted through the magnetic absorption of the hanging surfaces of the first fixing block 510 and the second fixing block 520, different targets or different target combinations used for vehicles of different models are all mounted on the same plane, thus eliminating an additional compensation step or a step of realignment with the bracket.

As for a manner of positioning a large-sized target plate, the following method may be adopted. During calibration of vehicles of most models, the large-sized target plate is aligned with a central axis of the vehicle, and therefore only how to position the large-sized target plate at the center of the calibration bracket is described. Requirements for positioning at other positions may be similarly designed. In an embodiment, a positioning structure, for example, a positioning protrusion 512 may be disposed on the hanging surface of one or more of the first fixing block 510, the second fixing block 520, the mounting base 35 and the backing plate 357 to position the large-sized target plate. When the large-sized target plate is to be positioned by using the positioning protrusions 512 and 522 on the first fixing block 510 and the second fixing block 520, the first fixing block 510 and the second fixing block 520 may be placed at preset positions on the beam. The preset positions may be read by using a scale on the beam. In another embodiment, positioning mechanisms (not shown in the figure) matching the first slot 3120 and the second slot 3320 may be disposed at the bottom of the large-sized target plate. Since the first supporting rod 31 and the second supporting rod 32 are at a fixed position under action of the limiting structure 3303 after being lowered, the large-sized target plate can be positioned through the first slot 3120 and the second slot 3320.

When the large-sized target plate is to be clamped by using clamping grooves 514 and 524 of the first fixing block 510 and the second fixing block 520, a mounting plane of the large-sized target plate is inconsistent with mounting planes of other small-sized targets, leaving a distance difference. The distance difference may be compensated for by using software. The calibration bracket 100 may also be pushed by a distance of the distance difference toward the vehicle before the large-sized target plate is calibrated, so that the mounting plane of the large-sized target plate and the mounting planes of other small-sized target plates are actually on the same plane again. The calibration bracket 100 may be placed by using any suitable method known or designed in the future.

It may be understood that the first positioning mechanism 3120, the second positioning mechanism 3320, the first holding mechanism 514 and the second holding mechanism 524 may be positioning mechanisms with other structures, for example, concave points, convex rings, convex points, or the like without being limited to the slots shown in the accompanying drawings. As shown in FIG. 36, the first positioning mechanism 3120, the second positioning mechanism 3320, the first holding mechanism 514 and the second holding mechanism 524 may further include inclined cross-sections to more firmly support the target plate.

It may be understood that the calibration bracket 100 may include other numbers of supporting rods in addition to two. When the supporting rod is disposed at the middle of the beam of the calibration bracket 100, there may be only one supporting rod, and lower ends of supporting members (corresponding to the supporting members 332 and 312 in FIG. 36) are additionally designed to be lengthened in an extending direction of the beam, to support the target well.

It may be understood that the target may be mounted on the hanging surfaces of the first fixing block 510, the second fixing block 520 and the backing plate 357 in other manners such as a hook in addition to magnetic attraction.

It may be understood that, during fixing of the large-sized target by using the first fixing block 510 and the second fixing block 520, in addition to clamping the large-sized target by using the clamping grooves 514 and 524, bumps (not shown in the figure) may also be used, which are respectively disposed on two sides of the first fixing block 510 and the second fixing block 520 facing each other, and then a slot is provided on a lateral surface of the large-sized target. The slot may clamp the bump, so that the large-sized target can also be fixed by using the first fixing block 510 and the second fixing block 520. In addition, the large-sized target may also be fixed through magnetic attraction.

Figure 37:
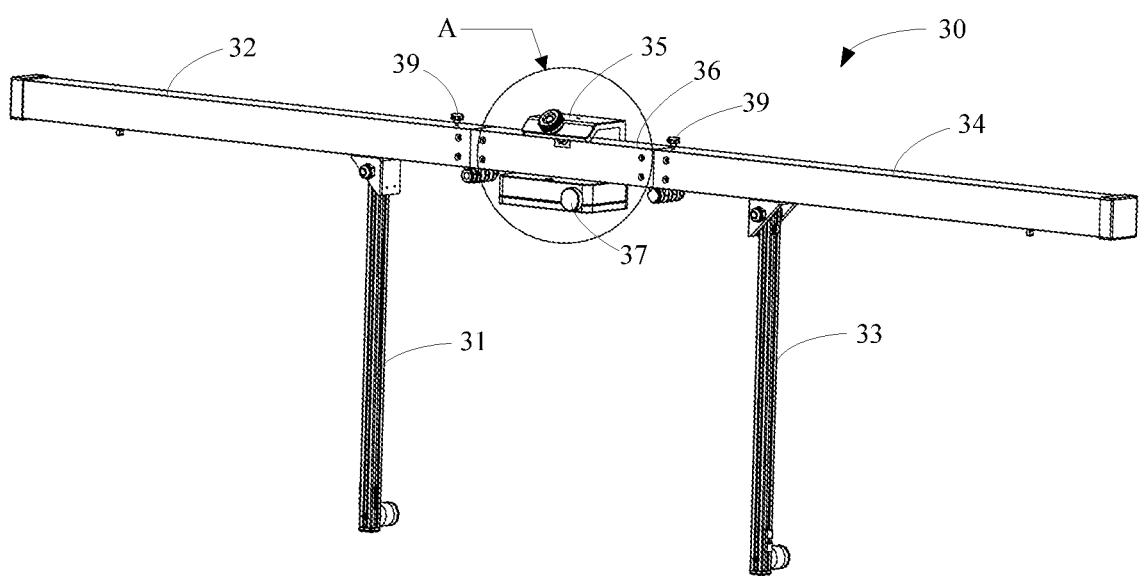
FIG. 37 is a three-dimensional view of a beam assembly of the calibration bracket shown in FIG. 1.
Figure 38:
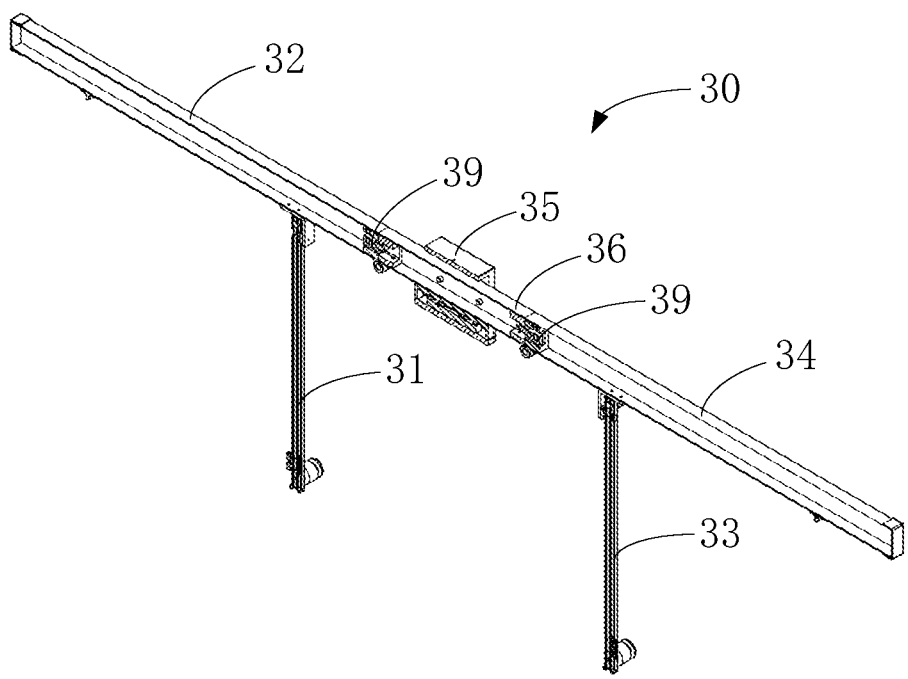
FIG. 38 is a cross-sectional view of the beam assembly shown in FIG. 37.
Figure 39:
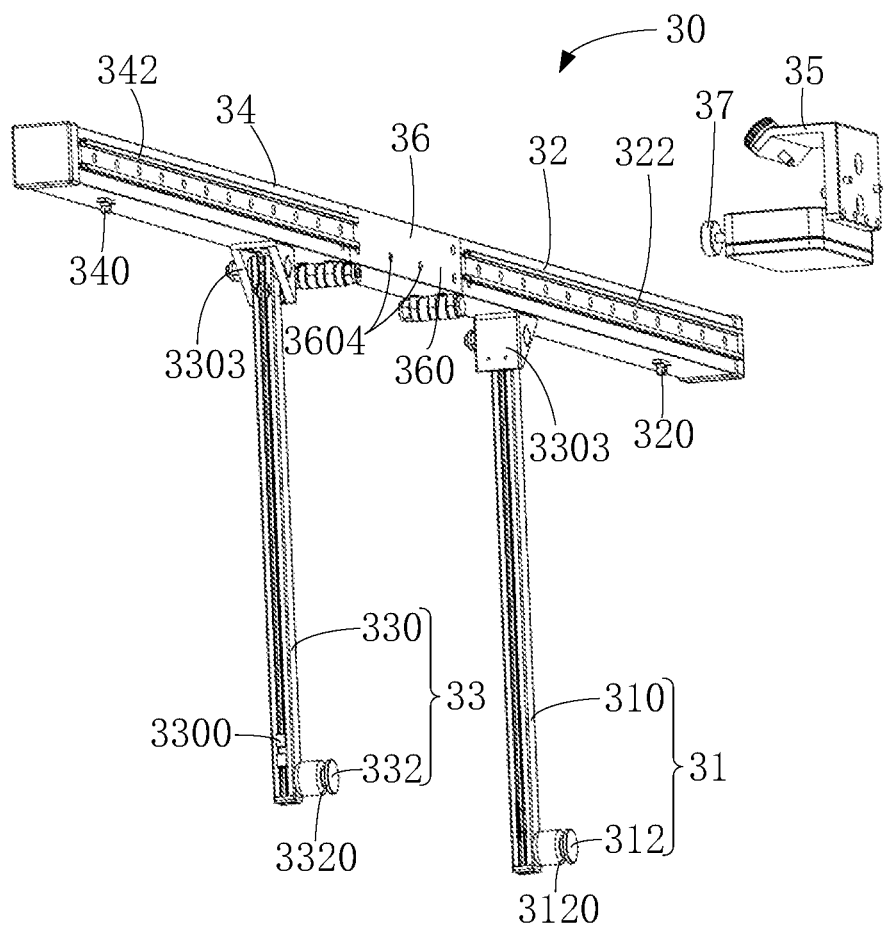
FIG. 39 is an exploded view of the beam assembly shown in FIG. 37.
Figure 40:
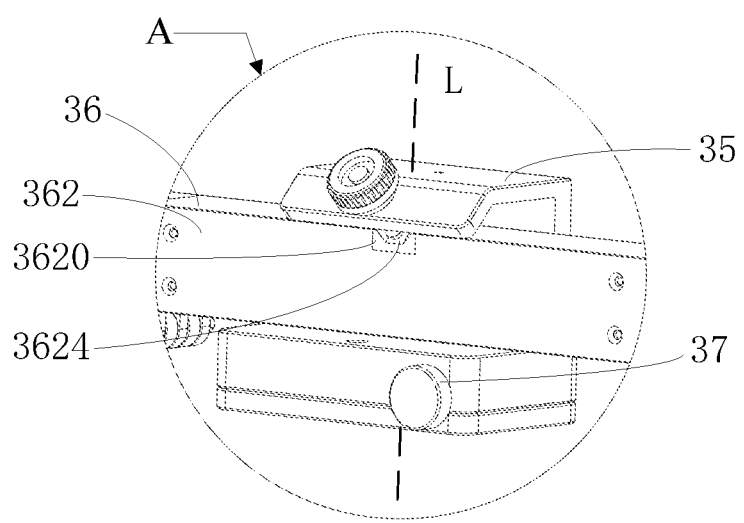
FIG. 40 is a partial enlarged view of a part A in FIG. 37.
Figure 41:
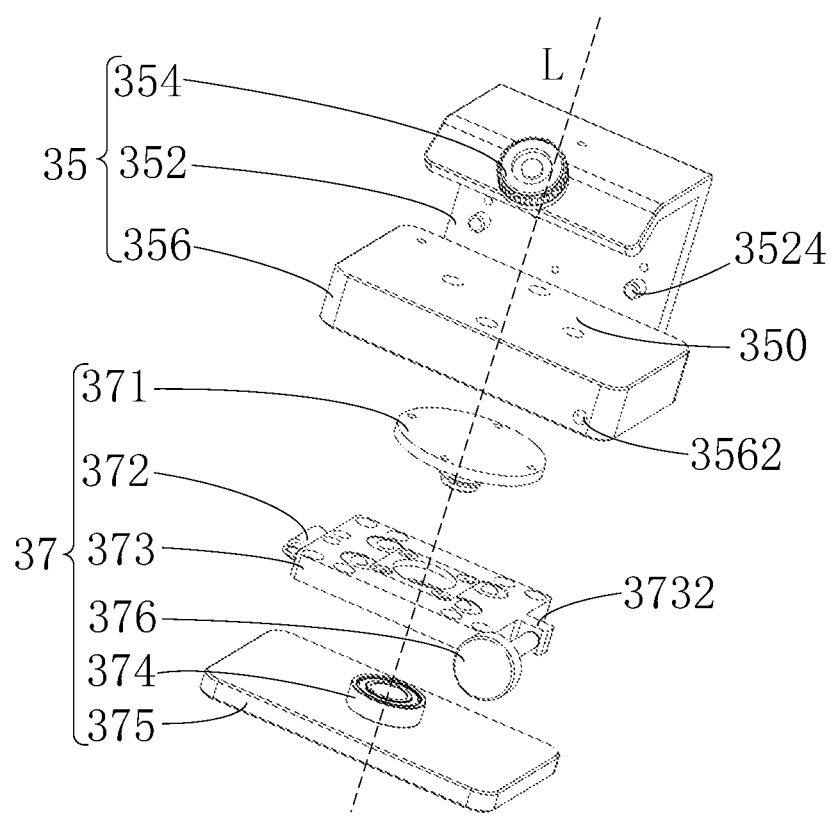
FIG. 41 is an exploded view of an adjustment mechanism of the beam assembly shown in FIG. 37.
Figure 42:
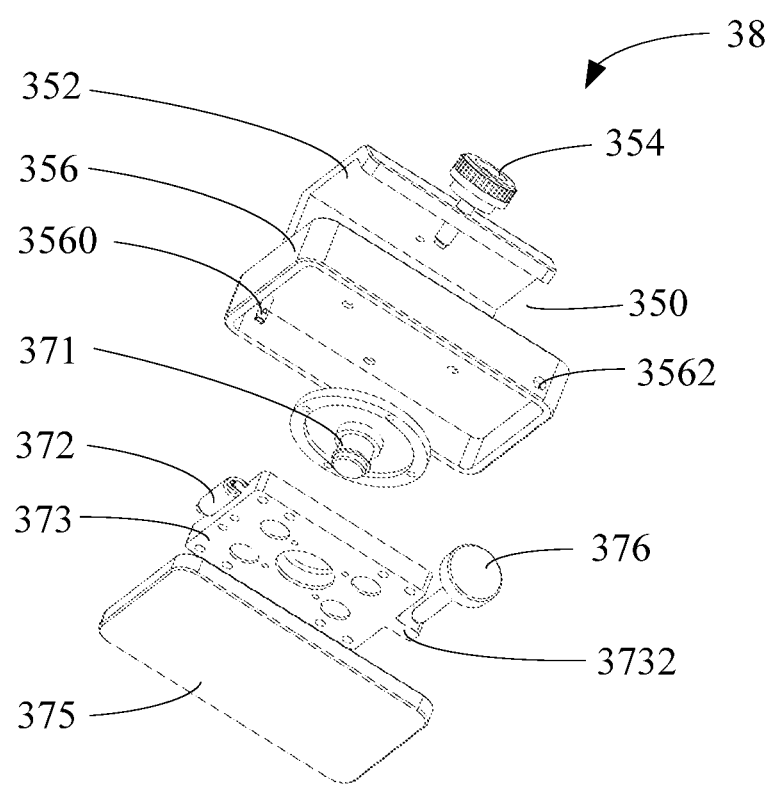
FIG. 42 is an exploded view of the adjustment mechanism shown in FIG. 37 from another perspective.
Figure 43:
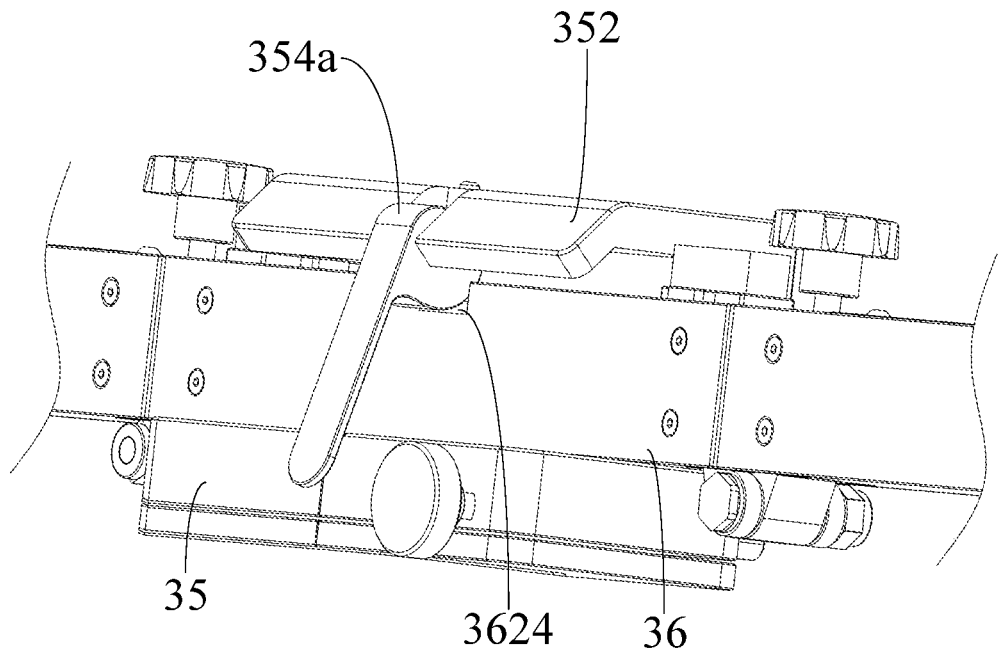
FIG. 43 is an assembly diagram of a mounting base and a beam according to some embodiments.
Figure 44:
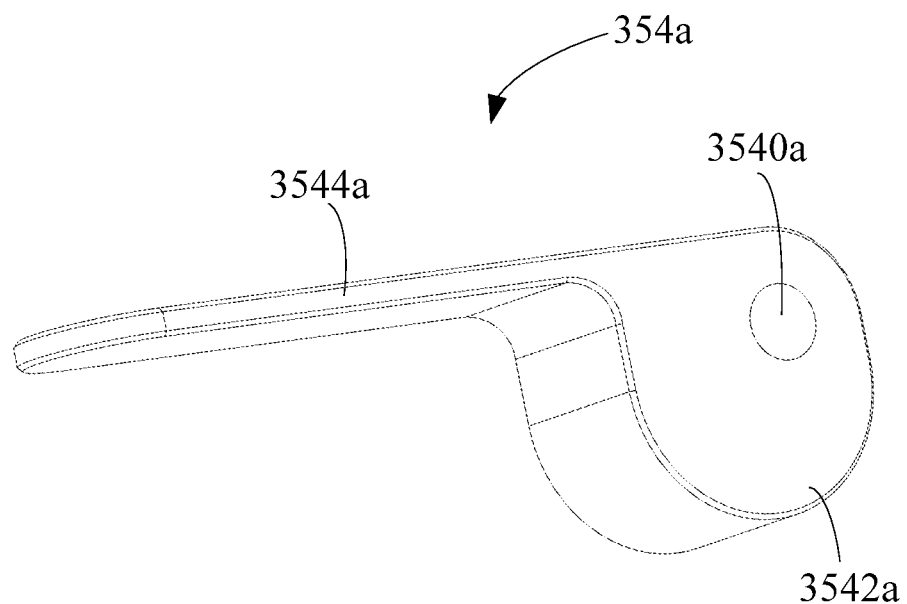
FIG. 44 is a three-dimensional view of a cam handle of the mounting base shown in FIG. 43.
Figure 45:
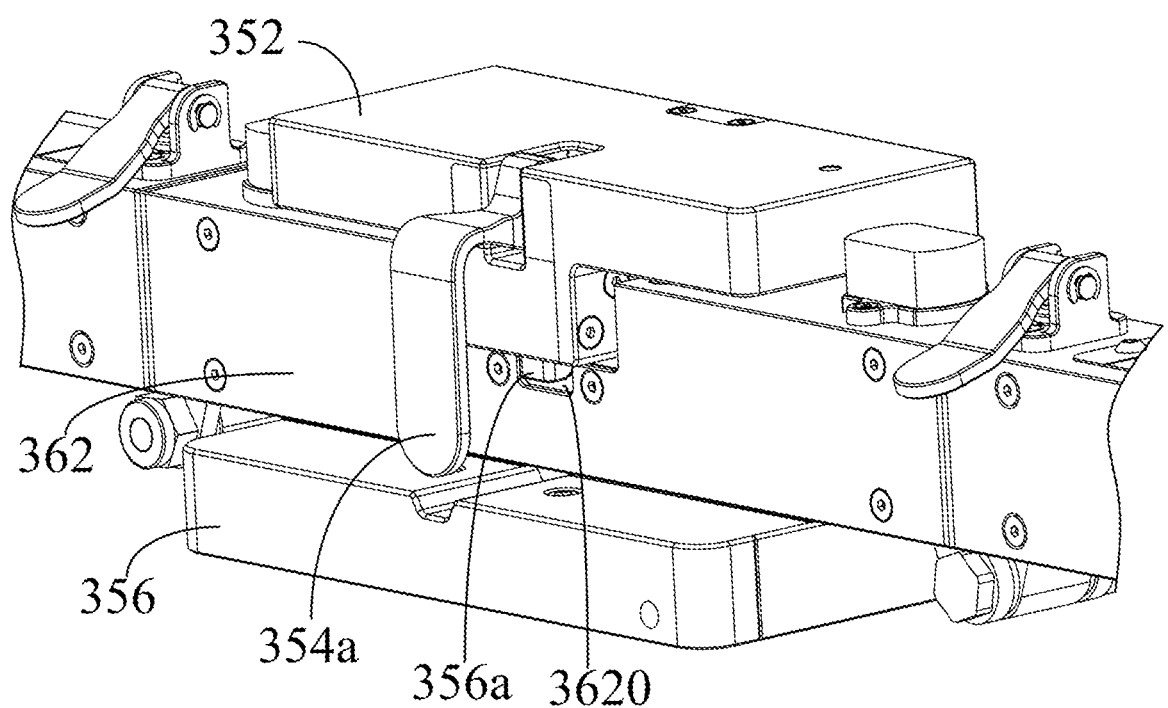
FIG. 45 is an assembly diagram of a mounting base and a beam according to some other embodiments.
Figure 46:
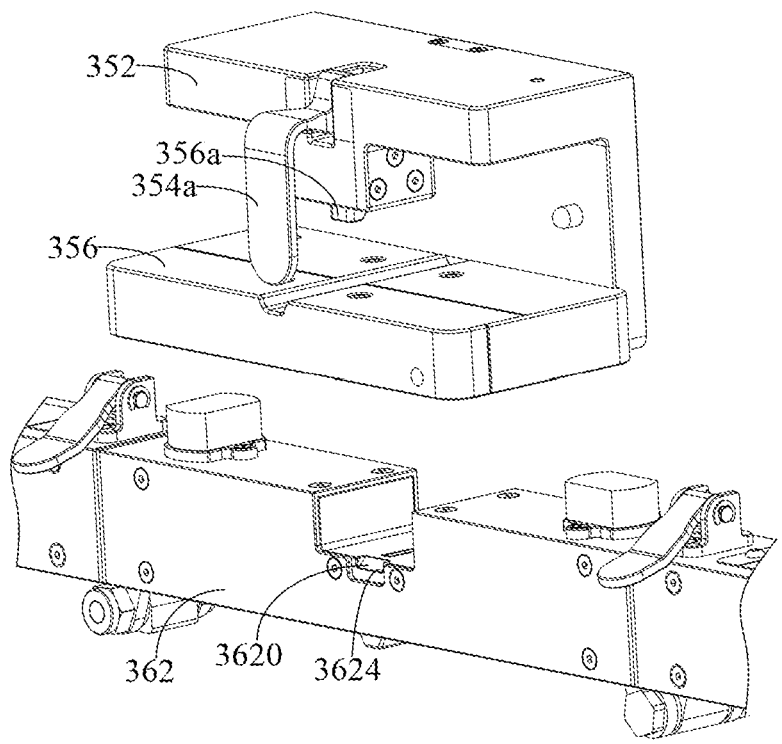
FIG. 46 is an exploded view of the mounting base and the beam shown in FIG. 45.
Figure 47:
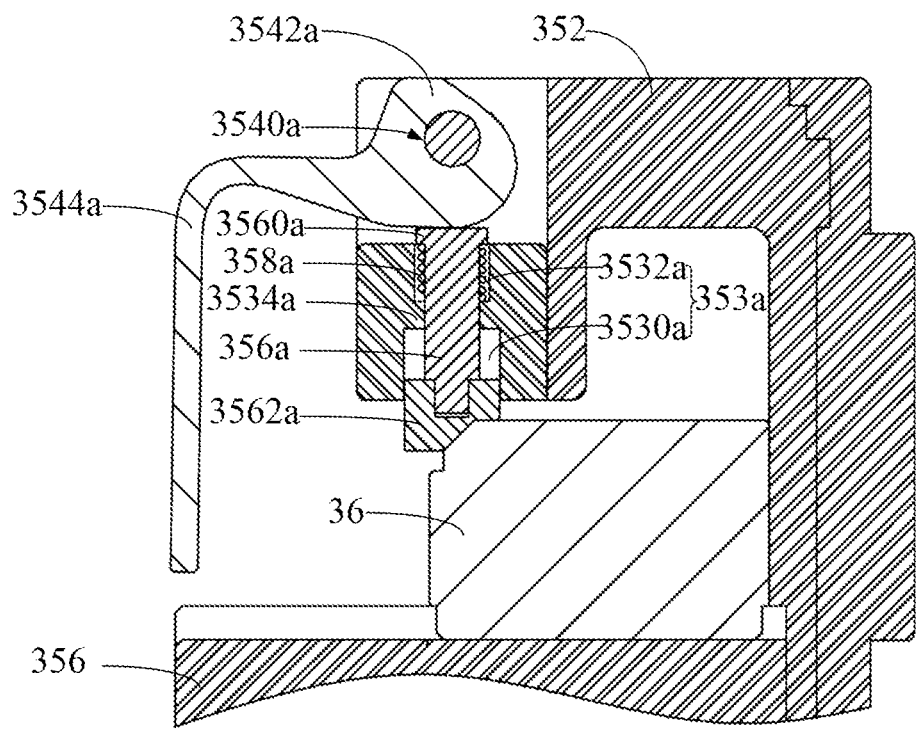
FIG. 47 is a cross-sectional view of the mounting base and the beam shown in FIG. 45.
Figure 48:
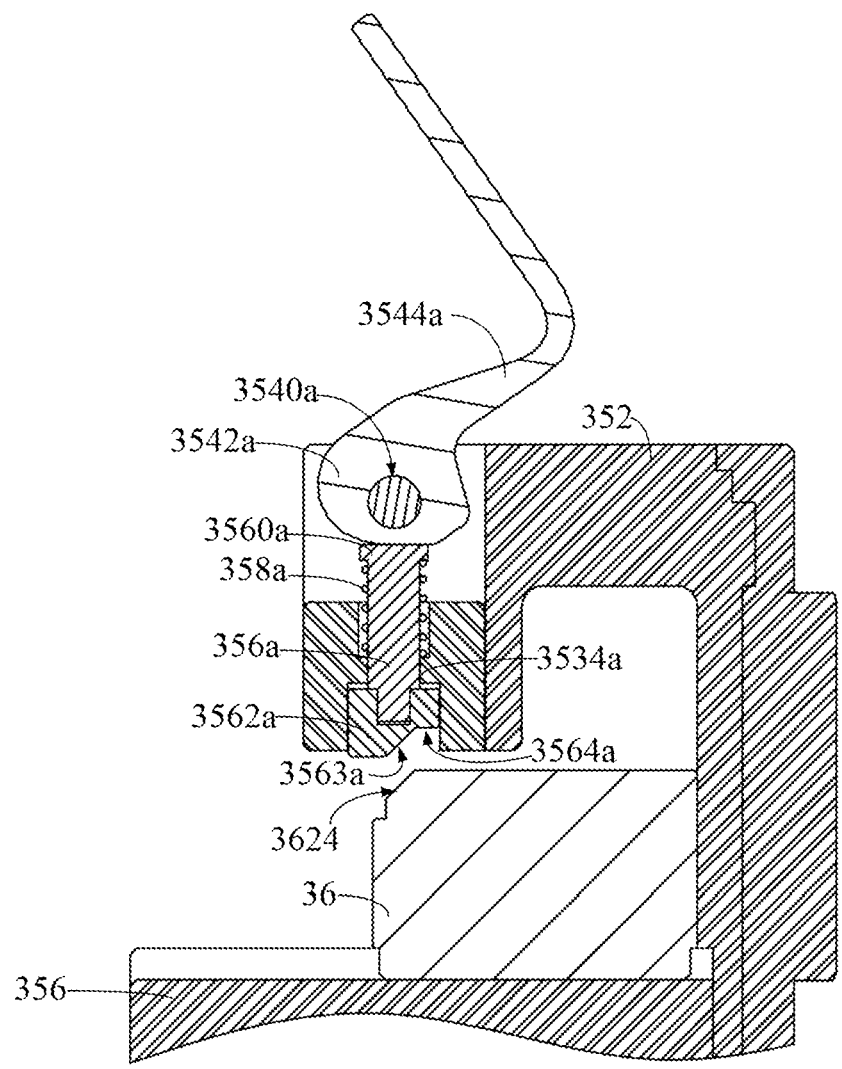
FIG. 48 is a cross-sectional view in which a limiting rod of the mounting base is detached from the beam shown in FIG. 45.
Figure 49:
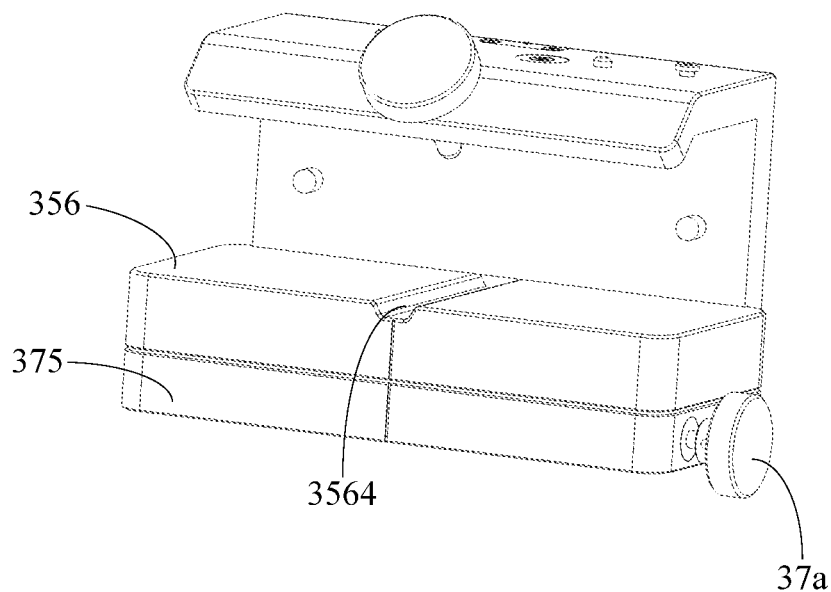
FIG. 49 is an assembly diagram of a mounting base and an adjustment mechanism according to some embodiments.
Figure 50:
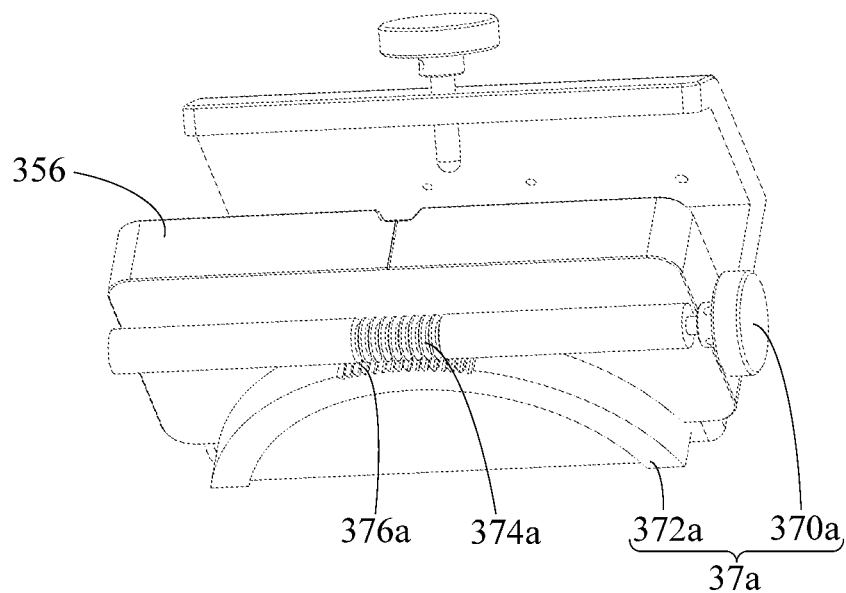
FIG. 50 is an assembly diagram of the mounting base and the adjustment mechanism shown in FIG. 49, where some components are omitted.
Figure 51:
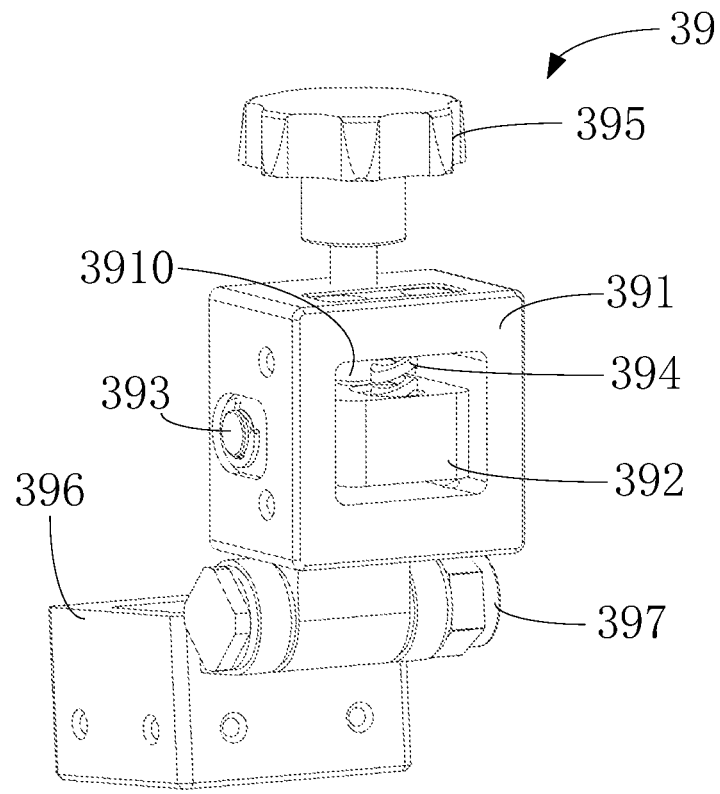
FIG. 51 is a three-dimensional view of a joint mechanism of the beam assembly shown in FIG. 37.
Figure 52:
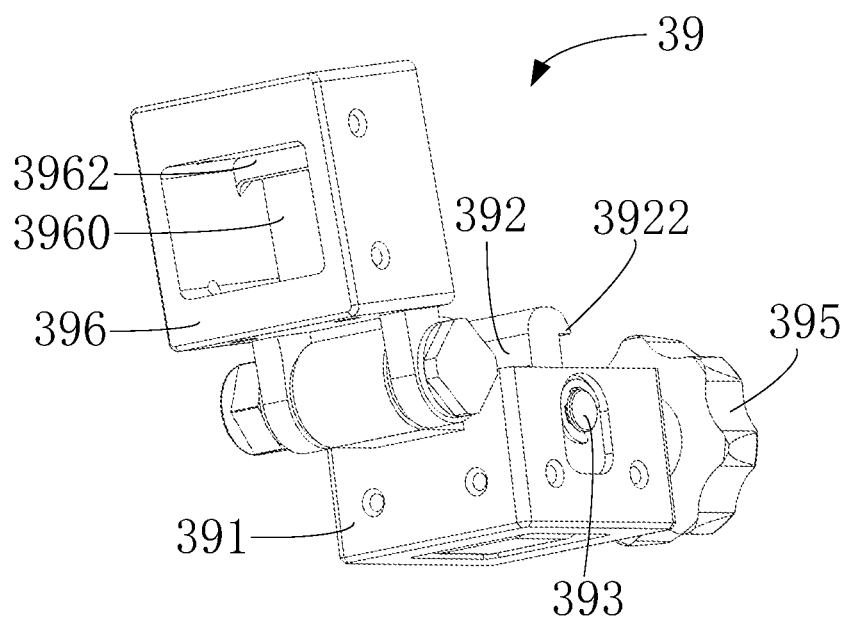
FIG. 52 is a three-dimensional view of the joint mechanism shown in FIG. 51 from another perspective.
Figure 53:
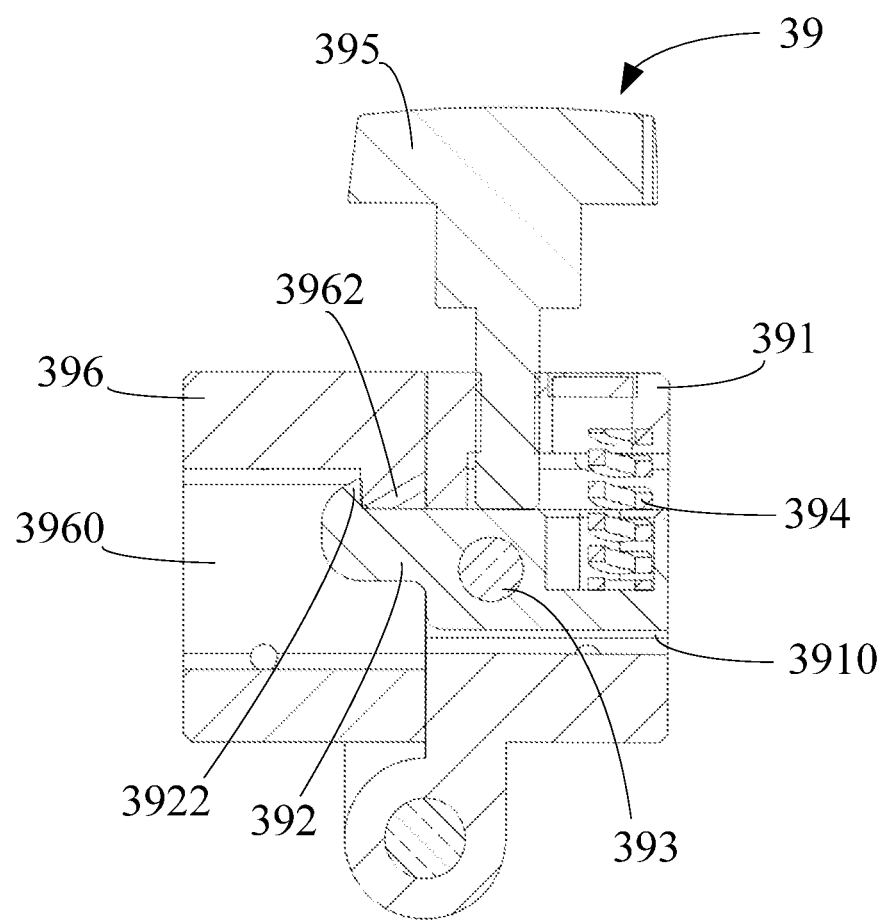
FIG. 53 is a cross-sectional view of the joint mechanism shown in FIG. 51.
Figure 54:
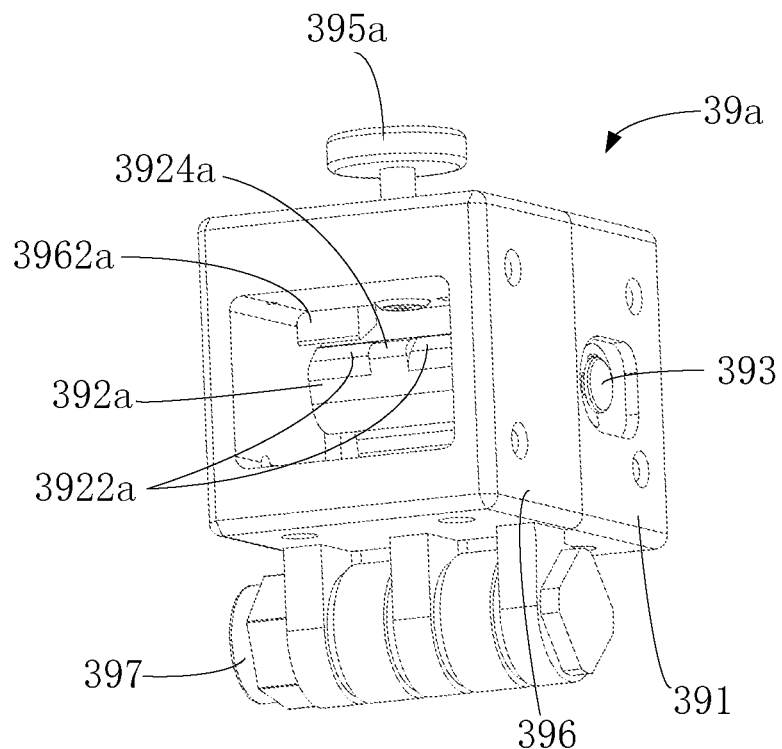
FIG. 54 is a three-dimensional view of a joint mechanism according to some embodiments.
Figure 55:
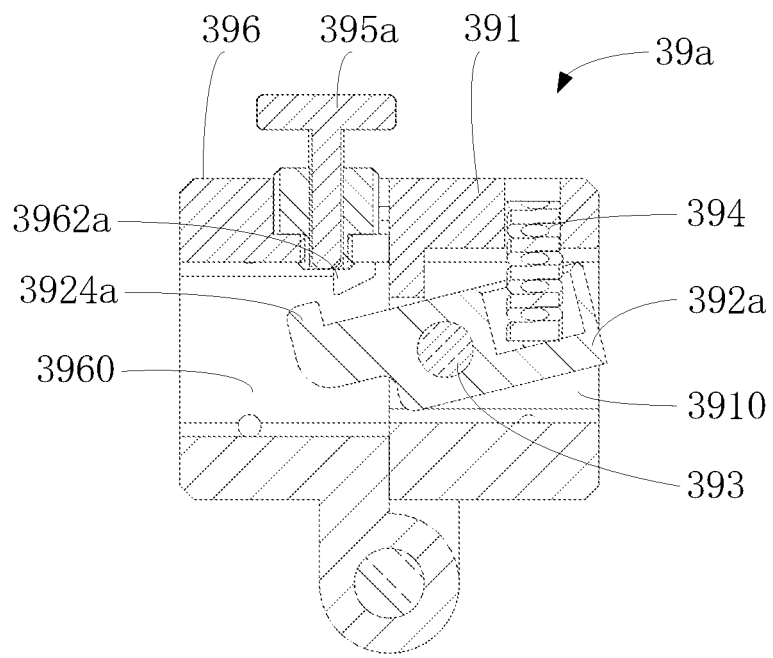
FIG. 55 is a cross-sectional view of the joint mechanism shown in FIG. 54.
Figure 56:
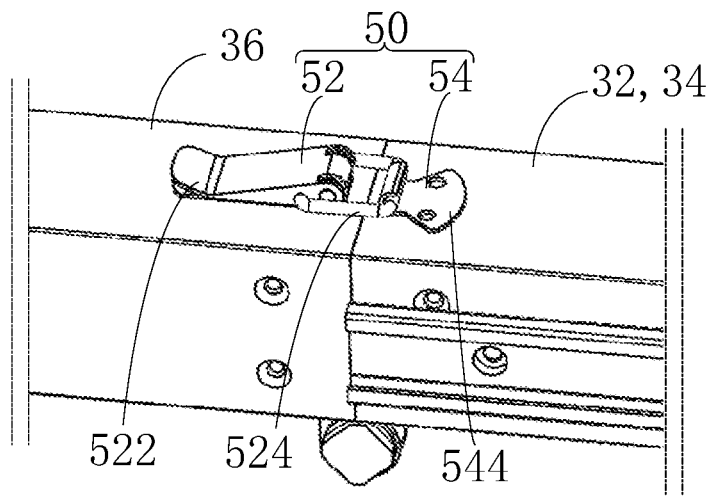
FIG. 56 is a three-dimensional view of a first buckle and a second buckle buckled with each other according to some embodiments.
Figure 57:
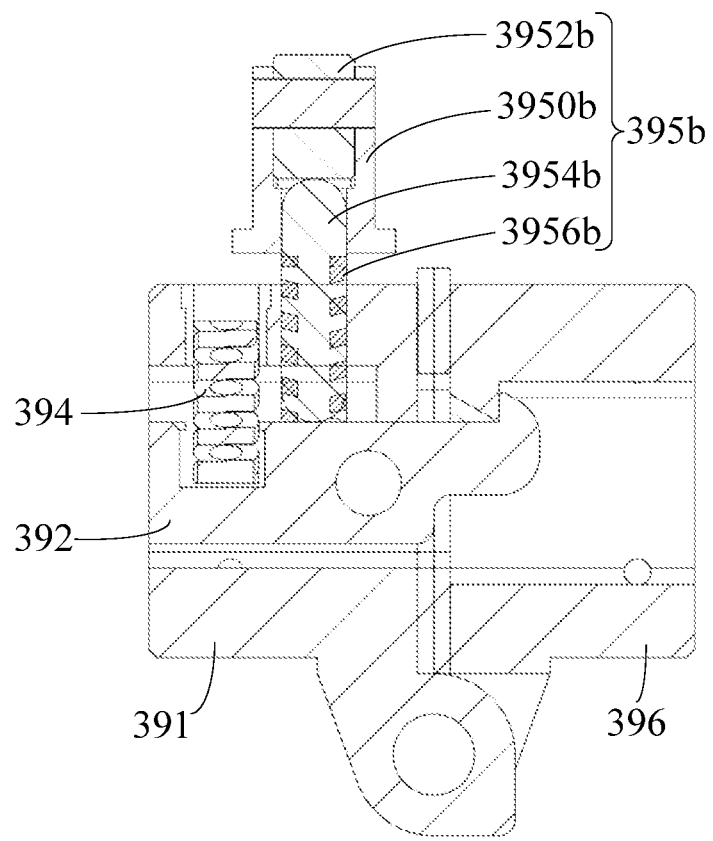
FIG. 57 is a three-dimensional view of a joint mechanism according to still other embodiments.
Figure 58:
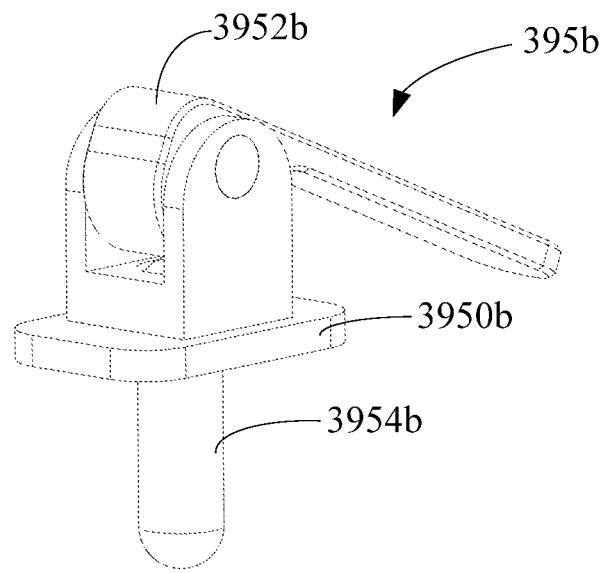
FIG. 58 is a three-dimensional view of a locking cam handle of the joint mechanism shown in FIG. 57.
Figure 59:
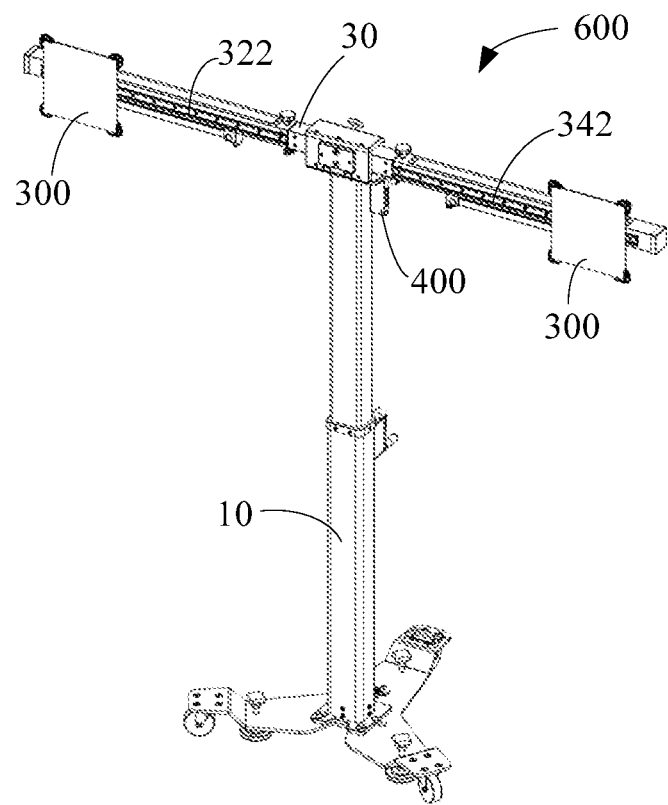
FIG. 59 is a three-dimensional view of a calibration system according to another embodiment, where the calibration system includes a calibration bracket and a calibration element, the calibration element being a reflector hung on the calibration bracket.
Figure 60:
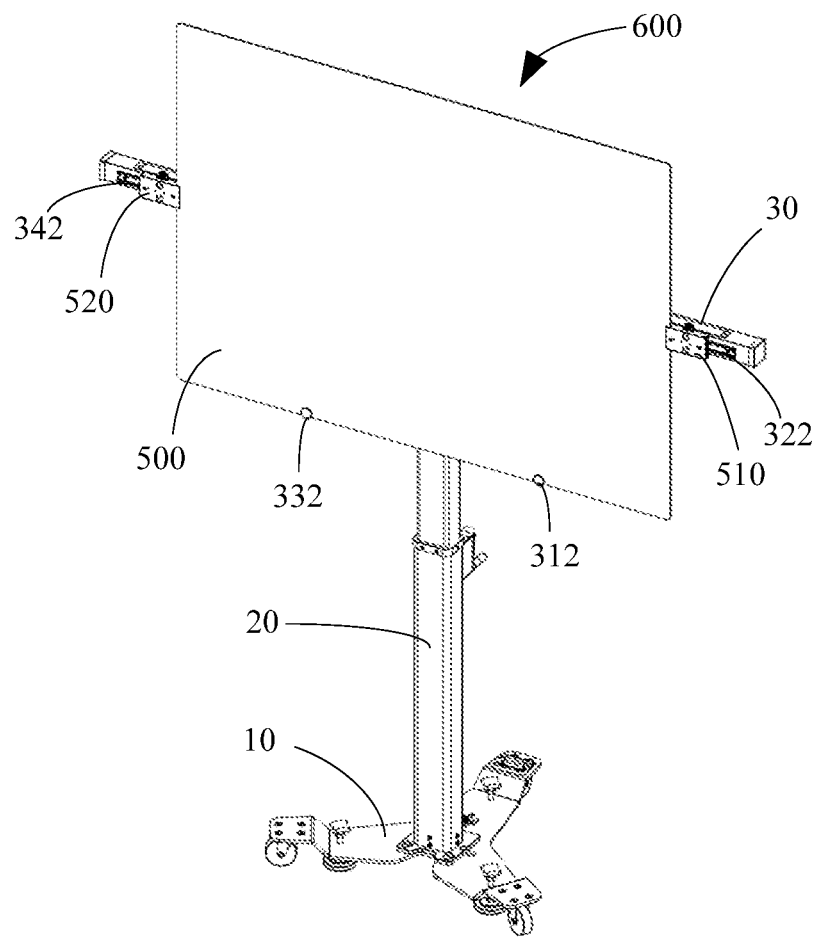
FIG. 60 is a three-dimensional view of the calibration system shown in FIG. 59, where the reflector is replaced with a pattern plate hung on the calibration bracket.
Figure 61:
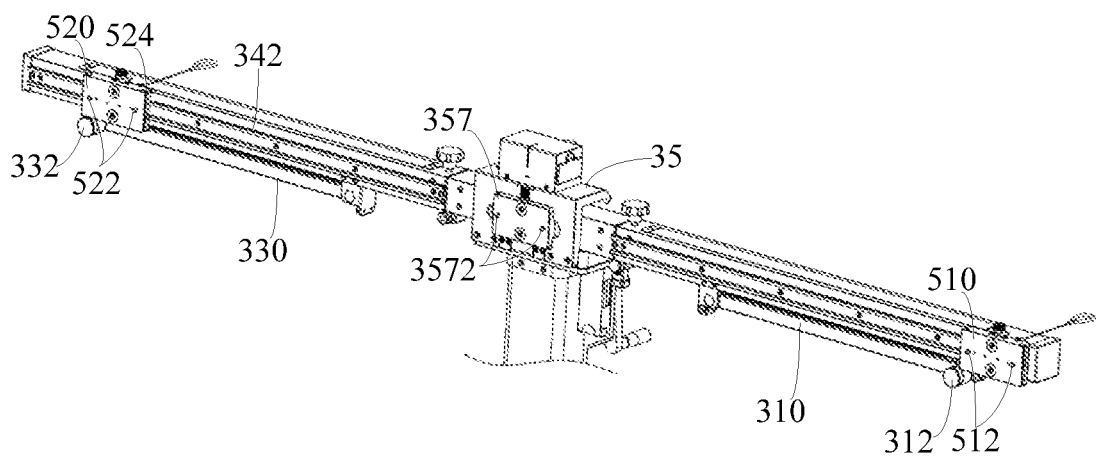
FIG. 61 is an assembly diagram of a beam assembly and a stand assembly according to some embodiments, where the beam assembly is hung with a first fixing member and a second fixing member for hanging small-sized calibration elements.
Figure 62:
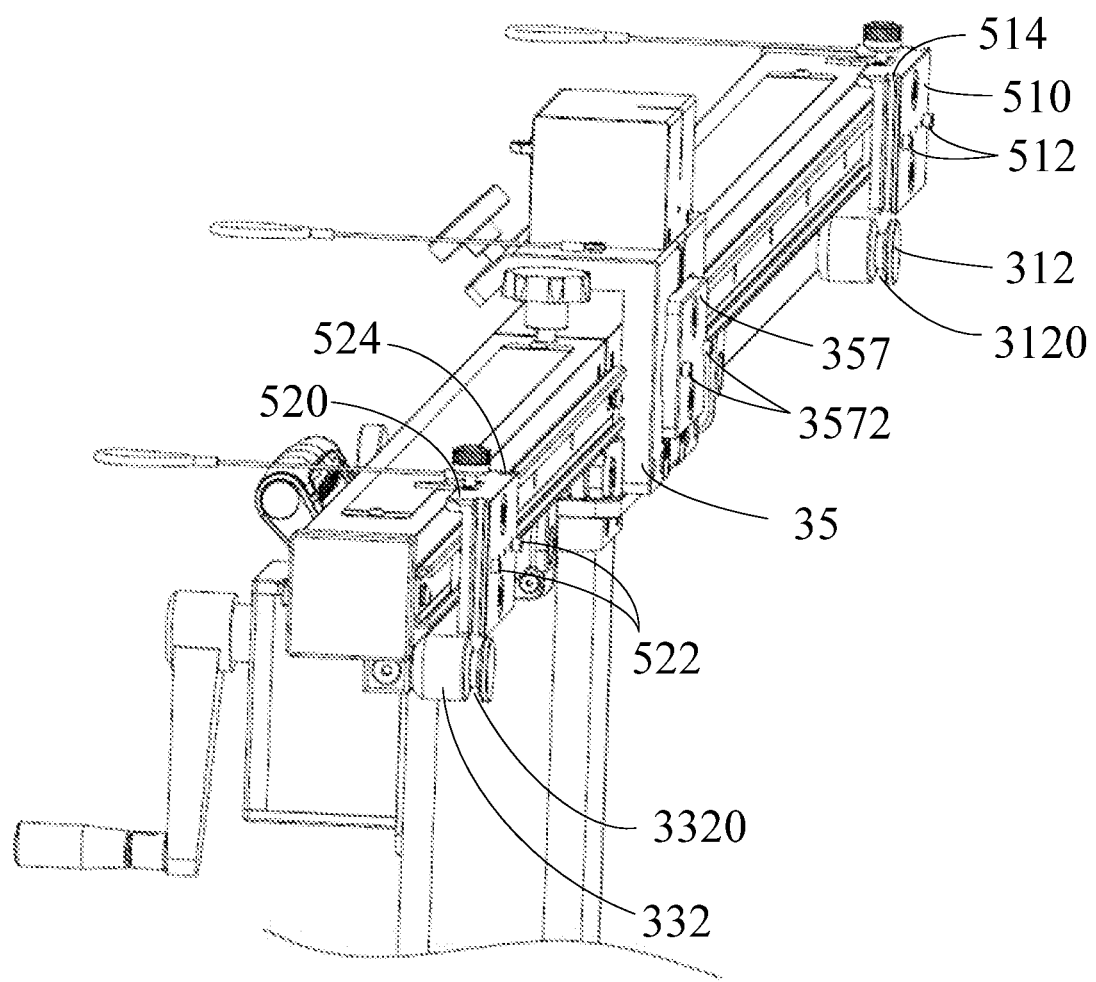
FIG. 62 is an assembly diagram of the beam assembly and the stand assembly shown in FIG. 61 from another perspective.
Figure 63:
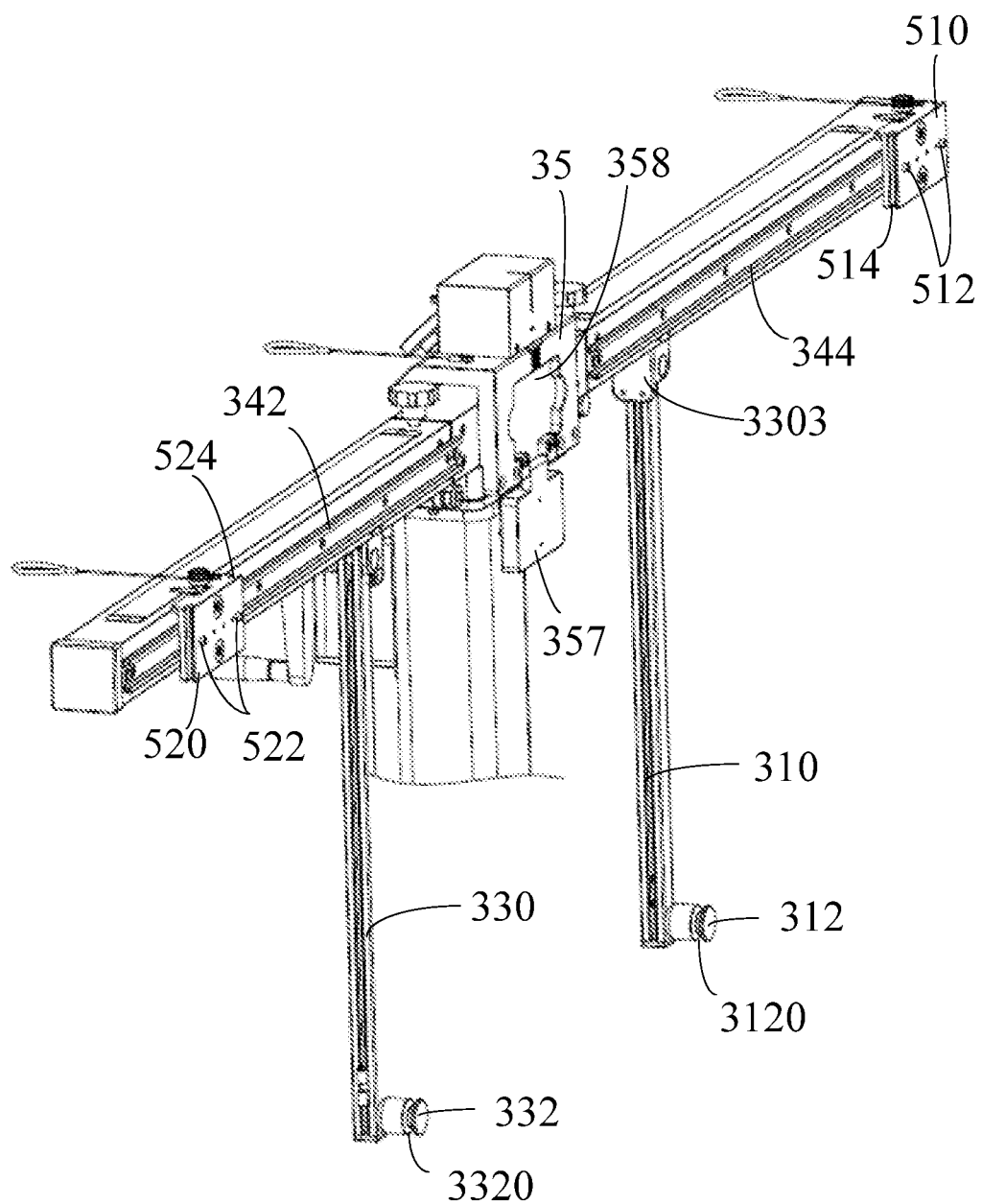
FIG. 63 is an assembly diagram of the beam assembly and the stand assembly shown in FIG. 61 from still another perspective, where in this state, the calibration bracket is configured to hang a large-sized calibration component, such as a pattern plate.
Figure 64:
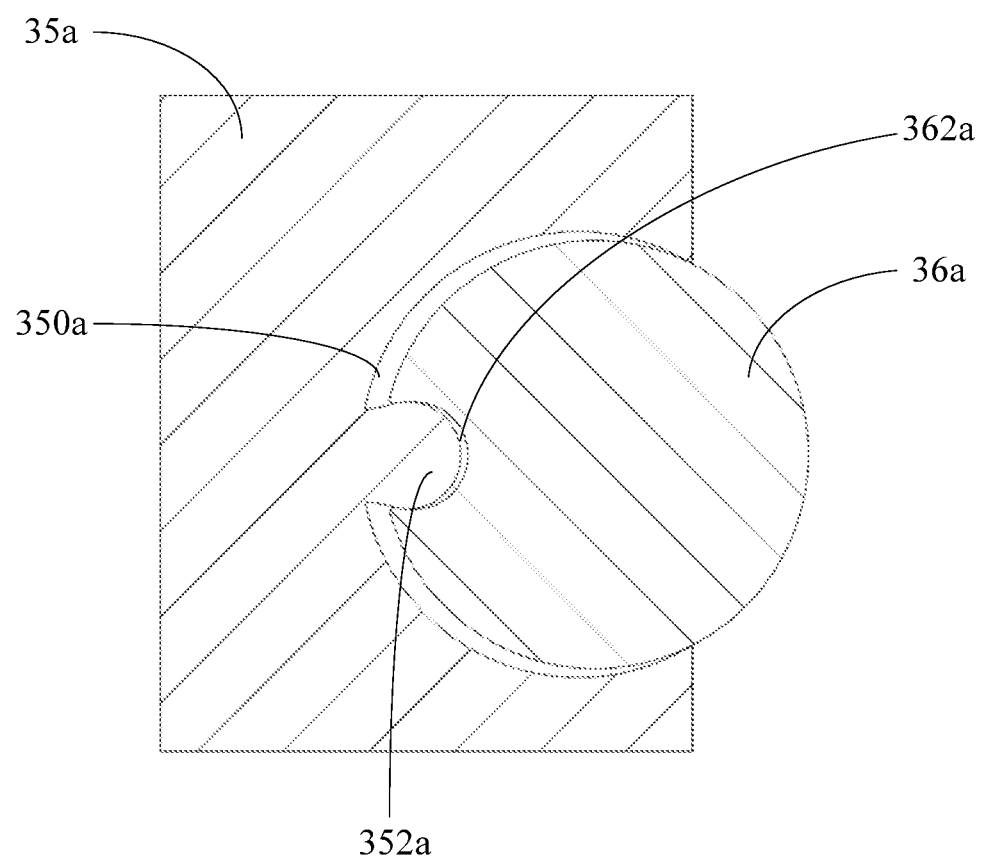
FIG. 64 is a cross-sectional view of a target hanger and a beam according to some embodiments.

Referring to FIG. 37, in some embodiments, the cross-section of the beam may have other shapes, for example, a circular shape. A target mounting member 35a is provided with a receiving cavity 350a. The receiving cavity 350a is substantially cylindrical and is horizontally disposed. The target mounting member 35a includes a guide rod 352a. The guide rod 352a is horizontally located in the receiving cavity. A beam 36a is substantially cylindrical, and an outer wall of the beam is provided with a guide groove 362a. The guide groove 362a is disposed in a length direction of the beam 36a, and a shape of the guide groove matches a shape of the guide rod 352a, so that the guide groove 362a can clamp the guide rod 352a. A diameter of the beam 36a is slightly greater than a width of an opening of the receiving cavity 350a. The beam 36a may be pushed into the receiving cavity 350a or removed from the receiving cavity 350a by applying a force on the beam 36a. The beam 36a may also be caused to slide in the length direction thereof relative to the target mounting member 35a by applying a force on the beam 36a.

The diameter of the beam 36a is slightly greater than the width of the opening of the receiving cavity 350a. The beam 36a is pushed into the receiving cavity 350a by applying a force, so that the beam 36a can be mounted in the receiving cavity 350a. Then the guide groove 362a clamps the guide rod 352a, so that the beam 36a can be more firmly mounted to the target mounting member 35a. The guide groove 362a and the guide rod 352a are both disposed in the length direction of the beam 36a, which can guide the beam 36a to move in the length direction thereof relative to the target mounting member 35a, to facilitate adjustment of left and right positions of the beam 36a.

It may be understood that, in some other embodiments, the cross-section of the beam 36a and the cross-section of the receiving cavity 350a may be set to other shapes as required, for example, an ellipse or a trapezoid, so long as the cross-section of the beam 36a matches the cross-section of the receiving cavity 350a and the beam 36a can be pushed into the receiving cavity 350a or removed from the receiving cavity 350a by applying a force on the beam 36a.

In order to firmly mount the beam 36a to the mounting base 35, a contact surface between the mounting base 35 and the beam 36a varies according to the cross-section of the beam 36a, so long as the contact surface between the mounting base 35 and the beam 36a match the cross-section of the beam 36a. In this way, the beam 36a can be firmly mounted to the mounting base 35. For example, the cross-section of the beam 36a is circular, and the contact surface between the mounting base 35 and the beam 36a is substantially cylindrical. Certainly, the contact surface between the mounting base 35 and the beam 36a may also not vary according to the cross-section of the beam 36a. A positioning structure or a limiting structure may be disposed on the contact surface between the mounting base 35 and the beam 36a, to prevent the beam 36a from rolling. For example, a positioning block is disposed on the contact surface between the mounting base 35 and the beam 36a, and a positioning groove is provided on an outer wall of the beam 36a.

In some embodiments, the first fixing member 510 and the second fixing member 520 shown in FIG. 34 to FIG. 36 may adopt the structure of the target mounting member 35a. Accordingly, the beam shown in FIG. 34 to FIG. 36 adopts the structure of the beam 36a.

Finally, it is to be noted that, the foregoing embodiments are merely intended to describe the technical solutions of the present invention and are not to limit the present invention. Under the thinking of the present invention, the technical characteristics in the foregoing embodiments or in different embodiments may also be combined with each other, the steps may be implemented in any order, and there are many other variations in different aspects of the present invention described above, which are not provided in detail for simplicity. Although the present invention is described in detail with reference to the foregoing embodiments, it is to be understood by a person skilled in the art that they may still make modifications to the technical solutions described in the foregoing embodiments or make equivalent replacements to some technical features therein which do not cause essence of the corresponding technical solutions to depart from the scope of the technical solutions of the embodiments of the present invention.

What is claimed is:

1. A calibration bracket, comprising:
   a base;
   a stand assembly fixedly connected to the base in a horizontal plane parallel to ground; and
   a beam assembly supported by the stand assembly, the beam assembly comprising a beam, the beam being configured to mount a calibration element and comprising a left beam portion, a right beam portion and a connecting portion, the connecting portion being supported by the stand assembly, the left beam portion being hinged connected to one end of the connecting portion, and the right beam portion being hinged connected to the other end of the connecting portion:
   wherein the left beam and the right beam independently and hingedly move relative to the connecting portion in a plane perpendicular to the horizontal plane;
   the beam assembly further comprising at least one supporting rod, the beam being connected to the at least one supporting rod;
   two fixing blocks supported by the beam, the two fixing blocks being movable in the beam, each of the fixing blocks being configured to mount a small-sized calibration element, the two fixing blocks and the at least one supporting rod being capable of collaboratively supporting a large-sized calibration element, the two fixing blocks respectively fixing the large-sized calibration element from left and right ends, and the at least one supporting rod supporting the large-sized calibration element underneath the large-sized calibration element.

2. The calibration bracket according to claim 1, wherein the stand assembly comprises a fixed vertical rod and a movable vertical rod;
   one end of the fixed vertical rod being mounted to the base;
   the movable vertical rod being disposed in the fixed vertical rod, and being movable in a length direction of the fixed vertical rod relative to the fixed vertical rod;
   the connecting portion being supported by the movable vertical rod.

3. The calibration bracket according to claim 2, wherein the stand assembly further comprises a fixed ball assembly and a floating ball assembly;
   the fixed ball assembly and the floating ball assembly being respectively fixedly mounted on an inner surface of the movable vertical rod and being opposite to each other in the movable vertical rod;
   a part of the floating ball assembly protruding from an outer surface of the movable vertical rod, and the protruding part of the floating ball assembly being elastically retractable or extendable and always abutting against the inner surface of the fixed vertical rod; and
   a part of the fixed ball assembly protruding from the outer surface of the movable vertical rod, and the protruding part of the fixed ball assembly being not elastically retractable or extendable and abutting against the inner surface of the fixed vertical rod.

4. The calibration bracket according to claim 2, wherein one of the fixed vertical rod and the movable vertical rod comprises a guide rail, and the other is movable only in the length direction of the fixed vertical rod under guidance of the guide rail.

5. The calibration bracket according to claim 4, wherein the stand assembly comprises a driving mechanism, the driving mechanism being mounted to the fixed vertical rod;
   wherein the driving mechanism is configured to drive the movable vertical rod to move in the length direction of the fixed vertical rod relative to the fixed vertical rod.

6. The calibration bracket according to claim 5, wherein the driving mechanism comprises a rack, a worm, a worm gear and a transmission gear, the rack being disposed along the length direction of the movable vertical rod;
   wherein the worm gear is driven to rotate when the worm rotates; wherein the transmission gear is driven to rotate when the worm gear rotates; wherein the movable vertical rod is driven to move along the vertical direction of the rack when the transmission gear rotates.

7. The calibration bracket according to claim 6, wherein the worm meshes with the worm gear;
   the worm gear being fixedly mounted to the transmission gear, a rotation axis of the worm gear overlapping with a rotation axis of the transmission gear, and the worm gear and the transmission gear being rotatable about a rotation axis; and
   the transmission gear meshing with the rack,
   the rotation axis being perpendicular to the vertical direction.

8. The calibration bracket according to claim 5, wherein the driving mechanism comprises a screw rod, a driving gear and a helical gear;
   the helical gear meshing with the driving gear, so as to drive the driving gear to rotate, the helical gear being rotatable about a first rotation axis;
   the driving gear being sleeved on the screw rod, the driving gear being in screw-thread fit with the screw rod, the driving gear being rotatable about a second rotation axis to drive the screw rod to move in the second rotation axis, the first rotation axis and the second rotation axis being mutually perpendicular to and intersecting each other.

9. The calibration bracket according to claim 5, wherein the driving mechanism comprises a rack and a gear speed reduction assembly, the gear speed reduction assembly comprising a first helical gear, a second helical gear, a first transmission gear and a second transmission gear; the rack being disposed along the length direction of the movable vertical rod;
   wherein the second helical gear is driven to rotate when the first helical gear rotates, wherein the first transmission gear is driven to rotate when the second helical gear rotates, the second transmission gear being driven to rotate when the first transmission gear rotates, the movable vertical rod being driven to move along the vertical direction of the rack when the second transmission gear rotates.

10. The calibration bracket according to claim 9, wherein the first helical gear meshes with the second helical gear; the first helical gear being rotatable about the first rotation axis;
    wherein the first transmission gear is fixedly mounted to the second helical gear, wherein the rotation axis of the first transmission gear overlaps the rotation axis of the second helical gear, both of the first transmission gear and the second helical gear being rotatable about the second rotation axis;

wherein the second transmission gear rotates about the third rotation axis; the second transmission gear meshing with the first transmission gear and the rack respectively;

wherein the first rotation axis is perpendicular to the second rotation axis and the third rotation axis, and the first rotation axis being perpendicular to the vertical direction;

wherein the second rotation axis is parallel to the third rotation axis, and the second rotation axis and the third rotation axis being perpendicular to the vertical direction.

11. The calibration bracket according to claim 1, wherein an end of the supporting rod away from the beam assembly comprises a positioning mechanism, the positioning mechanism being configured to support the one or more calibration elements.

12. The calibration bracket according to claim 11, wherein the positioning mechanism comprises a slot or a bump.

13. The calibration bracket according to claim 1, wherein the beam assembly comprises one supporting rod, the supporting rod being disposed in the middle of the beam assembly.

14. The calibration bracket according to claim 13, wherein an end of the supporting rod away from the beam assembly is lengthened in an extending direction of the beam assembly.

15. The calibration bracket according to claim 1, wherein the beam assembly comprises at least two supporting rods, the at least two supporting rods being pivotally connected to the left beam portion and the right beam portion respectively.

16. The calibration bracket according to claim 15, wherein at least one of the left beam portion and the right beam portion includes a supporting rod guide rail, the supporting rod being supported by the supporting rod guide rail and being moveable along the supporting rod guide rail.

17. The calibration bracket according to claim 1, wherein the supporting rod comprises a supporting rod body and a supporting member, the supporting rod body being provided with a slot, at least one of the left beam portion, the right beam portion and the connecting portion being provided with a fixture block, wherein the fixture block is insertable into the slot, so as for the supporting rod to snap at least one of the left beam portion, the right beam portion and the connection portion; or at least one of the left beam portion, the right beam portion and the connecting portion being provided with a slot, and the supporting rod body being provided with a fixture block, and the fixture block being snapped into the slot to snap the supporting rod at the at least one of the left beam portion, the right beam portion and the connecting portion.

18. The calibration bracket according to claim 1, further comprising a multi-line laser mounted on the beam assembly.

19. The calibration bracket according to claim 18, wherein the multi-line laser is a two-line laser or a five-line laser.

20. The calibration bracket according to claim 18, wherein the multi-line laser is detachably mounted on the connection portion.

21. The calibration bracket according to claim 1, further comprising an adjustment mechanism configured to adjust a horizontal angle of the beam assembly.

22. The calibration bracket according to claim 21, further comprising a multi-line laser mounted on the beam assembly; the multi-line laser and the adjustment mechanism being respectively disposed on opposite sides of the connection portion.

23. The calibration bracket according to claim 1, wherein the beam assembly and the stand assembly are detachably connected.

24. The calibration bracket according to claim 1, further comprising:
a first joint mechanism comprising a first fixing portion and a first rotation shaft; and
a second joint mechanism comprising a second fixing portion and a second rotation shaft;
wherein the first fixing portion is configured to fixedly connect the left beam portion and the connection portion when the beam is in an unfolded state;
wherein the second fixing portion is configured to fixedly connect the right beam portion and the connection portion when the beam is in the unfolded state;
wherein the left beam portion and the connection portion are pivotally connected by the first rotation shaft; the right beam portion and the connection portion being pivotally connected by the second rotation shaft.

25. The calibration bracket according to claim 24, wherein the first fixing portion comprises a first buckle and a second buckle, the first buckle being disposed on one of the left beam portion and the connection portion, the second buckle being disposed on the other of the left beam portion and the connection portion, the first buckle and the second buckle being configured to buckle when the beam is in an unfolded state, so as to connect the left beam portion and the connection portion;
wherein the second fixing portion comprises a third buckle and a fourth buckle, the third buckle being disposed on one of the right beam portion and the connection portion, the fourth buckle being disposed on the other of the right beam portion and the connection portion, the third buckle and the fourth buckle being configured to buckle when the beam is in the unfolded state, so as to connect the right beam portion and the connection portion.

26. The calibration bracket according to claim 24, wherein the first fixing portion comprises:
a third rotation shaft;
a first fastener, wherein the first fastener is rotatable about the third rotation shaft, one end of the first fastener being provided with a first hook portion; and
a first locking mechanism, wherein the first fastener is driven to rotate about the third rotation shaft when the first locking mechanism rotates;
wherein when the first locking mechanism is rotated to be fastened, the first fastener is driven to rotate about the third rotation shaft in order to fasten the left beam portion and the connection portion through the first hook portion;
wherein the second fixing portion comprises:
a fourth rotation shaft;
a second fastener, wherein the second fastener is rotatable about the fourth rotation shaft, one end of the second fastener being provided with a second hook portion; and a second locking mechanism, wherein the second fastener is driven to rotate about the fourth rotation shaft when the second locking mechanism rotates;

wherein when the second locking mechanism is rotated to be fastened, the second fastener is driven to rotate about the fourth rotation shaft in order to fasten the right beam portion and the connection portion through the second hook portion.

27. The calibration bracket according to claim 1, wherein the calibration bracket further comprises a distance measurement apparatus, the distance measurement apparatus being configured to measure a height of the beam assembly from the ground.

* * * * *